US010809579B2

(12) United States Patent
Chang et al.

(10) Patent No.: US 10,809,579 B2
(45) Date of Patent: Oct. 20, 2020

(54) LIQUID CRYSTAL DISPLAY

(71) Applicant: SAMSUNG DISPLAY CO., LTD., Yongin, Gyeonggi-Do (KR)

(72) Inventors: Hak Sun Chang, Yongin-si (KR); Cheol Shin, Hwaseong-si (KR); Jae-Soo Jang, Suwon-si (KR); Ki Chul Shin, Seongnam-si (KR); Jang Wi Ryu, Seoul (KR); Ho Kil Oh, Yongin-si (KR); Ka Eun Kim, Yongin-si (KR); Se Hyun Lee, Seoul (KR); Hyo Ju Jung, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 1250 days.

(21) Appl. No.: 14/696,279

(22) Filed: Apr. 24, 2015

(65) Prior Publication Data

US 2015/0309375 A1 Oct. 29, 2015

(30) Foreign Application Priority Data

Apr. 29, 2014 (KR) .................. 10-2014-0051872

(51) Int. Cl.
*G02F 1/1337* (2006.01)
*G02F 1/1343* (2006.01)
*G02F 1/1362* (2006.01)

(52) U.S. Cl.
CPC .... *G02F 1/134309* (2013.01); *G02F 1/13439* (2013.01); *G02F 1/133707* (2013.01);
(Continued)

(58) Field of Classification Search
CPC .................. G02F 1/133707; G02F 1/134309
See application file for complete search history.

(56) References Cited

U.S. PATENT DOCUMENTS 6,992,329 B2   1/2006   Wu et al.
7,342,629 B2   3/2008   Yoshida et al.
(Continued)

FOREIGN PATENT DOCUMENTS

CN   102411242 A   4/2012
CN   103309071 A   9/2013
(Continued)

OTHER PUBLICATIONS

EPO Search Report dated Jul. 24, 2015, for corresponding European Patent application 15165797.0, (8 pages).

*Primary Examiner* — Jessica M Merlin
*Assistant Examiner* — Mark D Teets
(74) *Attorney, Agent, or Firm* — Lewis Roca Rothgerber Christie LLP

(57) ABSTRACT

A liquid crystal display includes: a first substrate; a pixel electrode on the first substrate and including a first subpixel electrode and a second subpixel electrode which are separated from each other; a second substrate facing the first substrate; a common electrode on the second substrate; and a liquid crystal layer between the first substrate and the second substrate, in which the first subpixel electrode includes a first plate-shaped portion and a plurality of first branch electrodes extended from the first plate-shaped portion, the second subpixel electrode includes a second plate-shaped portion surrounds the first branch electrodes and a plurality of second branch electrodes extended from the second plate-shaped portion, and a difference between a first voltage applied to the first subpixel electrode and a common voltage applied to the common electrode is larger than a difference between a second voltage applied to the second subpixel electrode and the common voltage.

25 Claims, 34 Drawing Sheets

(52) U.S. Cl.
CPC .. *G02F 1/134336* (2013.01); *G02F 1/133753* (2013.01); *G02F 1/136213* (2013.01); *G02F 2001/134345* (2013.01); *G02F 2001/136222* (2013.01); *G02F 2201/40* (2013.01); *G02F 2203/30* (2013.01)

(56) References Cited

U.S. PATENT DOCUMENTS

| | | |
|---|---|---|
| 7,583,346 B2 | 9/2009 | Hsieh et al. |
| 7,656,486 B2 | 2/2010 | Tasaka et al. |
| 8,094,277 B2 | 1/2012 | Tasaka et al. |
| 8,379,176 B2 | 2/2013 | Kim et al. |
| 8,405,802 B2 | 3/2013 | Hanaoka et al. |
| 2006/0012741 A1 | 1/2006 | Mizusako |
| 2006/0285047 A1 | 12/2006 | Chiu |
| 2007/0216838 A1 | 9/2007 | Hsu et al. |
| 2009/0079892 A1 | 3/2009 | Hsien et al. |
| 2010/0110358 A1* | 5/2010 | Um ............... G02F 1/134363 349/141 |
| 2012/0162559 A1* | 6/2012 | Kim ............... G02F 1/134363 349/42 |
| 2012/0206683 A1 | 8/2012 | Zhang |
| 2012/0236245 A1* | 9/2012 | Jung ............... G02F 1/134336 349/144 |
| 2012/0281172 A1* | 11/2012 | Park ............... G02F 1/133753 349/123 |
| 2013/0002625 A1 | 1/2013 | Liao et al. |
| 2013/0010248 A1 | 1/2013 | Kang |
| 2013/0033668 A1 | 2/2013 | Yao et al. |
| 2013/0208225 A1 | 8/2013 | Kwon et al. |
| 2014/0267994 A1 | 9/2014 | Ryu et al. |
| 2015/0070645 A1* | 3/2015 | Jeon ............... G02F 1/134336 349/143 |
| 2015/0116620 A1* | 4/2015 | Song ............... G02F 1/134309 349/43 |
| 2015/0116641 A1* | 4/2015 | Oh ............... G02F 1/134336 349/106 |
| 2015/0316821 A1* | 11/2015 | Lee ............... G02F 1/134309 349/33 |
| 2016/0109766 A1* | 4/2016 | Oh ............... G02F 1/133703 349/139 |
| 2016/0195781 A1* | 7/2016 | Lee ............... G02F 1/134309 349/138 |
| 2016/0202569 A1* | 7/2016 | Lee ............... G02F 1/133707 349/43 |
| 2016/0342038 A1* | 11/2016 | Shih ............... G02F 1/136286 |

FOREIGN PATENT DOCUMENTS

| | | |
|---|---|---|
| CN | 103323984 A | 9/2013 |
| CN | 103472634 A | 12/2013 |
| EP | 2 639 634 A1 | 9/2013 |
| JP | 2005-24711 A | 1/2005 |
| JP | 2011-221505 | 11/2011 |
| JP | 2011-221505 A | 11/2011 |
| JP | 2013-190771 A | 9/2013 |
| KR | 10-2006-0116580 A | 11/2006 |
| KR | 10-0813349 B1 | 3/2008 |
| KR | 10-2014-0113035 A | 9/2014 |

\* cited by examiner

FIG. 23
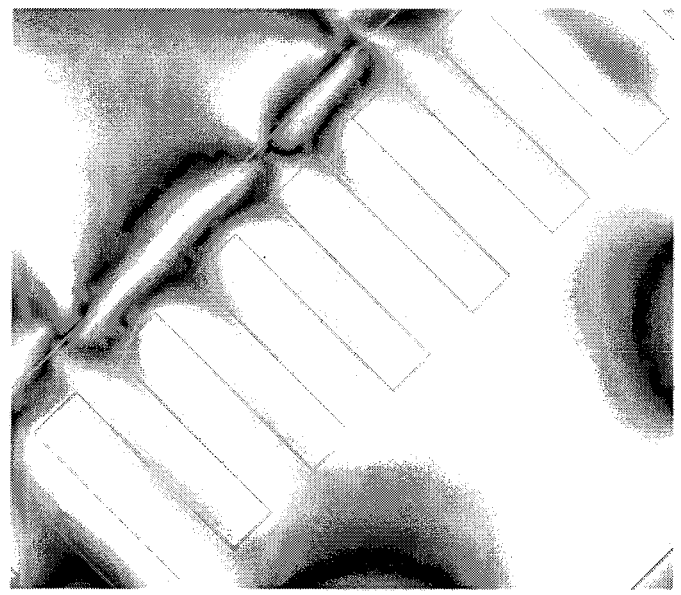
(a)
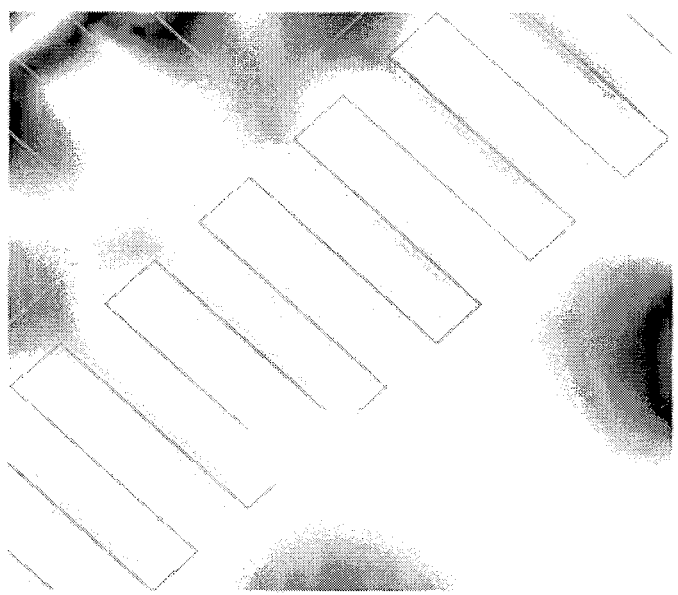
(b)

LIQUID CRYSTAL DISPLAY

CROSS-REFERENCE TO RELATED APPLICATION

This application claims priority to and the benefit of Korean Patent Application No. 10-2014-0051872, filed in the Korean Intellectual Property Office on Apr. 29, 2014, the entire content of which is incorporated herein by reference.

BACKGROUND

1. Field

The following description relates to a liquid crystal display.

2. Description of the Related Art

A liquid crystal display, which is one of the most common flat panel displays currently in use, includes two sheets of display panels with field generating electrodes (such as a pixel electrode, a common electrode, or the like) and a liquid crystal layer interposed between the two sheets. The liquid crystal display generates an electric field in the liquid crystal layer by applying a voltage to the field generating electrodes, and controlling the direction of liquid crystal molecules of the liquid crystal layer by the generated electric field, thus controlling the polarization of incident light so as to display images.

Among the liquid crystal displays, a vertically aligned mode liquid crystal display, in which liquid crystal molecules are aligned so that long axes thereof are vertical (perpendicular) to the display panels while the electric field is not applied, has been developed.

In the vertically aligned mode liquid crystal display, it is important to secure a wide viewing angle, and to this end, a method of forming a plurality of domains is used (utilized) by forming cutouts such as minute slits in the field generating electrode.

In the case of a method in which the minute slits are formed in the pixel electrode to have a plurality of branch electrodes, the liquid crystal molecules may be controlled even in a central region of each domain, but an aperture ratio of the liquid crystal display is reduced.

Meanwhile, in the case of the vertically aligned mode liquid crystal display, in order to approximate (or match) the side visibility to the front visibility, a method of varying transmittance by dividing one pixel into two subpixels and applying different voltages to the two subpixels has been proposed.

As such, in the case of dividing one pixel into two subpixels, a behavior of the liquid crystal molecules on a boundary between the two subpixels is irregular, and as a result, transmittance deteriorates on the boundary between the two subpixels.

The above information disclosed in this Background section is only for enhancement of understanding of the background of the invention and therefore it may contain information that does not form the prior art that is already known in this country to a person of ordinary skill in the art.

SUMMARY

Aspects according to one or more embodiments of the present invention are directed toward a liquid crystal display having desired features of controlling liquid crystal molecules on a boundary between two subpixels without deteriorating an aperture ratio of the liquid crystal display while the side visibility is approximated (or matched) to the front visibility.

According to an example embodiment of the present invention, a liquid crystal display includes: a first substrate; a pixel electrode on the first substrate and including a first subpixel electrode and a second subpixel electrode separated from the first subpixel electrode; a second substrate facing the first substrate; a common electrode on the second substrate; and a liquid crystal layer between the first substrate and the second substrate, in which the first subpixel electrode includes a first plate-shaped portion and a plurality of first branch electrodes extended from the first plate-shaped portion, the second subpixel electrode includes a second plate-shaped portion surrounding the first branch electrodes and a plurality of second branch electrodes extended from the second plate-shaped portion, and a difference between a first voltage applied to the first subpixel electrode and a common voltage applied to the common electrode is larger than a difference between a second voltage applied to the second subpixel electrode and the common voltage.

The first plate-shaped portion of the first subpixel electrode may have a rhombus planar shape, and the second plate-shaped portion of the second subpixel electrode may have a planar shape formed by combining a plurality of trapezoid shapes.

The plurality of first branch electrodes of the first subpixel electrode may include a first minute branch, a second minute branch, a third minute branch, and a fourth minute branch, which extend in different directions; and the plurality of second branch electrodes of the second subpixel electrode may include a fifth minute branch, a sixth minute branch, a seventh minute branch, and an eighth minute branch, which extend in different directions.

A distance between the first subpixel electrode and the second subpixel electrode measured along a direction parallel to an extending direction of any one of the plurality of first branch electrodes and the plurality of second branch electrodes may be about 4 µm or less; and a ratio of the voltage applied to the second subpixel electrode to the voltage applied to the first subpixel electrode may be about 0.83 or less.

A distance between the first subpixel electrode and the second subpixel electrode measured along a direction parallel to an extending direction of any one of the plurality of first branch electrodes and the plurality of second branch electrodes may be larger than about 4 µm and about 4.5 µm or less; and a ratio of the voltage applied to the second subpixel electrode to the voltage applied to the first subpixel electrode may be about 0.75 or less.

A distance between the first subpixel electrode and the second subpixel electrode measured along a direction parallel to an extending direction of any one of the plurality of first branch electrodes and the plurality of second branch electrodes may be about 5 µm or more; and a ratio of the voltage applied to the second subpixel electrode to the voltage applied to the first subpixel electrode may be about 0.7 or less.

One-half of an entire width of the first plate-shaped portion of the first pixel electrode measured along a direction parallel to an extending direction of any one of the plurality of first branch electrodes and the plurality of second branch electrodes may be about 25 µm or less.

A width of the second plate-shaped portion of the second pixel electrode measured along a direction parallel to an extending direction of any one of the plurality of first branch electrodes and the plurality of second branch electrodes may be about 25 µm or less.

Lengths of the plurality of first branch electrodes and the plurality of second branch electrodes may be about 25 µm or less.

An edge of the first plate-shaped portion of the first subpixel electrode may form an angle of about 45° or about 135° with a gate line, or form an angle of larger than about 45° or smaller than about 135° with the gate line.

An edge of the second plate-shaped portion of the second subpixel electrode may form an angle of about 45° or about 135° with the gate line, or form an angle of larger than about 45° or smaller than about 135° with the gate line.

A boundary between the first subpixel electrode and the second subpixel electrode may form an angle of about 45° or about 135° with the gate line, or form an angle of larger than about 45° or smaller than about 135° with the gate line. The first branch electrode of the first subpixel electrode may form an angle of about 45° or about 135° with the gate line, or form an angle of larger than about 45° or smaller than about 135° with the gate line.

An edge of the second plate-shaped portion of the second subpixel electrode may form an angle of about 45° or about 135° with a gate line, or form an angle of larger than about 45° or smaller than about 135° with a gate line.

A boundary between the first subpixel electrode and the second subpixel electrode may form an angle of about 45° or about 135° with the gate line, or form an angle of larger than about 45° or smaller than about 135° with the gate line. The first branch electrode of the first subpixel electrode may form an angle of about 45° or about 135° with the gate line, or form an angle of larger than about 45° or smaller than about 135° with the gate line.

A boundary between the first subpixel electrode and the second subpixel electrode may form an angle of about 45° or about 135° with a gate line, or form an angle of larger than about 45° or smaller than about 135° with a gate line. The first branch electrode of the first subpixel electrode may form an angle of about 45° or about 135° with the gate line, or form an angle of larger than about 45° or smaller than about 135° with the gate line.

The first branch electrode of the first subpixel electrode may form an angle of about 45° or about 135° with the gate line, or form an angle of larger than about 45° or smaller than about 135° with the gate line.

A width of the second plate-shaped portion may be smaller than a width of the first plate-shaped portion.

A width of an end of the first branch electrode adjacent to the second plate-shaped portion may be larger than widths of other portions of the first branch electrode.

On a boundary between the second plate-shaped portion and the second branch electrode, a width of the second branch electrode may be smaller than widths of other portions of the second branch electrode.

The first subpixel electrode may not include the first branch electrode, but include only the first plate-shaped portion.

The liquid crystal display may further include an insulating layer below the pixel electrode, wherein the insulating layer may include a first portion below the first subpixel electrode and a second portion below the second subpixel electrode, and a height of the first portion may be larger than a height of the second portion.

A boundary between the first portion and the second portion may be overlapped with the second plate-shaped portion of the second subpixel electrode, or overlapped with the first branch electrode of the first subpixel electrode.

A boundary between the first portion and the second portion may be overlapped with the second plate-shaped portion of the second subpixel electrode, and the second portion may include a plurality of regions having different slopes formed with the substrate.

According to the liquid crystal display according to the example embodiments of the present invention, it is possible to control liquid crystal molecules on a boundary between two subpixels without deteriorating an aperture ratio of the liquid crystal display while side visibility is approximated (or matched) to front visibility and the luminance of the liquid crystal display is increased.

BRIEF DESCRIPTION OF THE DRAWINGS

FIGS. 23(a) and (b) are electron micrographs illustrating a result of a fifth Experimental Example of the present invention.

DETAILED DESCRIPTION

Figure 1:
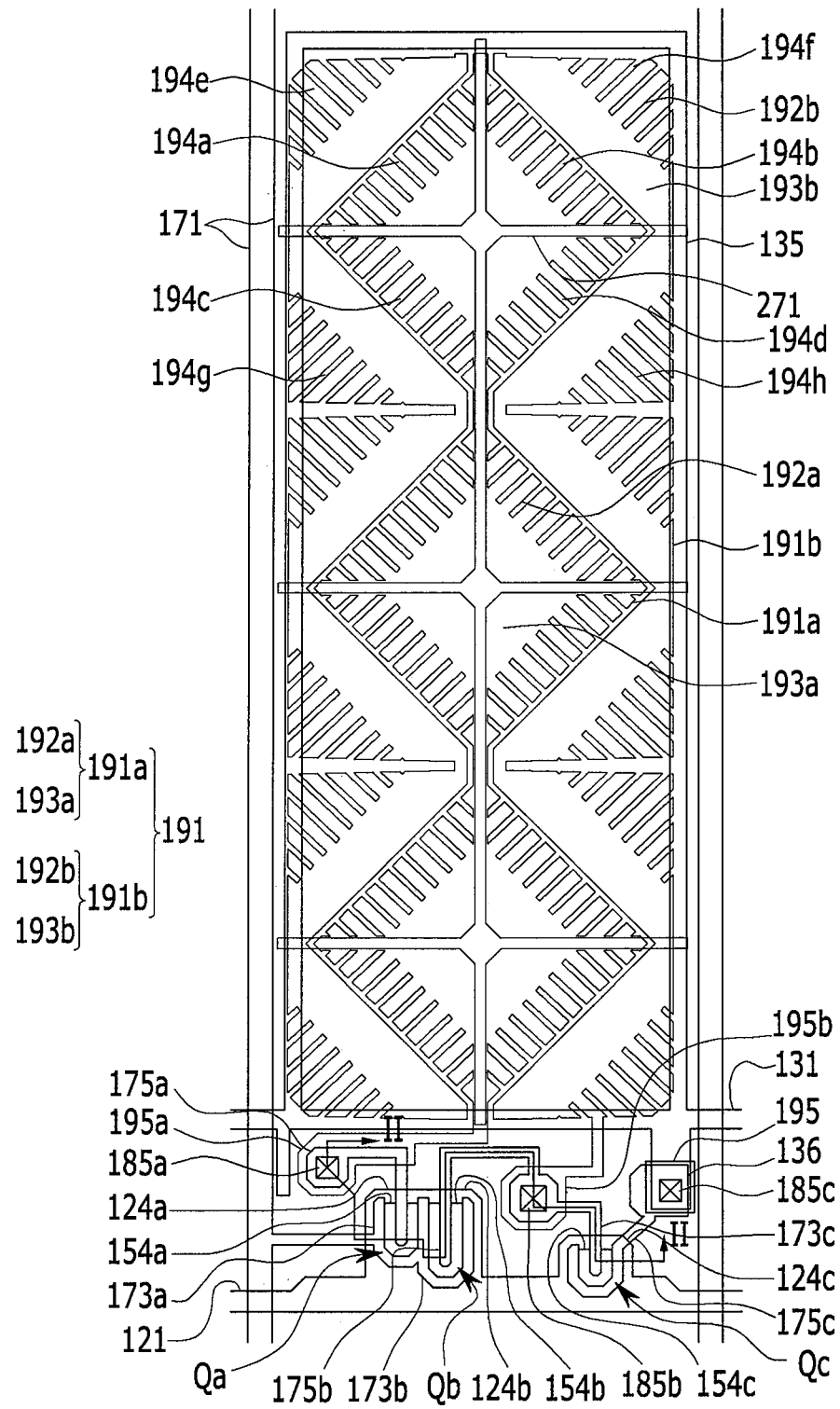
FIG. 1 is a layout view of a liquid crystal display according to an example embodiment of the present invention.

The present invention will be described more fully hereinafter with reference to the accompanying drawings, in which example embodiments of the invention are shown. As those skilled in the art would realize, the described embodiments may be modified in various different ways, all without departing from the spirit or scope of the present invention. Expressions such as "at least one of," when preceding a list of elements, modify the entire list of elements and do not modify the individual elements of the list. Further, the use of "may" when describing embodiments of the present invention refers to "one or more embodiments of the present invention."

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "coupled to" another element, it can be directly on or coupled to the other element or intervening element(s) may also be present. In contrast, when an element is referred to as being "directly on" or "directly coupled to" another element, there are no intervening elements present.

Next, a liquid crystal display according to an example embodiment of the present invention will be described with reference to FIGS. 1 and 2. FIG. 1 is a layout view illustrating a liquid crystal display according to an example embodiment of the present invention, and FIG. 2 is a cross-sectional view of the liquid crystal display of FIG. 1 taken along the line II-II.

Figure 2:
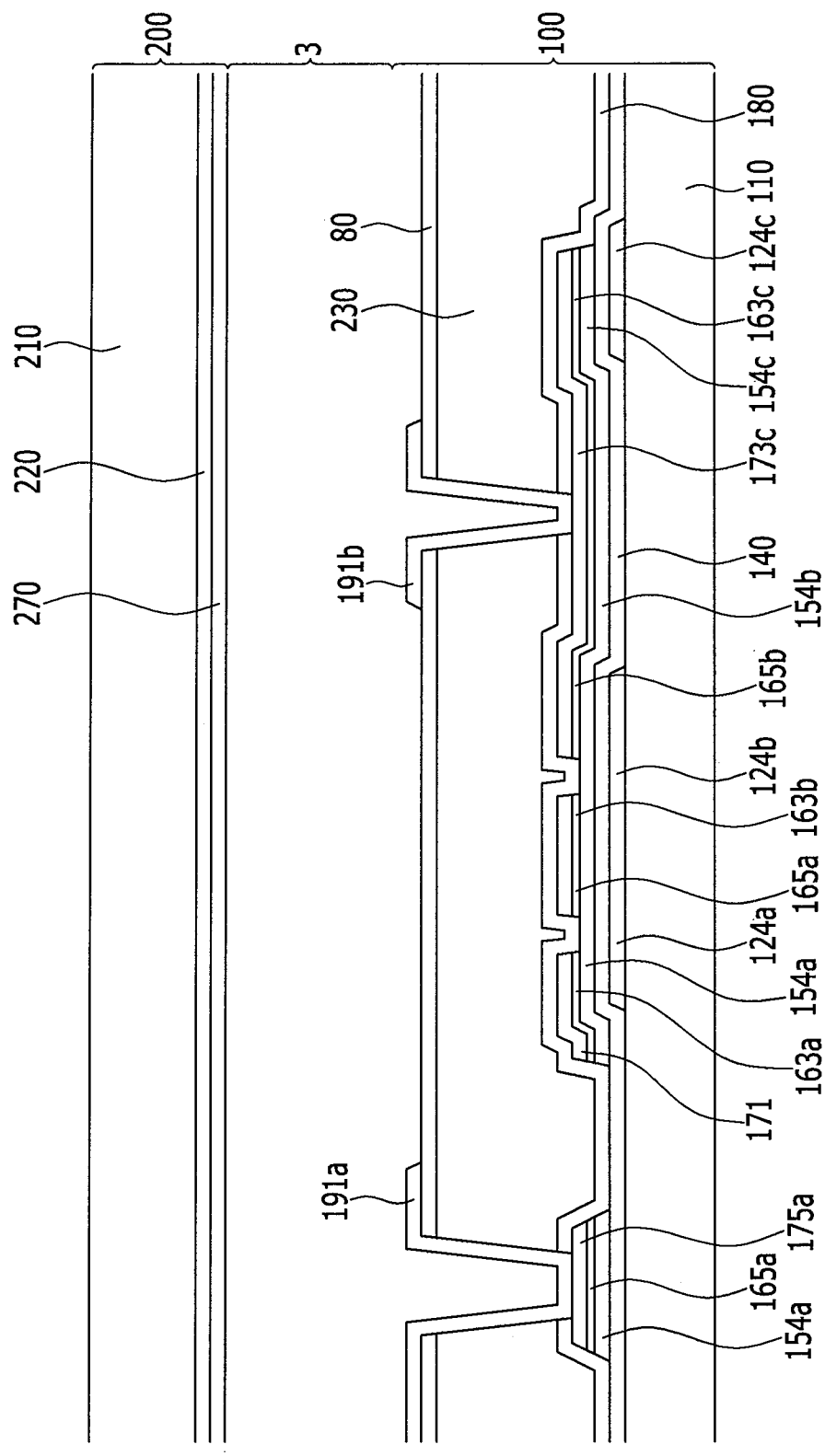
FIG. 2 is a cross-sectional view of the liquid crystal display of FIG. 1 taken along the line II-II.

Referring to FIGS. 1 and 2, the liquid crystal display according to the example embodiment includes a lower panel 100 and an upper panel 200 facing each other, a liquid crystal layer 3 interposed between the two panels 100 and 200, and a pair of polarizers attached to the outer sides of the panels 100 and 200.

First, the lower panel 100 will be described.

A gate line 121, a reference voltage line 131, and a storage electrode 135 are formed on a first substrate 110. The gate line 121 mainly extends in a horizontal direction and transfers a gate signal.

The gate line 121 includes a first gate electrode 124a, a second gate electrode 124b, a third gate electrode 124c, and a wide end portion for connection with another layer or an external driving circuit.

The reference voltage line 131 may extend in parallel with the gate line 121 and has an extension 136, and the extension 136 is coupled with a third drain electrode 175c to be described below.

The reference voltage line 131 includes the storage electrode 135 surrounding a pixel area.

A gate insulating layer 140 is formed on the gate line 121, the reference voltage line 131, and the storage electrode 135.

A first semiconductor 154a, a second semiconductor 154b, and a third semiconductor 154c, which may be made of amorphous and/or crystalline silicon, are formed on the gate insulating layer 140.

A plurality of ohmic contacts 163a, 163b, 163c, 165a, 165b, and 165c are formed on the first semiconductor 154a, the second semiconductor 154b, and the third semiconductor 154c. In the case where the semiconductors 154a, 154b, and 154c are oxide semiconductors, the ohmic contacts may be omitted.

A data conductor including a data line 171 including a first source electrode 173a and a second source electrode 173b, a first drain electrode 175a, a second drain electrode 175b, a third source electrode 173c, and a third drain electrode 175c, is formed on the ohmic contacts 163a, 165a, 163b, 165b, 163c, and 165c and the gate insulating layer 140.

The second drain electrode 175b is coupled with the third source electrode 173c.

The first gate electrode 124a, the first source electrode 173a, and the first drain electrode 175a form a first switching element (e.g., a first thin film transistor) Qa together with a first semiconductor 154a, and a channel of the first thin film transistor is formed in the semiconductor portion 154a between the first source electrode 173a and the first drain electrode 175a. Similarly, the second gate electrode 124b, the second source electrode 173b, and the second drain electrode 175b forms a second switching element (e.g., a second thin film transistor) Qb together with the second semiconductor 154b, and a channel of the second thin film transistor is formed in the semiconductor portion 154b between the second source electrode 173b and the second drain electrode 175b. The third gate electrode 124c, the third source electrode 173c, and the third drain electrode 175c forms a third switching element (e.g., a third thin film transistor) Qc together with the third semiconductor island 154c, and a channel of the third thin film transistor is formed in the semiconductor portion 154c between the third source electrode 173c and the third drain electrode 175c.

A passivation layer 180 made of an inorganic insulating material such as silicon nitride or silicon oxide is formed on the data conductor 171, 173a, 173b, 173c, 175a, 175b, 175c and the exposed portions of the semiconductors 154a, 154b, and 154c.

A color filter 230 is positioned on the passivation layer 180.

A light blocking member may be positioned on a region where the color filter 230 is not positioned and a part of the color filter 230. The light blocking member is called a black matrix and blocks light leakage.

A capping layer 80 is positioned on the color filter 230. The capping layer 80 may reduce or prevent the color filter 230 from being lifted and suppress the contamination of the liquid crystal layer 3 due to an organic material such as a solvent flowing into it from the color filter 230, thereby reducing or preventing defects such as an afterimage which may be caused when a screen is driven.

A pixel electrode 191 (including a first subpixel electrode 191a and a second subpixel electrode 191b) is formed on the capping layer 80. The first subpixel electrode 191a and the second subpixel electrode 191b include a basic electrode 199 illustrated in FIG. 3 or one or more modifications thereof.

The first subpixel electrode 191a and the second subpixel electrode 191b are spaced apart from each other at a set or predetermined distance.

The second subpixel electrode 191b surrounds the first subpixel electrode 191a.

A plurality of first branch electrodes 192a is formed at an edge of the first subpixel electrode 191a. The plurality of first branch electrodes 192a is extended from a first plate-shaped portion 193a having a rhombus shape. The plate shape used herein refers to a shape that is a whole plate without being split.

That is, the first subpixel electrode 191a includes the first plate-shaped portion 193a positioned at the center and a plurality of first branch electrodes 192a, which surrounds the first plate-shaped portion 193a and is extended from the first plate-shaped portion 193a.

The central portion of the first plate-shaped portion 193a of the first subpixel electrode 191a is overlapped with a central portion of a cross-shaped cutout 271 formed at a common electrode 270 to be described below.

The first branch electrodes 192a of the first subpixel electrode 191a extend in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms which are positioned outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of approximately (about) 45° to 135° with the gate line 121. Further, two of the minute branches 194a, 194b, 194c, 194d, 194e, 196f, 194g, and 194h, which extend in different directions and are adjacent to each other, may be orthogonal to each other.

In the passivation layer 180 and the capping layer 80, a first contact hole 185a exposing a part of the first drain electrode 175a, and a second contact hole 185b exposing a part of the second drain electrode 175b are formed. In the gate insulating layer 140, the passivation layer 180, and the capping layer 80, an extension 136 of the reference voltage line 131 and a third contact hole 185c exposing the third drain electrode 175c are formed.

A first extension 195a of the first subpixel electrode 191a is physically and electrically coupled to the first drain electrode 175a through the first contact hole 185a, and a second extension 195b of the second subpixel electrode 191b is physically and electrically coupled to the second drain electrode 175b through the second contact hole 185b.

The first subpixel electrode 191a and the second subpixel electrode 191b receive data voltages from the first drain electrode 175a and the second drain electrode 175b through the first contact hole 185a and the second contact hole 185b, respectively.

A connecting member 195 is formed on the extension 136 of the reference voltage line 131 (exposed through the third contact hole 185c) and the third drain electrode 175c, and the third drain electrode 175c is physically and electrically coupled with the extension 136 of the reference voltage line 131 through the connecting member 195.

Next, the upper panel 200 will be described.

A light blocking member 220 and a common electrode 270 are formed on a second insulation substrate 210.

The common electrode 270 has a plurality of cross-shaped cutouts 271. The cross-shaped cutouts 271 of the common electrode 270 are positioned for each basic region of the field generating electrode (to be desribed in more detail later) one by one, and may be connected to each other.

In the illustrated example embodiment, it is described that the light blocking member 220 is formed on the upper panel 200, but in the case of a liquid crystal display according to another example embodiment of the present invention, the light blocking member 220 may be positioned on the lower panel 100, and according to another example embodiment of the present invention, the color filter may be positioned on the upper panel 200.

Alignment layers are formed on inner surfaces of the display panels 100 and 200, and may be vertical alignment layers.

Polarizers are provided on the outer surfaces (i.e., the surfaces facing away from the liquid crystal layer) of the two panels 100 and 200. Transmissive axes of the two polarizers are orthogonal to each other, and one transmissive axis thereof may be parallel to the gate line 121. However, the polarizer may be disposed only on the outer surface of one of the two panels 100 and 200.

The liquid crystal layer 3 has negative dielectric anisotropy, and the liquid crystal molecules of the liquid crystal layer 3 are aligned so that long axes thereof are vertical (perpendicular) to the surfaces of the two panels 100 and 200 while the electric field is not applied. Accordingly, incident light does not pass through an orthogonal polarizer, but is blocked while the electric field is not applied.

The first subpixel electrode 191a and the second subpixel electrode 191b (to which the data voltages) are applied generate the electric field together with the common electrode 270 of the upper panel 200, and as a result, the liquid crystal molecules of the liquid crystal layer 3 which are aligned vertically to the surfaces of the two electrodes 191 and 270 when the electric field is not applied are tilted in a horizontal direction to the surfaces of the two electrodes 191 and 270, and luminance of light passing through the liquid crystal layer 3 varies according to the tilted degree of the liquid crystal molecules.

Next, a driving method of the liquid crystal display according to the example embodiment will be briefly described.

When a gate-on signal is applied to the gate line 121, the gate-on signal is applied to the first gate electrode 124a, the second gate electrode 124b, and the third gate electrode 124c, and as a result, a first switching element Qa, a second switching element Qb, and a third switching element Qc are formed. Accordingly, the data voltages applied to the data line 171 are applied to the first subpixel electrode 191a and the second subpixel electrode 191b through the turned-on first switching element Qa and second switching element Qb, respectively. In this case, the voltages having the same magnitude are applied to the first subpixel electrode 191a and the second subpixel electrode 191b. However, the voltage applied to the second subpixel electrode 191b is divided through the third switching element Qc which is coupled with the second switching element Qb in series. Accordingly, the voltage applied to the second subpixel electrode 191b is smaller than the voltage applied to the first subpixel electrode 191a.

As such, the magnitude of the second voltage applied to the second subpixel electrode 191b is smaller than the magnitude of the first voltage applied to the first subpixel electrode 191a. Accordingly, a difference in voltage between the first subpixel electrode 191a and the common electrode 270 is larger than a difference in voltage between the second subpixel electrode 191b and the common electrode 270.

Accordingly, charging voltages of a first liquid crystal capacitor (formed between the first subpixel electrode 191a and the common electrode 270) and a second liquid crystal capacitor (formed between the second subpixel electrode 191b and the common electrode 270) represent different gamma curves, and a gamma curve of one pixel voltage becomes a curve combining the two gamma curves. A combined gamma curve at the front coincides with a reference gamma curve at the front which can be appropriately determined, and a combined gamma curve at the side becomes the closest to the reference gamma curve at the front. As such, side visibility is improved by converting image data.

In the illustrated example embodiment, in order to vary the voltage charged to the first liquid crystal capacitor and the voltage charged to the second liquid crystal capacitor, an output terminal of the second switching element Qb coupled to the second subpixel electrode 191b forming the second liquid crystal capacitor and the third switching element Qc coupled to a divided reference voltage line are included, but in the case of a liquid crystal display according to another example embodiment of the present invention, an output terminal of the second switching element Qb coupled to the second subpixel electrode 191b forming the second liquid crystal capacitor and the third switching element Qc coupled to a step-down capacitor may be included. In this case, the third switching element Qc may be coupled to a different gate line from the first switching element Qa and the second switching element Qb, and after the first switching element Qa and the second switching element Qb are turned on and then turned off, the third switching element Qc may be turned on. After the first switching element Qa and the second switching element Qb are turned on and then turned off, when the third switching element Qc is turned on, charges move to the step-down capacitor through the third switching element Qc from the second subpixel electrode 191b. Next, the charging voltage of the second liquid crystal capacitor is decreased, and the step-down capacitor is charged. Since the charging voltage of the second liquid crystal capacitor is decreased by a capacitance of the step-down capacitor, the charging voltage of the second liquid crystal capacitor is smaller than the charging voltage of the first liquid crystal capacitor.

Further, in the case of a liquid crystal display according to another example embodiment of the present invention, the first liquid crystal capacitor and the second liquid crystal capacitor are coupled to different data lines to receive different data voltages, and as a result, the charging voltages between the first liquid crystal capacitor and the second liquid crystal capacitor may be differently set. In addition, by various different methods, the charged voltages between the first liquid crystal capacitor and the second liquid crystal capacitor may be differently set.

Figure 3:
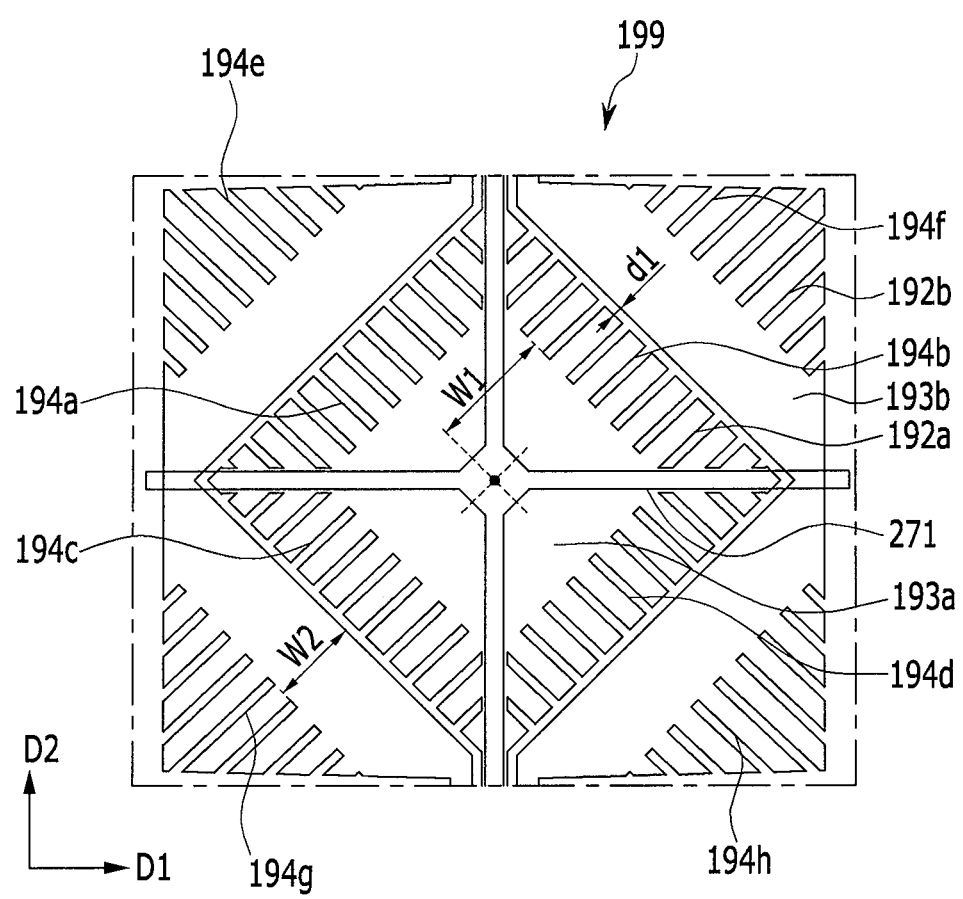
FIG. 3 is a plan view illustrating a basic region of a field generating electrode of the liquid crystal display according to the example embodiment of the present invention.

Next, a basic region of a field generating electrode of the liquid crystal display according to the example embodiment of the present invention will be described in more detail with reference to FIG. 3. FIG. 3 is a plan view illustrating a basic region of a field generating electrode of the liquid crystal display according to the example embodiment of the present invention.

As illustrated in FIG. 3, a basic electrode 199 of a field generating electrode of the liquid crystal display according to the example embodiment includes a cutout 271 of the common electrode 270 and a pixel electrode 191 including a first subpixel electrode 191a (including a first plate-shaped portion 193a and a plurality of first branch electrode 192a) and a second subpixel electrode 191b (including a second plate-shaped portion 193b and a plurality of second branch electrode 192b) facing each other. The second subpixel electrode 191b surrounds the first subpixel electrode 191a.

The cutout 271 of the common electrode 270 may have a cross shape in a plan view, e.g., when viewed from a planar form (state).

A plurality of first branch electrodes 192a is formed at an edge of the first subpixel electrode 191a. The plurality of first branch electrodes 192a is extended from the first plate-shaped portion 193a having a rhombus shape. That is, the first subpixel electrode 191a includes the first plate-shaped portion 193a positioned at the center and the plurality of first branch electrode 192a surrounding the first plate-shaped portion 193a and extended from the first plate-shaped portion 193a.

A central portion of the first plate-shaped portion 193a of the first subpixel electrode 191a is overlapped with a central portion of the cross-shaped cutout 271 formed at the common electrode 270.

The first branch electrodes 192a of the first subpixel electrode 191a are extended in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms which are positioned outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of approximately (about) 45° or 135° with a first direction D1. Further, two of the minute branches 194a, 194b, 194c, 194d, 194e, 196f, 194g, and 194h, which extend in different directions and are adjacent to each other, may be orthogonal to each other.

The liquid crystal display according to the example embodiment of the present invention may include two to four basic electrodes 199 illustrated in FIG. 3 in one pixel area.

Based on the first direction D1 in which the gate line 121 extends, and a direction which forms a first angle θ1 of about 45° with a second direction D2 in which the data line 171 extends, that is, a parallel direction with the extending direction of any one of the plurality of first branch electrodes 192a and the plurality of second branch electrodes 192b, a first width W1 of ½ of the entire width of the first plate-shaped portion 193a of the first subpixel electrode 191a may be about 25 μm or less. That is, based on the first direction D1 in which the gate line 121 extends, and the direction which forms the first angle θ1 of about 45° with the second direction D2 in which the data line 171 extends, that is, the parallel direction with the extending direction of any one of the plurality of first branch electrodes 192a and the plurality of second branch electrodes 192b, a measured length (e.g., half of the entire width) of the first subpixel electrode 191a may be about 25 μm or less.

Similarly, based on the first direction D1 in which the gate line 121 extends, and the direction which forms the first angle θ1 of about 45° with the second direction D2 in which the data line 171 extends, a second width W2 of the second plate-shaped portion 193b of the second subpixel electrode 191b may be about 25 μm or less. Similarly, based on the first direction D1 in which the gate line 121 extends, and the direction which forms the first angle θ1 of about 45° with the second direction D2 in which the data line 171 extends, a measured length of the second subpixel electrode 191b may be about 25 μm or less.

Further, lengths of the first branch electrode 192a of the first subpixel electrode 191a and the second branch electrode 192b of the second subpixel electrode 191b may be about 25 μm or less. Here, the lengths of the first branch electrode 192a of the first subpixel electrode 191a and the second branch electrode 192b of the second subpixel electrode 191b refer to lengths measured based on extending directions of the first branch electrode 192a of the first subpixel electrode 191a and the second branch electrode 192b of the second subpixel electrode 191b.

Based on the first direction D1 in which the gate line 121 extends, and the direction which forms the first angle θ1 of about 45° with the second direction D2 in which the data line 171 extends, a first distance d1 between the first branch electrode 192a of the first subpixel electrode 191a and the second plate-shaped portion 193b of the second subpixel electrode 191b, as a minimum distance between the first subpixel electrode 191a and the second subpixel electrode 191b, may be changed according to a ratio in voltage between the first subpixel electrode 191a and the second subpixel electrode 191b, that is, a ratio of a voltage applied to the second subpixel electrode 191b to a voltage applied to the first subpixel electrode 191a. In more detail, when the first distance d1 between the first branch electrode 192a of the first subpixel electrode 191a and the second plate-shaped portion 193b of the second subpixel electrode 191b is about 4 μm or less, the ratio of the voltage applied to the second subpixel electrode 191b to the voltage applied to the first subpixel electrode 191a may be about 0.83 or less. When the first distance d1 between the first branch electrode 192a of the first subpixel electrode 191a and the second plate-shaped portion 193b of the second subpixel electrode 191b is larger than about 4 μm and about 4.5 μm or less, the ratio of the voltage applied to the second subpixel electrode 191b to the voltage applied to the first subpixel electrode 191a may be about 0.75 or less. Further, when the first distance d1 between the first branch electrode 192a of the first subpixel electrode 191a and the second plate-shaped portion 193b of the second subpixel electrode 191b is larger than about 4.5 μm and smaller than about 5 μm, the ratio of the voltage applied to the second subpixel electrode 191b to the voltage applied to the first subpixel electrode 191a may be larger than about 0.7, and smaller than about 0.75. Further, when the first distance d1 between the first branch electrode 192a of the first subpixel electrode 191a and the second plate-shaped portion 193b of the second subpixel electrode 191b is about 5 μm or more, the ratio of the voltage applied to the second subpixel electrode 191b to the voltage applied to the first subpixel electrode 191a may be about 0.7 or less.

As such, as the first distance d1 between the first branch electrode 192a of the first subpixel electrode 191a and the second plate-shaped portion 193b of the second subpixel electrode 191b is decreased, the ratio of the voltage applied to the second subpixel electrode 191b to the voltage applied to the first subpixel electrode 191a may be increased. That is, as the first distance d1 between the first branch electrode 192a of the first subpixel electrode 191a and the second plate-shaped portion 193b of the second subpixel electrode 191b is decreased, the difference between the voltage applied to the second subpixel electrode 191b and the voltage applied to the first subpixel electrode 191a may be decreased. On the contrary, as the first distance d1 between the first branch electrode 192a of the first subpixel electrode 191a and the second plate-shaped portion 193b of the second subpixel electrode 191b is increased, the ratio of the voltage applied to the second subpixel electrode 191b to the voltage applied to the first subpixel electrode 191a may be decreased. That is, as the first distance d1 between the first branch electrode 192a of the first subpixel electrode 191a and the second plate-shaped portion 193b of the second subpixel electrode 191b is increased, the difference between the voltage applied to the second subpixel electrode 191b and the voltage applied to the first subpixel electrode 191a may be increased.

As the voltage ratio of the first subpixel electrode 191a and the second subpixel electrode 191b is decreased, the difference between the voltage applied to the second subpixel electrode 191b and the voltage applied to the first subpixel electrode 191a is increased, and as a result, directions of the liquid crystal molecules are controlled well on a boundary of the first subpixel electrode 191a and the second subpixel electrode 191b. However, when a magnitude of the voltage applied to the second subpixel electrode 191b is too much decreased compared with a magnitude of the voltage applied to the first subpixel electrode 191a, luminance in a region occupied by the second subpixel electrode 191b is reduced, and as a result, the entire luminance of the liquid crystal display is reduced.

Figure 4:
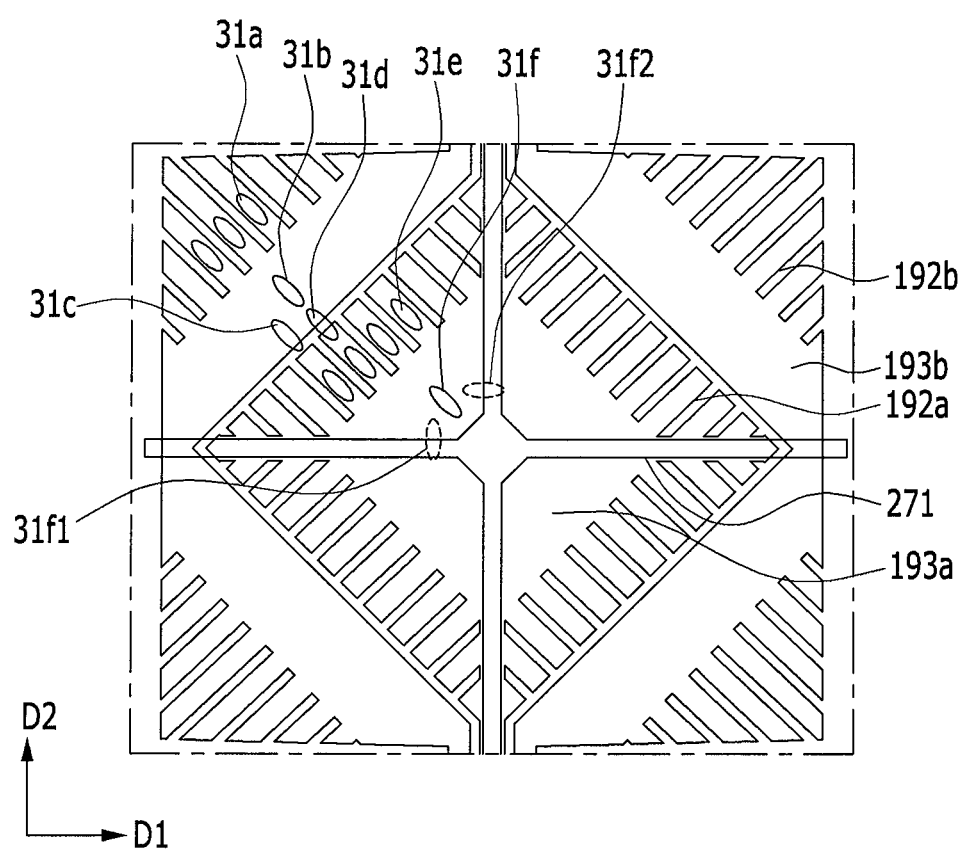
FIG. 4 is a schematic view illustrating alignment directions of directors of the liquid crystal molecules of the liquid crystal display according to the example embodiment of the present invention.

Next, alignment of the liquid crystal molecules in the basic region of the field generating electrode of the liquid crystal display according to the example embodiment of the present invention will be described with reference to FIGS. 4 and 5. FIG. 4 is a schematic view illustrating alignment directions of directors (e.g., the long axes and/or the short axes) of the liquid crystal molecules of the liquid crystal display according to the example embodiment of the present invention, and FIG. 5 is a cross-sectional view illustrating alignment directions of directors of the liquid crystal molecules of the liquid crystal display according to the example embodiment of the present invention.

Figure 5:
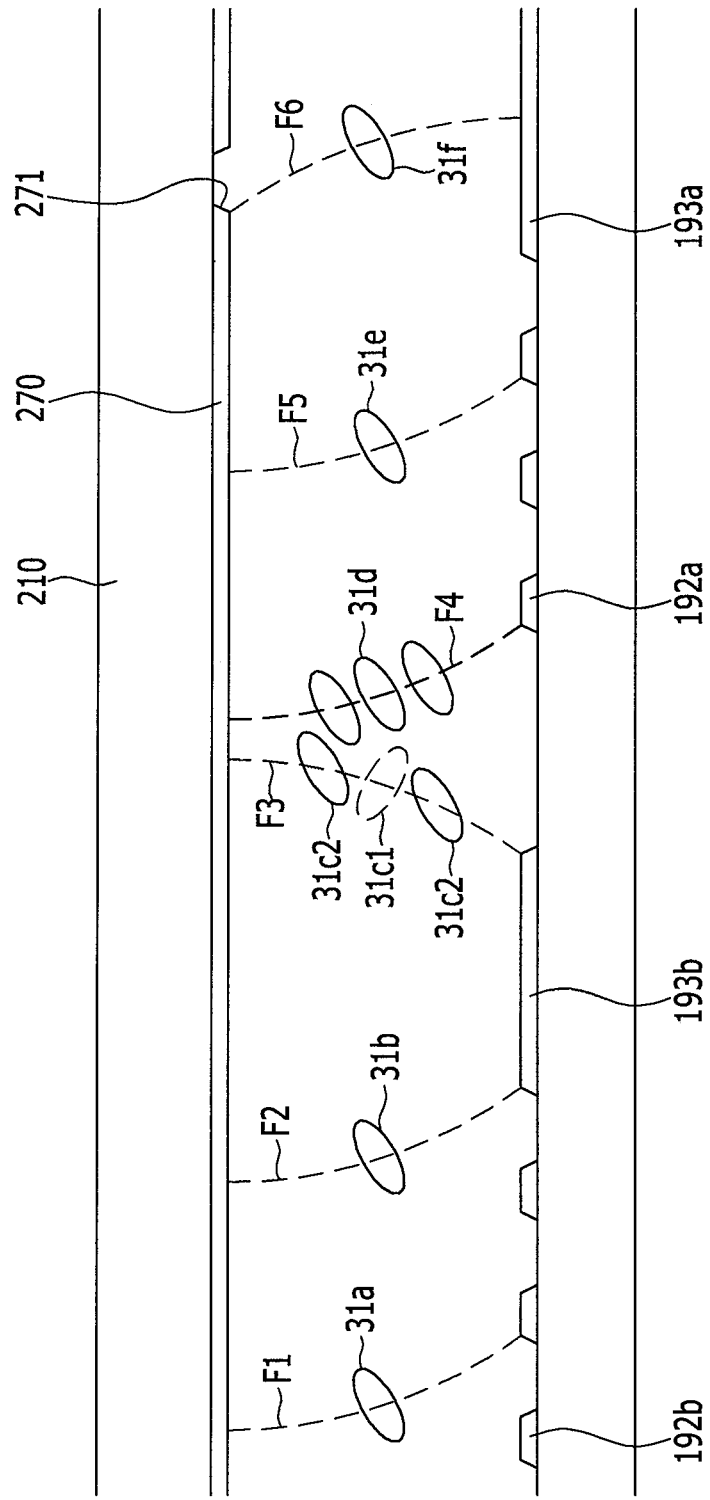
FIG. 5 is a cross-sectional view illustrating alignment directions of directors of the liquid crystal molecules of the liquid crystal display according to the example embodiment of the present invention.

Referring to FIGS. 4 and 5, a first fringe field F1 in a direction which is vertical (perpendicular) to an edge of the second branch electrode 192b of the second subpixel electrode 191b is generated, and as a result, the first liquid crystal molecules 31a positioned around the second branch electrode 192b are tilted in parallel with the direction of the first fringe field F1 and then collide with each other to be tilted in a parallel direction with (a direction parallel to) a longitudinal direction in which the second branch electrode 192b extends.

Second liquid crystal molecules 31b positioned at a first edge adjacent to the second branch electrode 192b among edges of the second plate-shaped portion 193b of the second subpixel electrode 191b are influenced by a second fringe field F2 generated at the first edge of the second plate-shaped portion 193b to be tilted in a direction which is vertical (perpendicular) to the first edge of the second plate-shaped portion 193b, and the direction is the same as the tilted directions of the first liquid crystal molecules 31a.

A third fringe field F3 is generated at a second edge adjacent to the first subpixel electrode 191a among the edges of the second plate-shaped portion 193b of the second subpixel electrode 191b, and a first portion 31c1 of third liquid crystal molecules 31c adjacent to the second edge which is adjacent to the first subpixel electrode 191a among the edges of the second plate-shaped portion 193b of the second subpixel electrode 191b is influenced by the third fringe field F3 to be tilted in a direction which is vertical (perpendicular) to the second edge of the second plate-shaped portion 193b. The direction is opposite to the directions in which the first liquid crystal molecules 31a and the second liquid crystal molecules 31b are tilted.

Further, a fourth fringe field F4 is generated at a third edge adjacent to the second plate-shaped portion 193b of the second subpixel electrode 191b among the edges of the first branch electrode 192a of the first subpixel electrode 191a, and fourth liquid crystal molecules 31d adjacent to the third edge of the first branch electrode 192a are tilted in a direction vertical (perpendicular) to the fourth fringe field F4. The direction is opposite to the directions in which the first liquid crystal molecules 31a and the second liquid crystal molecules 31b are tilted.

As described above, a magnitude of the voltage applied to the first subpixel electrode 191a is larger than a magnitude of the voltage applied to the second subpixel electrode 191b. Accordingly, the voltage difference between the first subpixel electrode 191a and the common electrode 270 is larger than the voltage difference between the second subpixel electrode 191b and the common electrode 270, and as a result, the magnitude of the fourth fringe field F4 is larger than the magnitude of the third fringe field F3. Therefore, a second portion 31c2 of the third liquid crystal molecules 31c adjacent to the second edge adjacent to the first subpixel electrode 191a is influenced by the fourth fringe field F4 to be tilted in a direction vertical (perpendicular) to the fourth fringe field F4. Accordingly, the first portion 31c1 of the third liquid crystal molecules 31c which is influenced by the third fringe field F3 to be tilted in the direction vertical (perpendicular) to the third fringe field F3 is also tilted in parallel to the second portion 31c2 of the third liquid crystal molecules 31c which is influenced by the fourth fringe field F4. As a result, the third liquid crystal molecules 31c positioned between the first subpixel electrode 191a and the second subpixel electrode 191b are tilted in the parallel direction with the second liquid crystal molecules 31b and the fourth liquid crystal molecules 31d therearound, and accordingly, the luminance of the liquid crystal display may be increased. In the case where the tilted directions of the liquid crystal molecules positioned on the boundary of the first subpixel electrode 191a and the second subpixel electrode 191b are different from the tilted directions of the liquid crystal molecules positioned to correspond to the first subpixel electrode 191a and the second subpixel electrode 191b, the boundary of the first subpixel electrode 191a and the second subpixel electrode 191b looks darker than the first subpixel electrode 191a and the second subpixel electrode 191b, and as a result, the entire luminance of the liquid crystal display is reduced.

Fifth liquid crystal molecules 31e corresponding to the first branch electrode 192a of the first subpixel electrode 191a are influenced by a fifth fringe field F5 generated at the edge of the first branch electrode 192a to be tilted in a parallel direction with the fifth fringe field F5, and then collide with each other to be tilted in the parallel direction with the longitudinal direction in which the first branch electrode 192a extends.

Further, a third portion 31f1 and a fourth portion 31f2 of sixth liquid crystal molecules 31f corresponding to the first plate-shaped portion 193a of the first subpixel electrode 191a are primarily tilted in a direction which is vertical (perpendicular) to the edge of the cutout 271 by the sixth fringe field F6 which is applied to the cross-shaped cutout 271 formed at the common electrode 270 and then secondarily aligned in a direction so that the deformation is reduced or minimized when the third portion 31f1 and the fourth portion 31f2 of the sixth liquid crystal molecules 31f meet each other, and the secondarily aligned direction becomes a vector sum direction of the directions for which the third portion 31f1 and the fourth portion 31f2 head (are oriented). Accordingly, the third portion 31f1 and the fourth portion 31f2 are tilted in a parallel direction with the longitudinal direction in which the first branch electrode 192a extends.

As such, according to the liquid crystal display according to the example embodiment of the present invention, the first subpixel electrode 191a to which a relatively high voltage is applied is formed at the center to be overlapped with the center of the cross-shaped cutout 271 of the common electrode 270, and the plurality of first branch electrode 192a is formed at the edge of the first subpixel electrode 191a. Further, the second subpixel electrode 191b to which a relatively low voltage is applied is positioned at the edge of the first subpixel electrode 191a, and the plurality of second branch electrodes 192b is formed at the edge of the second subpixel electrode 191b. In addition, by controlling the ratio of the voltages applied to the first subpixel electrode 191a and the second subpixel electrode 191b according to the first distance d1 between the first subpixel electrode 191a and the second subpixel electrode 191b, the liquid crystal molecules positioned on the boundary of the first subpixel electrode 191a and the second subpixel electrode 191b are tilted in parallel and in the same direction as the directions of the liquid crystal molecules corresponding to the first subpixel electrode 191a and the liquid crystal molecules corresponding to the second subpixel electrode 191b, and as a result, the luminance of the liquid crystal display is increased.

As described above, the first branch electrode 192a of the first subpixel electrode 191a and the second branch electrode 192b of the second subpixel electrode 191b have the plurality of minute branches 194a, 194b, 194c, 194d, 194e, 196f, 194g, and 194h which extend in different directions, and as a result, the liquid crystal molecules are tilted in different directions. Accordingly, a viewing angle of the liquid crystal display is increased.

Next, a first Experimental Example of the present invention will be described with reference to FIGS. 6 to 10. FIGS. 6 to 10 are electron micrographs illustrating a result of a first Experimental Example of the present invention.

In the Experimental Example, while a ratio of the voltage applied to the second subpixel electrode 191b to the voltage applied to the first subpixel electrode 191a is about 0.83, the first distance d1 between the first subpixel electrode 191a and the second subpixel electrode 191b is changed, and a change in luminance of the liquid crystal display is illustrated by an electron microscope.

Figure 6:
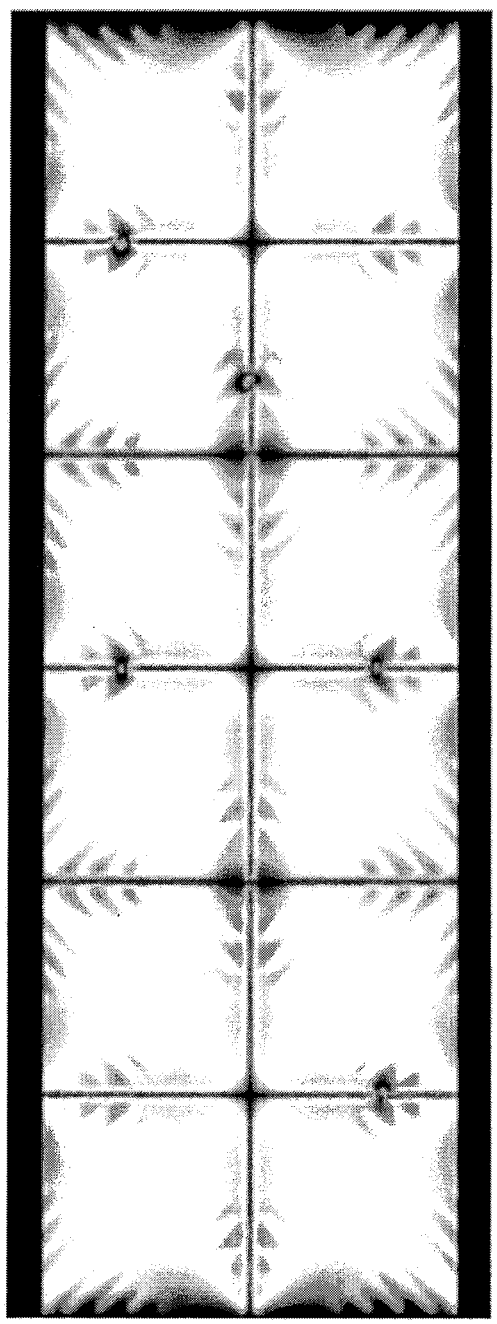
FIGS. 6 to 10 are electron micrographs illustrating a result of a first Experimental Example of the present invention.
Figure 7:
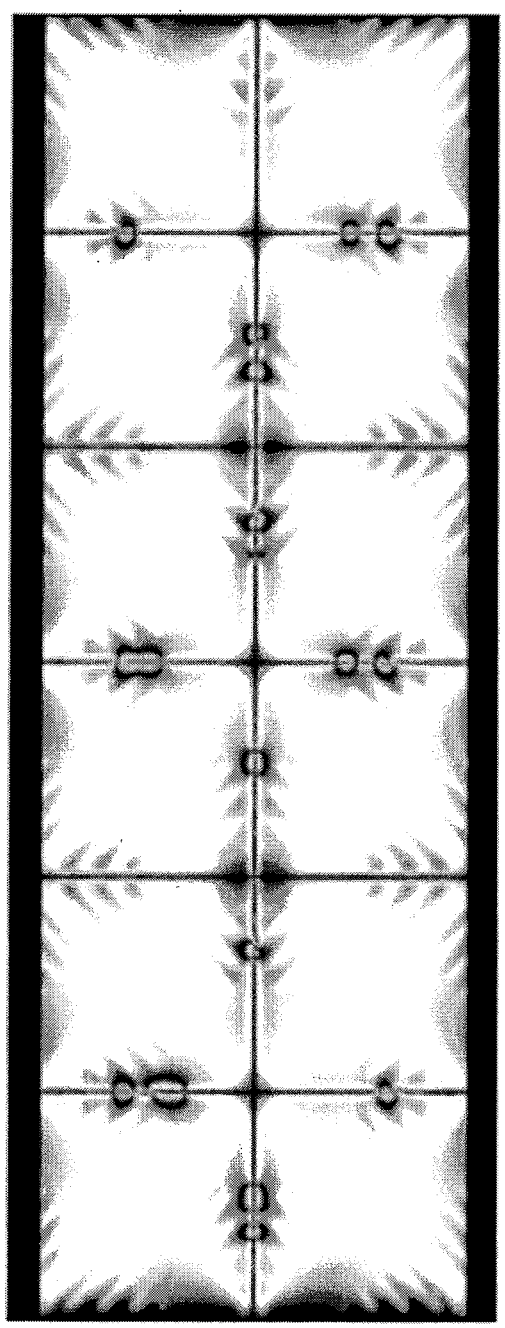
Figure 8:
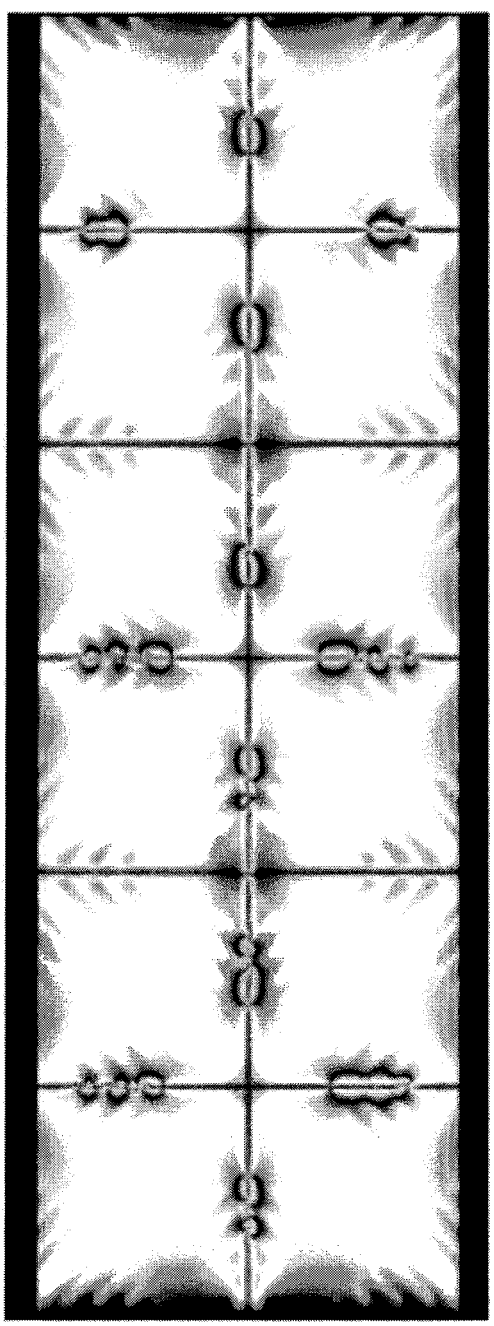
Figure 9:
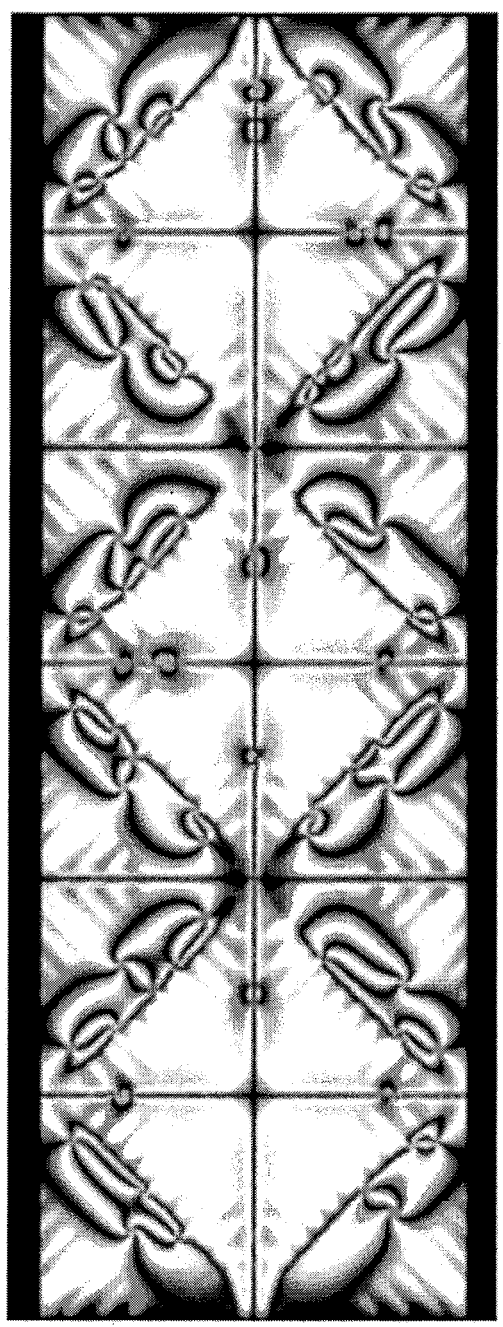
Figure 10:
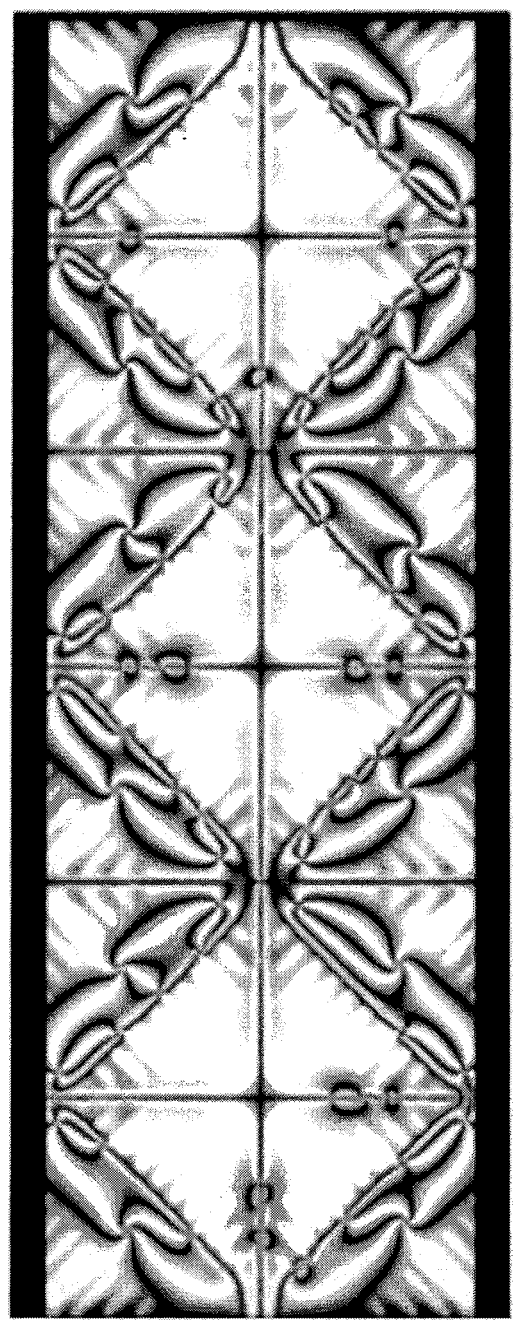

FIG. 6 illustrates a result of a case where the first distance d1 between the first subpixel electrode 191a and the second subpixel electrode 191b is about 3.0 µm, FIG. 7 illustrates a result of a case where the first distance d1 between the first subpixel electrode 191a and the second subpixel electrode 191b is about 3.5 µm, FIG. 8 illustrates a result of a case where the first distance d1 between the first subpixel electrode 191a and the second subpixel electrode 191b is about 4.0 µm, FIG. 9 illustrates a result of a case where the first distance d1 between the first subpixel electrode 191a and the second subpixel electrode 191b is about 4.5 µm, and FIG. 10 illustrates a result of a case where the first distance d1 between the first subpixel electrode 191a and the second subpixel electrode 191b is about 5.0 µm.

Referring to FIGS. 6 to 10, in the case where the ratio of the voltage applied to the second subpixel electrode 191b to the voltage applied to the first subpixel electrode 191a is about 0.83, when the first distance d1 between the first subpixel electrode 191a and the second subpixel electrode 191b is about 4.0 µm or less, the directions of the liquid crystal molecules are controlled well on the boundary of the first subpixel electrode 191a and the second subpixel electrode 191b. However, when the first distance d1 between the first subpixel electrode 191a and the second subpixel electrode 191b is larger than about 4.0 µm, the directions of the liquid crystal molecules are not controlled on the boundary of the first subpixel electrode 191a and the second subpixel electrode 191b and an irregular movement occurs, and as a result, it can be seen that the luminance of the liquid crystal display is reduced.

As such, in the liquid crystal display according to the example embodiment of the present invention, in the case where the first distance d1 between the first branch electrode 192a of the first subpixel electrode 191a and the second plate-shaped portion 193b of the second subpixel electrode 191b is about 4 µm or less, even though the ratio of the voltage applied to the second subpixel electrode 191b to the voltage applied to the first subpixel electrode 191a is formed up to about 0.83 or less, it can be seen that the directions of the liquid crystal molecules are controlled well on the boundary of the first subpixel electrode 191a and the second subpixel electrode 191b. As described above, as the ratio of the voltage applied to the second subpixel electrode 191b to the voltage applied to the first subpixel electrode 191a is decreased, the difference between the voltage applied to the first subpixel electrode 191a and the voltage applied to the second subpixel electrode 191b is increased, and as a result, the directions of the liquid crystal molecules are controlled better on the boundary of the first subpixel electrode 191a and the second subpixel electrode 191b.

Figure 11:
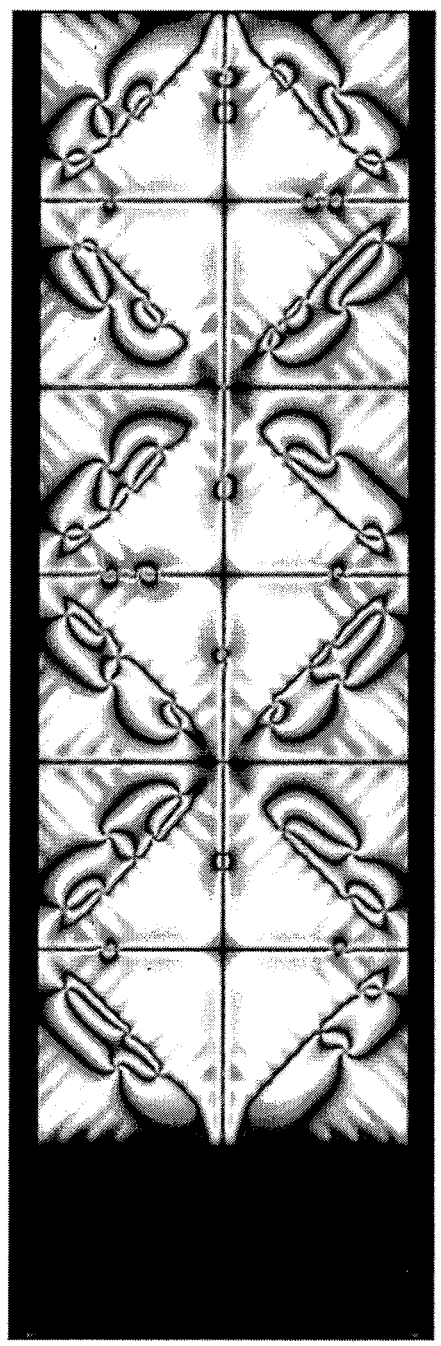
FIGS. 11 and 12 are electron micrographs illustrating a result of a second Experimental Example of the present invention.
Figure 12:
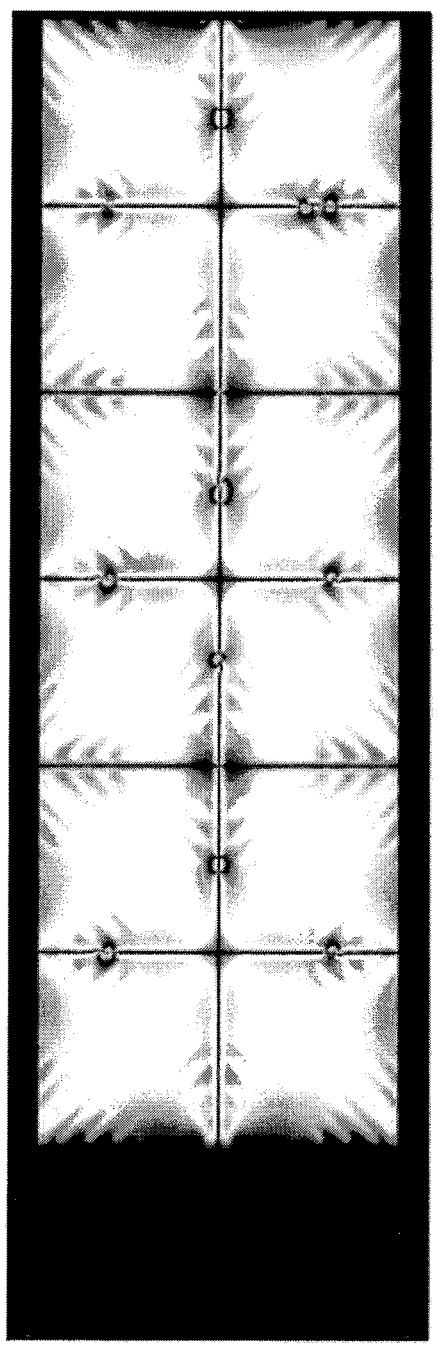

Next, a second Experimental Example of the present invention will be described with reference to FIGS. 11 and 12. FIGS. 11 and 12 are electron micrographs illustrating a result of a second Experimental Example of the present invention.

In this Experimental Example, the first distance d1 between the first branch electrode 192a of the first subpixel electrode 191a and the second plate-shaped portion 193b of the second subpixel electrode 191b is formed to be about 4.5 µm, and the ratio of the voltage applied to the second subpixel electrode 191b to the voltage applied to the first subpixel electrode 191a is about 0.83 (FIG. 11) or about 0.75 (FIG. 12). Changes in luminance of the liquid crystal display are illustrated by an electron microscope.

Referring to FIGS. 11 and 12, in the case where the first distance d1 between the first branch electrode 192a of the first subpixel electrode 191a and the second plate-shaped portion 193b of the second subpixel electrode 191b is about 4.5 µm, when the ratio of the voltage applied to the second subpixel electrode 191b to the voltage applied to the first subpixel electrode 191a is (needs to be) equal to or smaller than 0.75, it can be seen that the directions of the liquid crystal molecules are controlled on the boundary of the first subpixel electrode 191a and the second subpixel electrode 191b. In the case where the first distance d1 between the first branch electrode 192a of the first subpixel electrode 191a and the second plate-shaped portion 193b of the second subpixel electrode 191b is about 4.5 µm and the ratio of the voltage applied to the second subpixel electrode 191b to the voltage applied to the first subpixel electrode 191a is formed up to about 0.83, it can be seen that the directions of the liquid crystal molecules are not controlled well on the boundary of the first subpixel electrode 191a and the second subpixel electrode 191b and an irregular movement occurs, and as a result, the luminance of the liquid crystal display is reduced.

Figure 13:
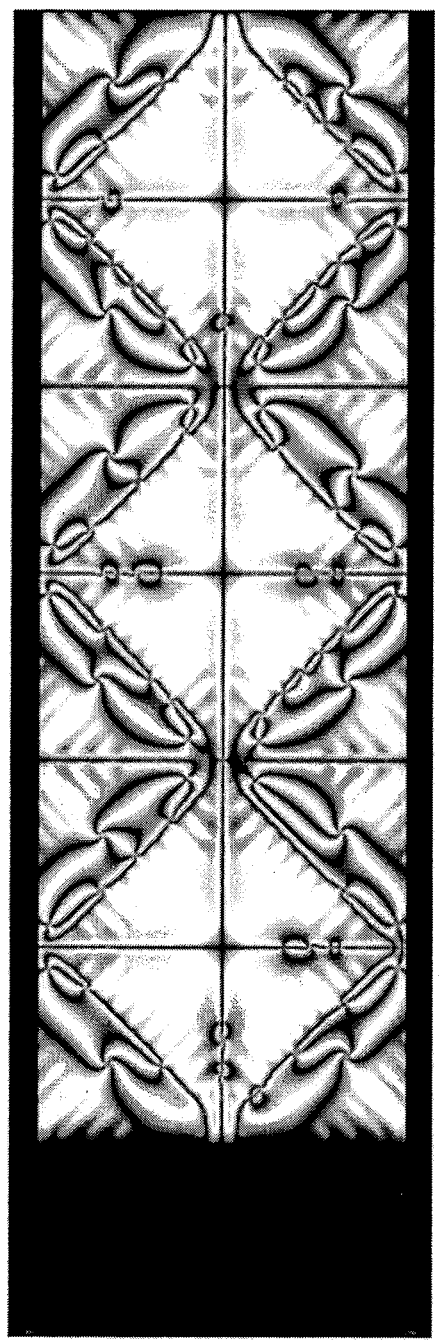
FIGS. 13 and 14 are electron micrographs illustrating a result of a third Experimental Example of the present invention.
Figure 14:
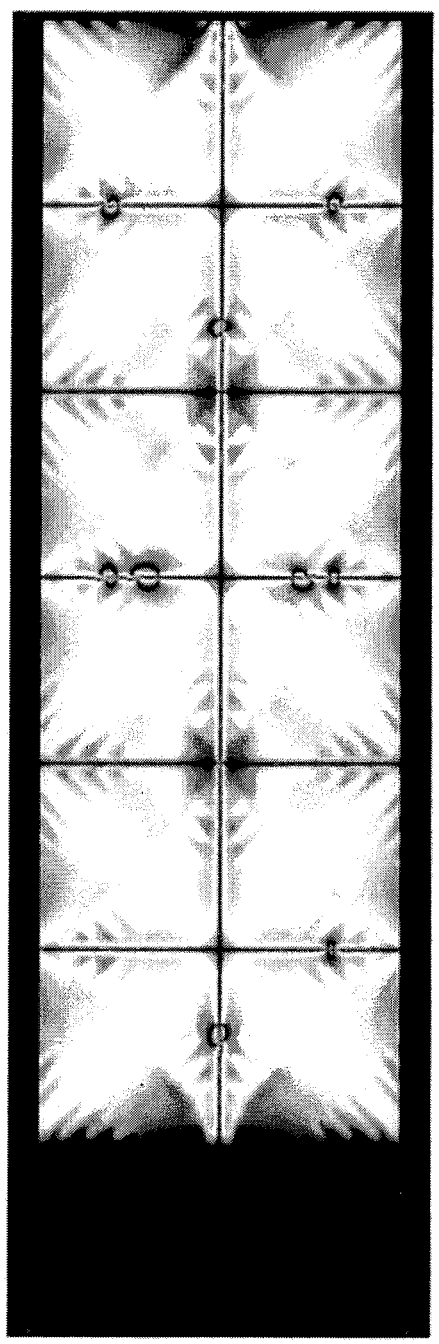

Next, another Experimental Example of the present invention will be described with reference to FIGS. 13 and 14. FIGS. 13 and 14 are electron micrographs illustrating a result of a third Experimental Example of the present invention.

In this Experimental Example, the first distance d1 between the first branch electrode 192a of the first subpixel electrode 191a and the second plate-shaped portion 193b of the second subpixel electrode 191b is formed to be about 5.0 µm, and the ratio of the voltage applied to the second subpixel electrode 191b to the voltage applied to the first subpixel electrode 191a is about 0.75 (FIG. 13) and about 0.70 (FIG. 14). Changes in luminance of the liquid crystal display are illustrated by an electron microscope.

Referring to FIGS. 13 and 14, in the case where the first distance d1 between the first branch electrode 192a of the first subpixel electrode 191a and the second plate-shaped portion 193b of the second subpixel electrode 191b is about 5.0 µm, when the ratio of the voltage applied to the second subpixel electrode 191b to the voltage applied to the first subpixel electrode 191a is (needs to be) equal to or smaller than 0.70, it can be seen that the directions of the liquid crystal molecules are controlled on the boundary of the first subpixel electrode 191a and the second subpixel electrode 191b. In the case where the first distance d1 between the first branch electrode 192a of the first subpixel electrode 191a and the second plate-shaped portion 193b of the second subpixel electrode 191b is about 5.0 µm and the ratio of the voltage applied to the second subpixel electrode 191b to the voltage applied to the first subpixel electrode 191a is formed up to about 0.75, it can be seen that the directions of the liquid crystal molecules are not controlled on the boundary of the first subpixel electrode 191a and the second subpixel electrode 191b and an irregular movement occurs, and as a result, the luminance of the liquid crystal display is reduced.

As such, in the liquid crystal display according to the example embodiment of the present invention, in the case where the first distance d1 between the first branch electrode 192a of the first subpixel electrode 191a and the second plate-shaped portion 193b of the second subpixel electrode 191b is about 4.0 µm or less, the ratio of the voltage applied to the second subpixel electrode 191b to the voltage applied to the first subpixel electrode 191a is formed to be about 0.83 or less; in the case where the first distance d1 between the first branch electrode 192a of the first subpixel electrode 191a and the second plate-shaped portion 193b of the second subpixel electrode 191b is larger than about 4.0 and about 4.5 µm or less, the ratio of the voltage applied to the second subpixel electrode 191b to the voltage applied to the first subpixel electrode 191a is formed to be about 0.75 or less; in the case where the first distance d1 between the first branch electrode 192a of the first subpixel electrode 191a and the second plate-shaped portion 193b of the second subpixel electrode 191b is larger than about 4.5 and smaller than about 5.0 µm, the ratio of the voltage applied to the second subpixel electrode 191b to the voltage applied to the first subpixel electrode 191a is formed to be smaller than a first value which is larger than about 0.7 and smaller than about 0.75; and in the case where the first distance d1 between the first branch electrode 192a of the first subpixel electrode 191a and the second plate-shaped portion 193b of the second subpixel electrode 191b is about 5.0 µm or more, the ratio of the voltage applied to the second subpixel electrode 191b to the voltage applied to the first subpixel electrode 191a is formed to be smaller than a first value which is about 0.7 or less. It can be seen that the directions of the liquid crystal molecules are controlled on the boundary of the first subpixel electrode 191a and the second subpixel electrode 191b.

According to the liquid crystal display according to the example embodiment of the present invention, by forming the first subpixel electrode to which the relatively high voltage is applied at the center of the pixel area, forming the second subpixel electrode at the outside of the first subpixel electrode, and controlling the ratio of the voltages applied to the first subpixel electrode and the second subpixel electrode according to the distance between the first subpixel electrode and the second subpixel electrode, the directions of the liquid crystal molecules are controlled on the boundary of the first subpixel electrode 191a and the second subpixel electrode 191b, and as a result, the luminance of the liquid crystal display is increased. Further, even while the tilted directions of the liquid crystal molecules of the liquid crystal display are varied, the luminance of the liquid crystal display may be increased by forming the plurality of branch electrodes at the outer edges of the first subpixel electrode and the second subpixel electrode, as compared with the case of forming the plurality of branch electrodes over all of the first subpixel electrode and the second subpixel electrode.

Figure 15:
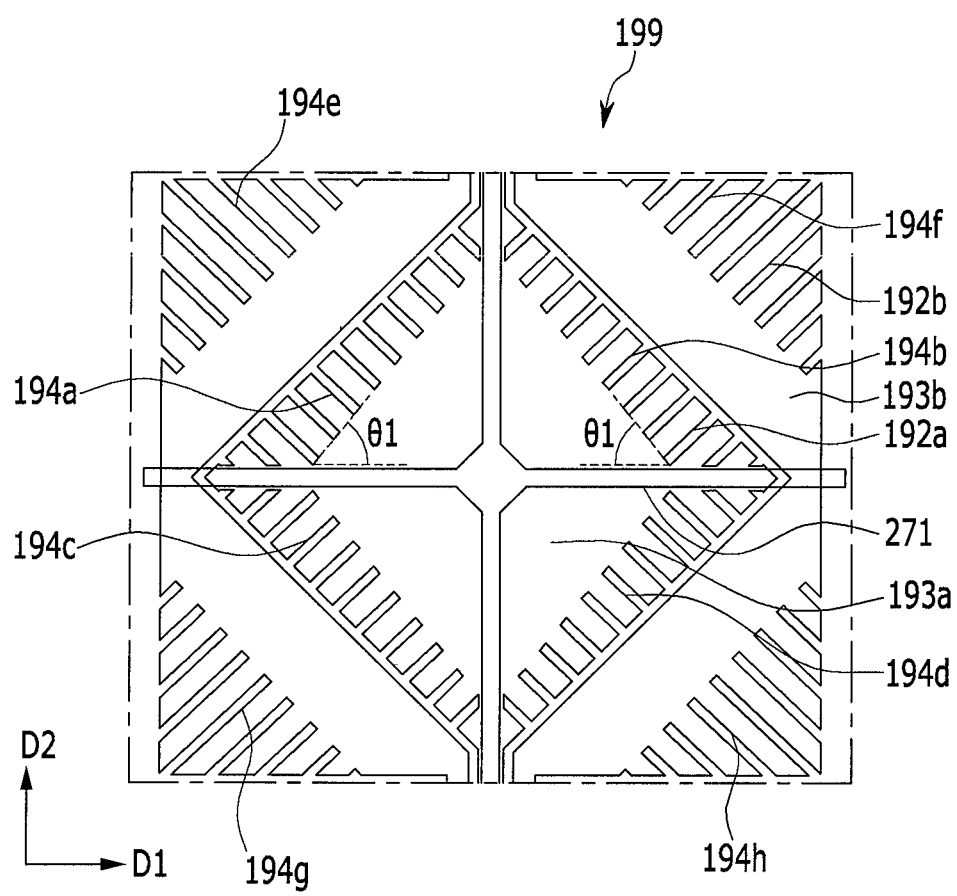
FIG. 15 is a plan view illustrating a basic region of a field generating electrode of a liquid crystal display according to another example embodiment of the present invention.

Next, a basic region of a field generating electrode of a liquid crystal display according to another example embodiment of the present invention will be described in more detail with reference to FIG. 15. FIG. 15 is a plan view illustrating a basic region of a field generating electrode of the liquid crystal display according to another example embodiment of the present invention.

Referring to FIG. 15, the basic region of the field generating electrode of the liquid crystal display according to the present example embodiment is similar to the basic region of the field generating electrode of the liquid crystal display according to the example embodiment illustrated in FIG. 3.

As illustrated in FIG. 15, a basic electrode 199 of the field generating electrode of the liquid crystal display according to the example embodiment includes a cutout 271 of the common electrode 270 and a pixel electrode 191 including a first subpixel electrode 191a (including a first plate-shaped portion 193a and a plurality of first branch electrodes 192a) and a second subpixel electrode 191b (including a second plate-shaped portion 193b and a plurality of second branch electrodes 192b) facing each other. The second subpixel electrode 191b surrounds the first subpixel electrode 191a.

The cutout 271 of the common electrode 270 may have a cross shape in a plan view, e.g., when viewed from the planar form (state).

A plurality of first branch electrodes 192a is formed at an edge of the first subpixel electrode 191a. The plurality of first branch electrodes 192a is extended from a first plate portion 193a having a rhombus shape. That is, the first subpixel electrode 191a includes the first plate-shaped portion 193a positioned at the center, and a plurality of first branch electrodes 192a, which surrounds the first plate-shaped portion 193a and is extended from the first plate-shaped portion 193a.

The central portion of the first plate-shaped portion 193a of the first subpixel electrode 191a is overlapped with a central portion of the cross-shaped cutout 271 formed at the common electrode 270.

The first branch electrodes 192a of the first subpixel electrode 191a extend in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms which are positioned outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of about 45° or 135° with a first direction D1 in which the gate line 121 extends. Further, two of the minute branches 194a, 194b, 194c, 194d, 194e, 196f, 194g, and 194h, which extend in different directions and are adjacent to each other, may be orthogonal to each other.

The edge of the first plate-shaped portion 193a of the first subpixel electrode 191a of the basic electrode 199 of the liquid crystal display according to the example embodiment forms an angle of larger than about 45° or smaller than about 135° with the first direction D1 in which the gate line 121 extends. In more detail, the first angle θ1 between the edge of the first plate-shaped portion 193a of the first subpixel electrode 191a and the first direction D1 in which the gate line 121 extends is larger than about 45°. That is, among widths of the first plate-shaped portion 193a of the first subpixel electrode 191a of the basic electrode 199 in the liquid crystal display, a first width measured in the first direction D1 in which the gate line 121 extends is smaller than a second width measured in a vertical (perpendicular) direction to the first direction D1.

The liquid crystal molecules at the edge of the first plate-shaped portion 193a of the first subpixel electrode 191a of the basic electrode 199 are tilted in the direction which is vertical (perpendicular) to the edge of the first plate-shaped portion 193a, by the fringe field applied in the direction which is vertical (perpendicular) to the edge of the first plate-shaped portion 193a.

The liquid crystal molecules around the first branch electrode 192a of the first subpixel electrode 191a and the second branch electrode 192b of the second subpixel electrode 191b are tilted in a parallel direction with the longitudinal directions of the first branch electrode 192a of the first subpixel electrode 191a and the second branch electrode 192b of the second subpixel electrode 191b, respectively. That is, the liquid crystal molecules are tilted in a direction which forms an angle of about 45° or about 135° with the first direction D1.

According to the liquid crystal display according to the example embodiment, the angle between the edge of the first plate-shaped portion 193a of the first subpixel electrode 191a and the first direction D1 in which the gate line 121 extends is formed to be different from 45°, and as a result, the tilted directions of the liquid crystal molecules around the edge of the first plate-shaped portion 193a of the first subpixel electrode 191a of the basic electrode 199 do not form an angle of about 45° or about 135° with the first direction D1; and the liquid crystal molecules around the first branch electrode 192a of the first subpixel electrode 191a and the second branch electrode 192b of the second subpixel electrode 191b are tilted in the directions which form an angle of about 45° or about 135° with the first direction D1.

As such, the tilted directions of the liquid crystal molecules are varied, and as a result, visibility at the side of the liquid crystal display may be improved.

Further, as described above, according to the liquid crystal display according to the example embodiment of the present invention, the first subpixel electrode 191a to which a relatively high voltage is applied is formed at the center to be overlapped with the center of the cross-shaped cutout 271 of the common electrode 270, and the plurality of first branch electrode 192a is formed at the edge of the first subpixel electrode 191a. Further, the second subpixel electrode 191b (to which a relatively low voltage is applied) is positioned at the edge of the first subpixel electrode 191a, and the plurality of second branch electrodes 192b is formed at the edge of the second subpixel electrode 191b. In addition, by controlling the ratio of the voltages applied to the first subpixel electrode 191a and the second subpixel electrode 191b according to the first distance d1 between the first subpixel electrode 191a and the second subpixel electrode 191b, the liquid crystal molecules positioned on the boundary of the first subpixel electrode 191a and the second subpixel electrode 191b are tilted in parallel and in the same direction as the directions of the liquid crystal molecules corresponding to the first subpixel electrode 191a and the liquid crystal molecules corresponding to the second subpixel electrode 191b, and as a result, the luminance of the liquid crystal display is increased.

As described above, the first branch electrode 192a of the first subpixel electrode 191a and the second branch electrode 192b of the second subpixel electrode 191b have the plurality of minute branches 194a, 194b, 194c, 194d, 194e, 196f, 194g, and 194h which extend in different directions, and as a result, the liquid crystal molecules are tilted in different directions. Accordingly, a viewing angle of the liquid crystal display is increased.

Figure 16:
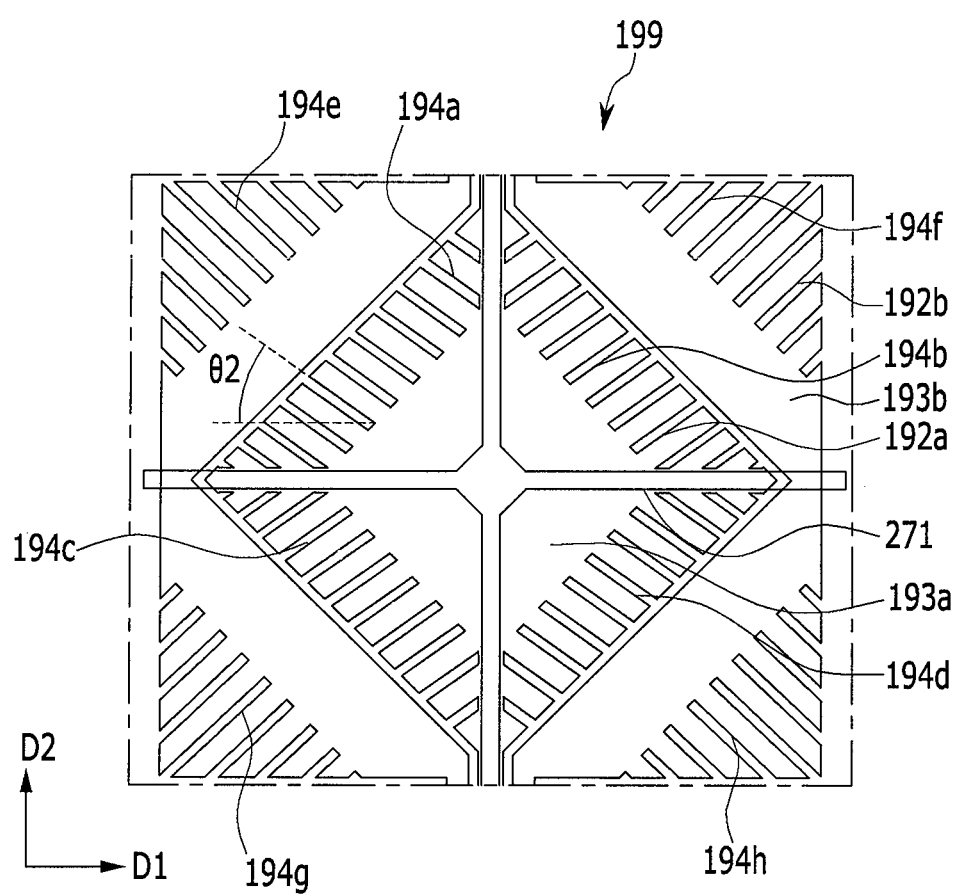
FIG. 16 is a plan view illustrating a basic region of a field generating electrode of a liquid crystal display according to another example embodiment of the present invention.

Next, a basic region of a field generating electrode of the liquid crystal display according to another example embodiment of the present invention will be described in more detail with reference to FIG. 16. FIG. 16 is a plan view illustrating a basic region of a field generating electrode of the liquid crystal display according to the example embodiment of the present invention.

Referring to FIG. 16, the basic region of the field generating electrode of the liquid crystal display according to the present example embodiment is similar to the basic region of the field generating electrode of the liquid crystal display according to the example embodiment illustrated in FIG. 3.

As illustrated in FIG. 16, a basic electrode 199 of the field generating electrode of the liquid crystal display according to the example embodiment includes a cutout 271 of the common electrode 270 and a pixel electrode 191 including a first subpixel electrode 191a and a second subpixel electrode 191*b* facing each other. The second subpixel electrode 191*b* surrounds the first subpixel electrode 191*a*.

The cutout 271 of the common electrode 270 may have a cross shape in a plan view, e.g., when viewed from the planar form (state).

A plurality of first branch electrodes 192*a* is formed at an edge of the first subpixel electrode 191*a*. The plurality of first branch electrodes 192*a* is extended from a first plate portion 193*a* having a rhombus shape. That is, the first subpixel electrode 191*a* includes the first plate-shaped portion 193*a* positioned at the center and a plurality of first branch electrodes 192*a*, which surrounds the first plate-shaped portion 193*a* and is extended from the first plate-shaped portion 193*a*.

The central portion of the first plate-shaped portion 193*a* of the first subpixel electrode 191*a* is overlapped with a central portion of the cross-shaped cutout 271 formed at the common electrode 270.

The first branch electrodes 192*a* of the first subpixel electrode 191*a* extend in different directions. In more detail, the first branch electrodes 192*a* include a plurality of first minute branches 194*a* which obliquely extends in an upper left direction from the first plate-shaped portion 193*a*, a plurality of second minute branches 194*b* which obliquely extends in an upper right direction, a plurality of third minute branches 194*c* which obliquely extends in a lower left direction, and a plurality of fourth minute branches 194*d* which obliquely extends in a lower right direction.

The first branch electrode 192*a* of the first subpixel electrode 191*a* may form an angle of smaller than about 45° or lager than about 135° with the first direction D1 in which the gate line 121 extends. In more detail, a second angle θ2 between the first branch electrode 192*a* of the first subpixel electrode 191*a* and the first direction D1 in which the gate line 121 extends is smaller than about 45° or lager than about 135°.

The second subpixel electrode 191*b* includes a second plate-shaped portion 193*b* surrounding the plurality of first branch electrodes 192*a* of the first subpixel electrode 191*a*, and a plurality of second branch electrodes 192*b* surrounding the second plate-shaped portion 193*b* and extended from the second plate-shaped portion 193*b*.

The second plate-shaped portion 193*b* of the second subpixel electrode 191*b* has a planar shape formed by combining four parallelograms which are positioned outside of the first to fourth minute branches 194*a*, 194*b*, 194*c*, and 194*d* of the first subpixel electrode 191*a*. Similarly to the first branch electrodes 192*a* of the first subpixel electrode 191*a*, the plurality of second branch electrodes 192*b* of the second subpixel electrode 191*b* include a plurality of fifth minute branches 194*e* which obliquely extends in an upper left direction from the second plate-shaped portion 193*b*, a plurality of sixth minute branches 194*f* which obliquely extends in an upper right direction, a plurality of seventh minute branches 194*g* which obliquely extends in a lower left direction, and a plurality of eighth minute branches 194*h* which obliquely extends in a lower right direction.

The fifth to eighth minute branches 194*e*, 196*f*, 194*g*, and 194*h* may form an angle of approximately (about) 45° or 135° with the first direction D1 in which the gate line 121 extends.

As described above, a second angle 82 between the first branch electrode 192*a* of the first subpixel electrode 191*a* of the basic electrode 199 of the liquid crystal display according to the example embodiment and the first direction D1 in which the gate line 121 extends is smaller than about 45° or larger than about 135°.

The liquid crystal molecules around the first branch electrode 192*a* of the first subpixel electrode 191*a* and the second branch electrode 192*b* of the second subpixel electrode 191*b* are tilted in a parallel direction with the longitudinal directions of the first branch electrode 192*a* of the first subpixel electrode 191*a* and the second branch electrode 192*b* of the second subpixel electrode 191*b*, respectively. That is, the liquid crystal molecules around the first branch electrode 192*a* are tilted in the direction which forms an angle of smaller than about 45° or larger than about 135° with the direction D1, and the liquid crystal molecules around second branch electrode 192*b* are tilted in the direction which forms an angle of about 45° or about 135° with the direction D1.

As such, the tilted directions of the liquid crystal molecules are varied, and as a result, visibility at the side of the liquid crystal display may be improved.

Further, as described above, according to the liquid crystal display according to the example embodiment of the present invention, the first subpixel electrode 191*a* to which a relatively high voltage is applied is formed at the center to be overlapped with the center of the cross-shaped cutout 271 of the common electrode 270, and the plurality of first branch electrode 192*a* is formed at the edge of the first subpixel electrode 191*a*. Further, the second subpixel electrode 191*b* to which a relatively low voltage is applied is positioned at the edge of the first subpixel electrode 191*a*, and the plurality of second branch electrodes 192*b* is formed at the edge of the second subpixel electrode 191*b*. In addition, by controlling the ratio of the voltages applied to the first subpixel electrode 191*a* and the second subpixel electrode 191*b* according to the first distance d1 between the first subpixel electrode 191*a* and the second subpixel electrode 191*b*, the liquid crystal molecules positioned on the boundary of the first subpixel electrode 191*a* and the second subpixel electrode 191*b* are tilted in parallel and in the same direction as the directions of the liquid crystal molecules corresponding to the first subpixel electrode 191*a* and the liquid crystal molecules corresponding to the second subpixel electrode 191*b*, and as a result, the luminance of the liquid crystal display is increased.

As described above, the first branch electrode 192*a* of the first subpixel electrode 191*a* and the second branch electrode 192*b* of the second subpixel electrode 191*b* have the plurality of minute branches 194*a*, 194*b*, 194*c*, 194*d*, 194*e*, 196*f*, 194*g*, and 194*h* which extend in different directions, and as a result, the liquid crystal molecules are tilted in different directions. Accordingly, a viewing angle of the liquid crystal display is increased.

Figure 17:
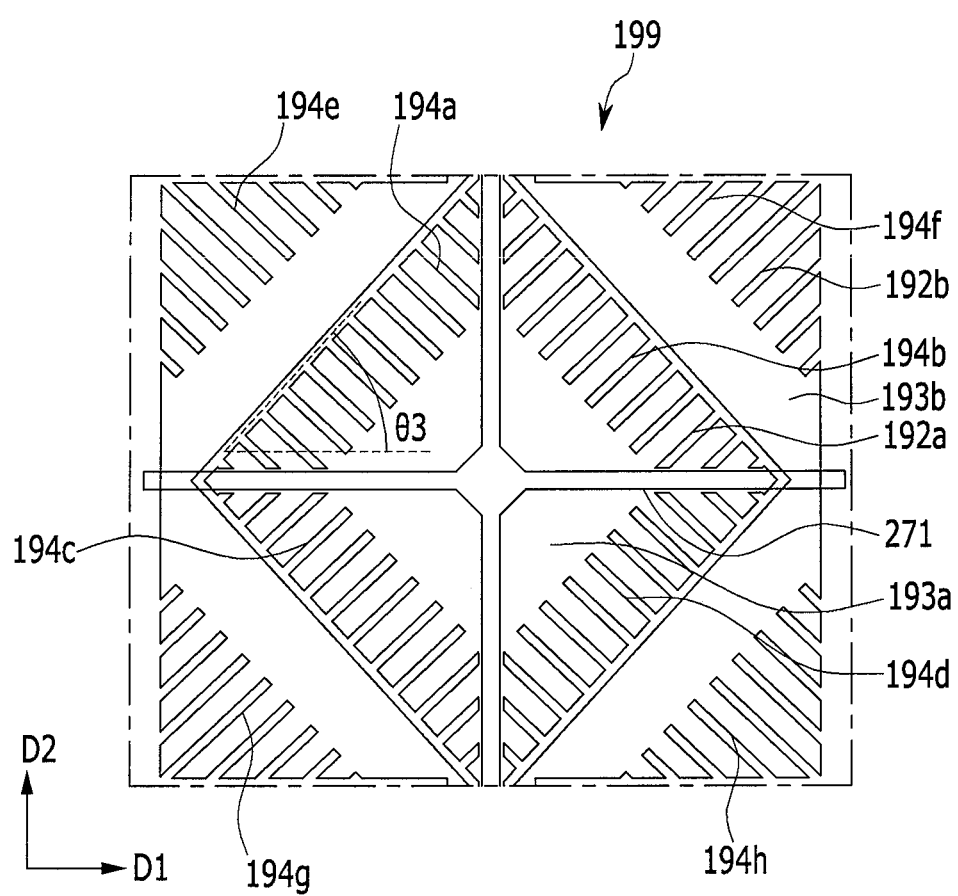
FIG. 17 is a plan view illustrating a basic region of a field generating electrode of a liquid crystal display according to another example embodiment of the present invention.

Next, a basic region of a field generating electrode of the liquid crystal display according to another example embodiment of the present invention will be described with reference to FIG. 17. FIG. 17 is a plan view illustrating a basic region of a field generating electrode of the liquid crystal display according to another example embodiment of the present invention.

Referring to FIG. 17, the basic region of the field generating electrode of the liquid crystal display according to the present example embodiment is almost similar to the basic region of the field generating electrode of the liquid crystal display according to the example embodiment illustrated in FIG. 3.

As illustrated in FIG. 17, a basic electrode 199 of the field generating electrode of the liquid crystal display according to the example embodiment includes a cutout 271 of the common electrode 270 and a pixel electrode 191 including a first subpixel electrode 191*a* (including a first plate-shaped portion 193a and a plurality of first branch electrodes 192a) and a second subpixel electrode 191b (including a second plate-shaped portion 193b and a plurality of second branch electrodes 192b) facing each other. The second subpixel electrode 191b surrounds the first subpixel electrode 191a.

The cutout 271 of the common electrode 270 may have a cross shape in a plan view, e.g., when viewed from the planar form (state).

A plurality of first branch electrodes 192a is formed at an edge of the first subpixel electrode 191a. The plurality of first branch electrodes 192a is extended from a first plate portion 193a having a rhombus shape. That is, the first subpixel electrode 191a includes the first plate-shaped portion 193a positioned at the center and a plurality of first branch electrodes 192a, which surrounds the first plate-shaped portion 193a and is extended from the first plate-shaped portion 193a.

The central portion of the first plate-shaped portion 193a of the first subpixel electrode 191a is overlapped with a central portion of the cross-shaped cutout 271 formed at the common electrode 270.

The first branch electrodes 192a of the first subpixel electrode 191a extend in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms which are positioned outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of approximately (about) 45° or 135° with a first direction D1 in which the gate line 121 extends. Further, two of the minute branches 194a, 194b, 194c, 194d, 194e, 196f, 194g, and 194h, which extend in different directions and are adjacent to each other, may be orthogonal to each other.

An edge of the second plate-shaped portion 193b of the second subpixel electrode 191b adjacent to the first branch electrode 192a of the first subpixel electrode 191a of the basic electrode 199 of the liquid crystal display according to the example embodiment forms an angle of larger than about 45° or smaller than about 135° with the first direction D1 in which the gate line 121 extends. In more detail, a third angle θ3 between the edge of the second plate-shaped portion 193b of the second subpixel electrode 191b adjacent to the first branch electrode 192a of the first subpixel electrode 191a and the first direction 131 in which the gate line 121 extends is larger than about 45° or smaller than about 135°.

The liquid crystal molecules at the edge of the second plate-shaped portion 193b of the second subpixel electrode 191b of the basic electrode 199 are tilted in the direction which is vertical (perpendicular) to the edge of the second plate-shaped portion 193b, by the fringe field applied in the direction which is vertical (perpendicular) to the edge of the second plate-shaped portion 193b.

The liquid crystal molecules around the first branch electrode 192a of the first subpixel electrode 191a and the second branch electrode 192b of the second subpixel electrode 191b are tilted in a parallel direction with the longitudinal directions of the first branch electrode 192a of the first subpixel electrode 191a and the second branch electrode 192b of the second subpixel electrode 191b, respectively. That is, the liquid crystal molecules are tilted in a direction which forms an angle of about 45° or about 135° with the first direction D1.

According to the liquid crystal display according to the example embodiment, the angle between the edge of the second plate-shaped portion 193b of the second subpixel electrode 191b adjacent to the first branch electrode 192a of the first subpixel electrode 191a and the first direction D1 in which the gate line 121 extends is formed to be different from 45°, and as a result, the tilted directions of the liquid crystal molecules around the edge of the first plate-shaped portion 193a of the first subpixel electrode 191a of the basic electrode 199 do not form an angle of about 45° or about 135° with the first direction D1, and the liquid crystal molecules around the first branch electrode 192a of the first subpixel electrode 191a and the second branch electrode 192b of the second subpixel electrode 191b are tilted in the directions which form an angle of about 45° or about 135° with the first direction D1.

As such, the tilted directions of the liquid crystal molecules are varied, and as a result, visibility at the side of the liquid crystal display may be improved.

Further, as described above, according to the liquid crystal display according to the example embodiment of the present invention, the first subpixel electrode 191a to which a relatively high voltage is applied is formed at the center to be overlapped with the center of the cross-shaped cutout 271 of the common electrode 270, and the plurality of first branch electrode 192a is formed at the edge of the first subpixel electrode 191a. Further, the second subpixel electrode 191b (to which a relatively low voltage is applied) is positioned at the edge of the first subpixel electrode 191a, and the plurality of second branch electrodes 192b is formed at the edge of the second subpixel electrode 191b. In addition, by controlling the ratio of the voltages applied to the first subpixel electrode 191a and the second subpixel electrode 191b according to the first distance d1 between the first subpixel electrode 191a and the second subpixel electrode 191b, the liquid crystal molecules positioned on the boundary of the first subpixel electrode 191a and the second subpixel electrode 191b are tilted in parallel and in the same direction as the directions of the liquid crystal molecules corresponding to the first subpixel electrode 191a and the liquid crystal molecules corresponding to the second subpixel electrode 191b, and as a result, the luminance of the liquid crystal display is increased.

As described above, the first branch electrode 192a of the first subpixel electrode 191a and the second branch electrode 192b of the second subpixel electrode 191b have the plurality of minute branches 194a, 194b, 194c, 194d, 194e, 196f, 194g, and 194h which extend in different directions, and as a result, the liquid crystal molecules are tilted in different directions. Accordingly, a viewing angle of the liquid crystal display is increased.

Figure 18:
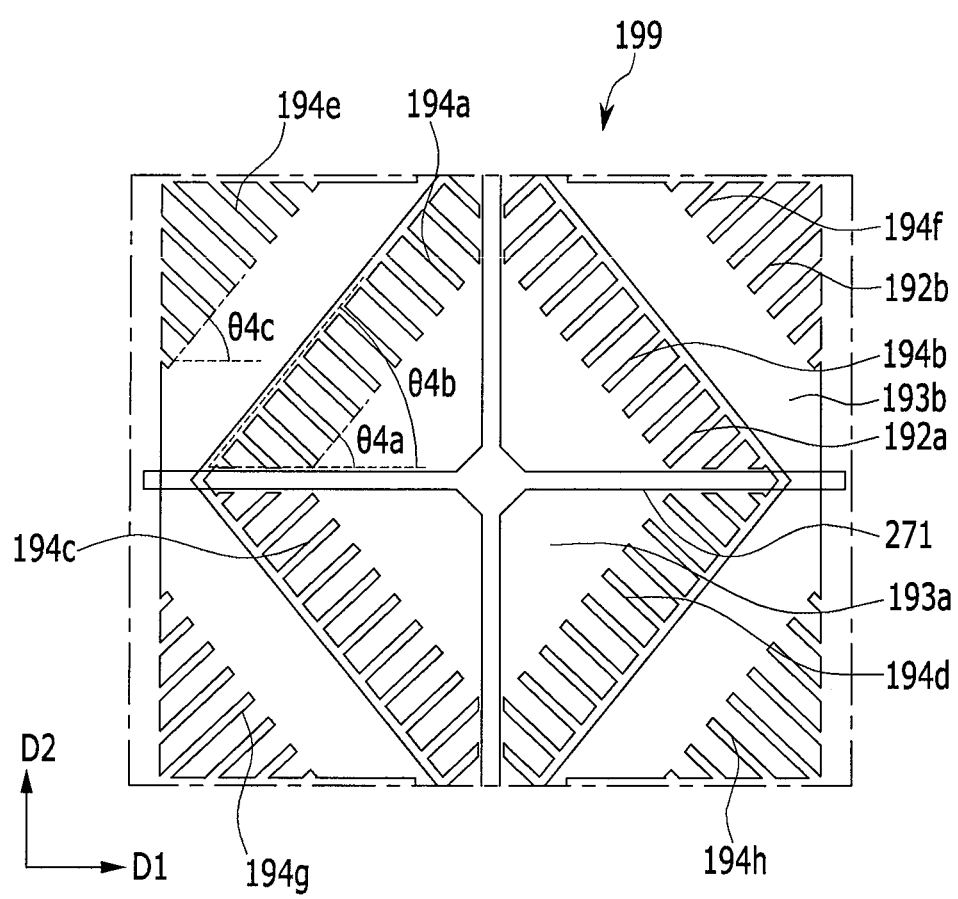
FIG. 18 is a plan view illustrating a basic region of a field generating electrode of a liquid crystal display according to another example embodiment of the present invention.

Next, a basic region of a field generating electrode of the liquid crystal display according to another example embodiment of the present invention will be described in more detail with reference to FIG. 18. FIG. 18 is a plan view illustrating a basic region of a field generating electrode of the liquid crystal display according to another example embodiment of the present invention.

Referring to FIG. 18, the basic region of the field generating electrode of the liquid crystal display according to the present example embodiment is similar to the basic region of the field generating electrode of the liquid crystal display according to the example embodiment illustrated in FIG. 3.

As illustrated in FIG. 18, a basic electrode 199 of the field generating electrode of the liquid crystal display according to the example embodiment includes a cutout 271 of the common electrode 270 and a pixel electrode 191 including a first subpixel electrode 191a (including a first plate-shaped portion 193a and a plurality of first branch electrodes 192a) and a second subpixel electrode 191b (including a second plate-shaped portion 193b and a plurality of second branch electrodes 192b) facing each other. The second subpixel electrode 191b surrounds the first subpixel electrode 191a.

The cutout 271 of the common electrode 270 may have a cross shape in a plan view, e.g., when viewed from the planar form (state).

A plurality of first branch electrodes 192a is formed at an edge of the first subpixel electrode 191a. The plurality of first branch electrodes 192a is extended from a first plate portion 193a having a rhombus shape. That is, the first subpixel electrode 191a includes the first plate-shaped portion 193a positioned at the center and a plurality of first branch electrodes 192a, which surrounds the first plate-shaped portion 193a and is extended from the first plate-shaped portion 193a.

The central portion of the first plate-shaped portion 193a of the first subpixel electrode 191a is overlapped with a central portion of the cross-shaped cutout 271 formed at the common electrode 270.

The first branch electrodes 192a of the first subpixel electrode 191a extend in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms which are positioned outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of approximately (about) 45° to 135° with a first direction D1. Further, two of the minute branches 194a, 194b, 194c, 194d, 194e, 196f, 194g, and 194h, which extend in different directions and are adjacent to each other, may be orthogonal to each other.

An outer edge of the first plate-shaped portion 193a of the first subpixel electrode 191a of the basic electrode 199 of the liquid crystal display according to the example embodiment forms an angle of larger than about 45° or smaller than about 135° with the first direction D1 in which the gate line 121 extends, and the edges of the second plate-shaped portion 193b of the second subpixel electrode 191b of the basic electrode 199 form angles which are larger than about 45° or smaller than about 135° with the first direction D1 in which the gate line 121 extends. In more detail, a fourth angle θ4a between the edge of the first plate-shaped portion 193a of the first subpixel electrode 191a and the first direction D1 in which the gate line 121 extends, a fifth angle θ4c between the outer edge of the second plate-shaped portion 193b of the second subpixel electrode 191b and the first direction D1 in which the gate line 121 extends, and a sixth angle θ4b between the edge of the second plate-shaped portion 193b of the second subpixel electrode 191b adjacent to the first plate-shaped portion 193a of the first subpixel electrode 191a and the first direction D1 in which the gate line 121 extends are larger than about 45° or smaller than about 135°.

The liquid crystal molecules at the edges of the first plate-shaped portion 193a of the first subpixel electrode 191a and the second plate-shaped portion 193b of the second subpixel electrode 191b of the basic electrode 199 are tilted in the direction which is vertical (perpendicular) to the edge of the second plate-shaped portion 193b, by the fringe field applied in the direction which is vertical (perpendicular) to the edge of the second plate-shaped portion 193b.

The liquid crystal molecules around the first branch electrode 192a of the first subpixel electrode 191a and the second branch electrode 192b of the second subpixel electrode 191b are tilted in a parallel direction with the longitudinal directions of the first branch electrode 192a of the first subpixel electrode 191a and the second branch electrode 191b are tilted in a parallel direction with the longitudinal directions of the first branch electrode 192a of the first subpixel electrode 191a and the second branch electrode 192b of the second subpixel electrode 191b, respectively. That is, the liquid crystal molecules are tilted in a direction which forms an angle of about 45° or about 135° with the first direction D1.

According to the liquid crystal display according to the example embodiment, the angles between the edges of the first branch electrode 192a of the first subpixel electrode 191a and the second plate-shaped portion 193b of the second subpixel electrode 191b of the basic electrode 199 and the first direction D1 in which the gate line 121 extends are formed to be different from 45°, and as a result, the tilted directions of the liquid crystal molecules around the edges of the first branch electrode 192a of the first subpixel electrode 191a and the second plate-shaped portion 193b of the second subpixel electrode 191b of the basic electrode 199 do not form an angle of about 45° or about 135° with the first direction D1, and the liquid crystal molecules around the first branch electrode 192a of the first subpixel electrode 191a and the second branch electrode 192b of the second subpixel electrode 191b are tilted in the directions which form an angle of about 45° or about 135° with the first direction D1.

As such, the tilted directions of the liquid crystal molecules are varied, and as a result, visibility at the side of the liquid crystal display may be improved.

Further, as described above, according to the liquid crystal display according to the example embodiment of the present invention, the first subpixel electrode 191a to which a relatively high voltage is applied is formed at the center to be overlapped with the center of the cross-shaped cutout 271 of the common electrode 270, and the plurality of first branch electrode 192a is formed at the edge of the first subpixel electrode 191a. Further, the second subpixel electrode 191b to which a relatively low voltage is applied is positioned at the edge of the first subpixel electrode 191a, and the plurality of second branch electrodes 192b is formed at the edge of the second subpixel electrode 191b. In addition, by controlling the ratio of the voltages applied to the first subpixel electrode 191a and the second subpixel electrode 191b according to the first distance d1 between the first subpixel electrode 191a and the second subpixel electrode 191b, the liquid crystal molecules positioned on the boundary of the first subpixel electrode 191a and the second subpixel electrode 191b are tilted in parallel and in the same direction as the directions of the liquid crystal molecules corresponding to the first subpixel electrode 191a and the liquid crystal molecules corresponding to the second subpixel electrode 191b, and as a result, the luminance of the liquid crystal display is increased.

As described above, the first branch electrode 192a of the first subpixel electrode 191a and the second branch electrode 192b of the second subpixel electrode 191b have the plurality of minute branches 194a, 194b, 194c, 194d, 194e, 196f, 194g, and 194h which extend in different directions, and as a result, the liquid crystal molecules are tilted in different directions. Accordingly, a viewing angle of the liquid crystal display is increased.

Figure 19:
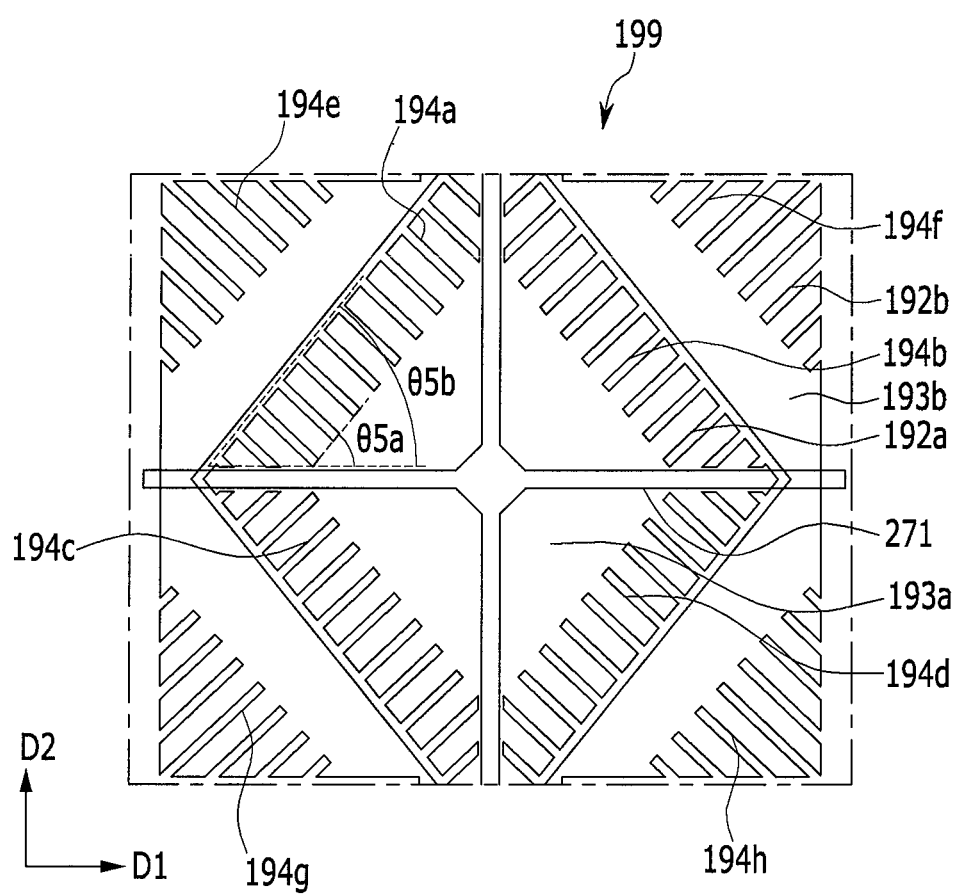
FIG. 19 is a plan view illustrating a basic region of a field generating electrode of a liquid crystal display according to another example embodiment of the present invention.

Next, a basic region of a field generating electrode of a liquid crystal display according to another example embodiment of the present invention will be described in more detail with reference to FIG. 19. FIG. 19 is a plan view illustrating a basic region of a field generating electrode of a liquid crystal display according to another example embodiment of the present invention.

Referring to FIG. 19, the basic region of the field generating electrode of the liquid crystal display according to the present example embodiment is almost (substantially) similar to the basic region of the field generating electrode of the liquid crystal display according to the example embodiment illustrated in FIG. 3.

As illustrated in FIG. 19, a basic electrode 199 of the field generating electrode of the liquid crystal display according to the example embodiment includes a cutout 271 of the common electrode 270 and a pixel electrode 191 including a first subpixel electrode 191a (including a first plate-shaped portion 193a and a plurality of first branch electrodes 192a) and a second subpixel electrode 191b (including a second plate-shaped portion 193b and a plurality of second branch electrodes 192b) facing each other. The second subpixel electrode 191b surrounds the first subpixel electrode 191a.

The cutout 271 of the common electrode 270 may have a cross shape in a plan view, e.g., when viewed from the planar form (state).

A plurality of first branch electrodes 192a is formed at an edge of the first subpixel electrode 191a. The plurality of first branch electrodes 192a is extended from a first plate portion 193a having a rhombus shape. That is, the first subpixel electrode 191a includes the first plate-shaped portion 193a positioned at the center and a plurality of first branch electrodes 192a, which surrounds the first plate-shaped portion 193a and is extended from the first plate-shaped portion 193a.

The central portion of the first plate-shaped portion 193a of the first subpixel electrode 191a is overlapped with a central portion of the cross-shaped cutout 271 formed at the common electrode 270.

The first branch electrodes 192a of the first subpixel electrode 191a extend in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of approximately (about) 45° or 135° with a first direction D1. Further, two of the minute branches 194a, 194b, 194c, 194d, 194e, 196f, 194g, and 194h, which extend in different directions and are adjacent to each other, may be orthogonal to each other.

An outer edge of the first plate-shaped portion 193a of the first subpixel electrode 191a of the basic electrode 199 of the liquid crystal display according to the example embodiment forms an angle of smaller than about 45° or larger than about 135° with the first direction D1 in which the gate line 121 extends, and the edge adjacent to the first subpixel electrode 191a among the edges of the second plate-shaped portion 193b of the second subpixel electrode 191'b of the basic electrode 199 forms angles which are larger than about 45° or smaller than about 135° with the first direction D1 in which the gate line 121 extends. In more detail, a seventh angle 95a between the edge of the first plate-shaped portion 193a of the first subpixel electrode 191a and the first direction D1 in which the gate line 121 extends; and an eighth angle 95b between the edge adjacent to the first branch electrode 192*a* of the first subpixel electrode 191*a* among the edges of the second plate-shaped portion 193*b* of the second subpixel electrode 191*b* and the first direction D1 in which the gate line 121 extends are larger than about 45° or smaller than about 135°.

The liquid crystal molecules at the edges of the first plate-shaped portion 193*a* of the first subpixel electrode 191*a* and the second plate-shaped portion 193*b* of the second subpixel electrode 191*b* of the basic electrode 199 are tilted in the direction which is vertical (perpendicular) to the edge of the second plate-shaped portion 193*b*, by the fringe field applied in the direction which is vertical (perpendicular) to the edge of the second plate-shaped portion 193*b*.

The liquid crystal molecules around the first branch electrode 192*a* of the first subpixel electrode 191*a* and the second branch electrode 192*b* of the second subpixel electrode 191*b* are tilted in a parallel direction with the longitudinal directions of the first branch electrode 192*a* of the first subpixel electrode 191*a* and the second branch electrode 192*b* of the second subpixel electrode 191*b*, respectively. That is, the liquid crystal molecules are tilted in a direction which forms an angle of about 45° or about 135° with the first direction D1.

According to the liquid, crystal display according to the example embodiment, the angles between the outer edge of the first branch electrode 192*a* of the first subpixel electrode 191*a* of the basic electrode 199 and the edge adjacent to the first branch electrode 192*a* among the edges of the second plate-shaped portion 193*b* of the second subpixel electrode 191*b* and the first direction D1 in which the gate line 121 extends are formed to be different from 45°, and as a result, the tilted directions of the liquid crystal molecules around the edges of the first branch electrode 192*a* of the first subpixel electrode 191*a* and the second plate-shaped portion 193*b* of the second subpixel electrode 191*b* of the basic electrode 199 do not form an angle of about 45° or about 135° with the first direction D1, and the liquid crystal molecules around the first branch electrode 192*a* of the first subpixel electrode 191*a* and the second branch electrode 192*a* of the first subpixel electrode 191*a* and the second branch electrode 192*b* of the second subpixel electrode 191*b* are tilted in the directions which form an angle of about 45° or about 135° with the first direction D1.

As such, the tilted directions of the liquid crystal molecules are varied, and as a result, visibility at the side of the liquid crystal display may be improved.

Further, as described above, according to the liquid crystal display according to the example embodiment of the present invention, the first subpixel electrode 191*a* to which a relatively high voltage is applied is formed at the center to be overlapped with the center of the cross-shaped cutout 271 of the common electrode 270, and the plurality of first branch electrode 192*a* is formed at the edge of the first subpixel electrode 191*a*. Further, the second subpixel electrode 191*b* to which a relatively low voltage is applied is positioned at the edge of the first subpixel electrode 191*a*, and the plurality of second branch electrodes 192*b* is formed at the edge of the second subpixel electrode 191*b*. In addition, by controlling the ratio of the voltages applied to the first subpixel electrode 191*a* and the second subpixel electrode 191*b* according to the first distance d1 between the first subpixel electrode 191*a* and the second subpixel electrode 191*b*, the liquid crystal molecules positioned on the boundary of the first subpixel electrode 191*a* and the second subpixel electrode 191*b* are tilted in parallel and in the same direction as the directions of the liquid crystal molecules corresponding to the first subpixel electrode 191*a* and the liquid crystal molecules corresponding to the second subpixel electrode 191*b*, and as a result, the luminance of the liquid crystal display is increased.

As described above, the first branch electrode 192*a* of the first subpixel electrode 191*a* and the second branch electrode 192*b* of the second subpixel electrode 191*b* have the plurality of minute branches 194*a*, 194*b*, 194*c*, 194*d*, 194*e*, 196*f*, 194*g*, and 194*h* which extend in different directions, and as a result, the liquid crystal molecules are tilted in different directions. Accordingly, a viewing angle of the liquid crystal display is increased.

Figure 20:
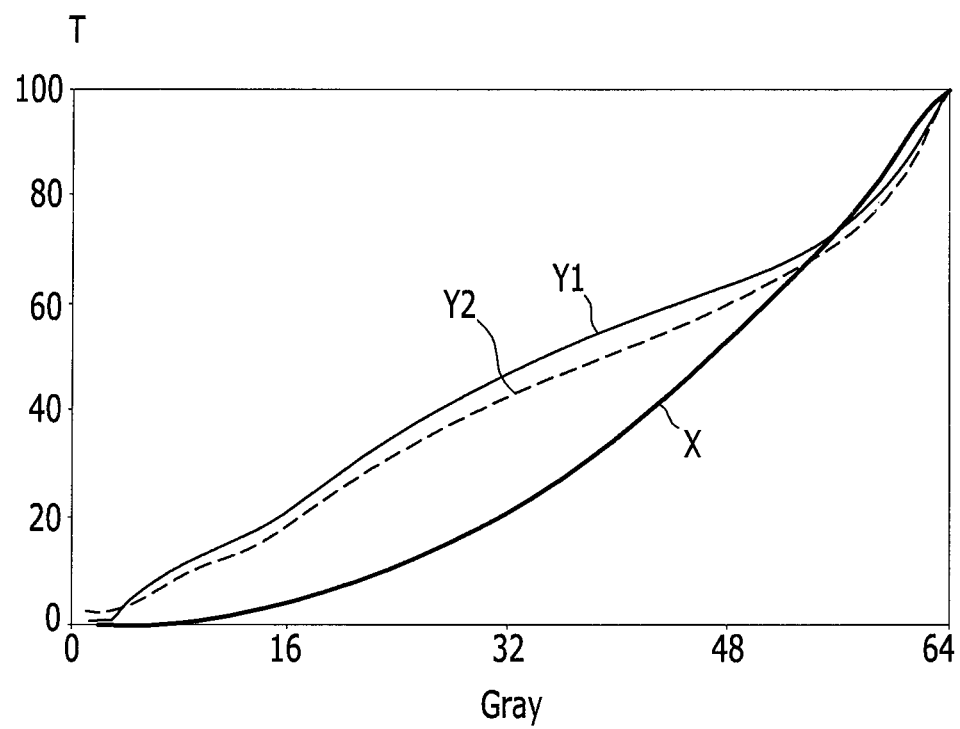
FIG. 20 is a graph illustrating a result of a fourth Experimental Example of the present invention.

Next, a fourth Experimental Example of the present invention will be described with reference to FIG. 20. FIG. 20 is a graph illustrating a result of a fourth Experimental Example of the present invention.

In the Experimental Example, by measuring transmittance for each gray scale at the side of the liquid crystal display including the basic electrode according to the example embodiment illustrated in FIG. 3 and measuring transmittance for each gray scale at the side of the liquid crystal display including the basic electrode according to the example embodiment illustrated in FIG. 19, and comparing the transmittance at the side and transmittance for each gray scale at the front of the liquid crystal display, the result is illustrated in FIG. 20.

In FIG. 20, the transmittance for each gray scale at the front of the liquid crystal display is illustrated by X, the transmittance for each gray scale at the side of the liquid crystal display including the basic electrode according to the example embodiment illustrated in FIG. 3 is illustrated by Y1, and the transmittance for each gray scale at the side of the liquid crystal display including the basic electrode according to the example embodiment illustrated in FIG. 19 is illustrated by Y2.

Referring to FIG. 20, as compared with the liquid crystal display including the basic electrode according to the example embodiment illustrated in FIG. 3, in the case of the liquid crystal display including the basic electrode according to the example embodiment illustrated in FIG. 19, it can be seen that the transmittance for each gray scale at the side is closer to the transmittance for each gray scale at the front of the liquid crystal display.

As such, the tilted directions of the liquid crystal molecules are more varied, and as a result, visibility at the side of the liquid crystal display may be improved.

Figure 21:
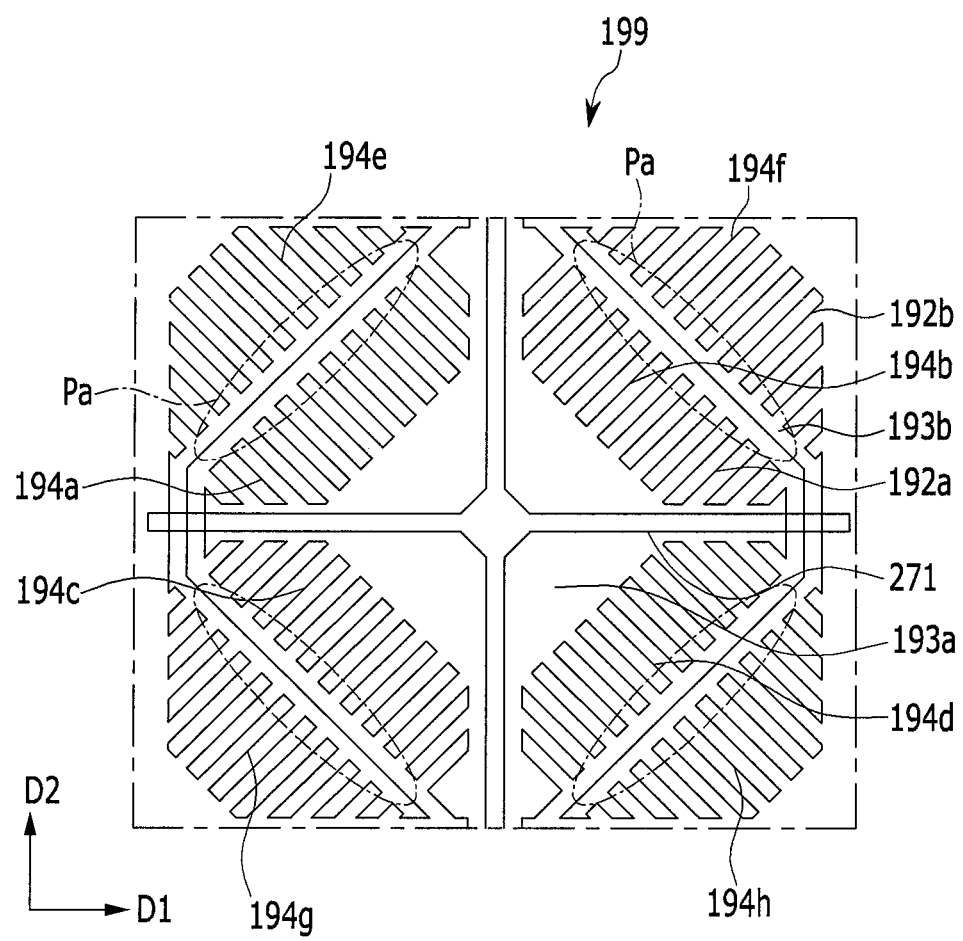
FIG. 21 is a plan view illustrating a basic region of a field generating electrode of the liquid crystal display according to another example embodiment of the present invention.

Next, a basic region of a field generating electrode of a liquid crystal display according to another example embodiment of the present invention will be described with reference to FIG. 21. FIG. 21 is a plan view illustrating a basic region of a field generating electrode of a liquid crystal display according to another example embodiment of the present invention.

As illustrated in FIG. 21, a basic electrode 199 of the field generating electrode of the liquid crystal display according to the present example embodiment includes a cutout 271 of the common electrode 270 and a pixel electrode 191 including a first subpixel electrode 191*a* (including a first plate-shaped portion 193*a* and a plurality of second branch electrodes 192*a*) and a second subpixel electrode 191*b* (including a second plate-shaped portion 193*b* and a plurality of second branch electrodes 192*b*) facing each other. The second subpixel electrode 191*b* surrounds the first subpixel electrode 191*a*.

The cutout 271 of the common electrode 270 may have a cross shape in a plan view, e.g., when viewed from the planar form (state).

A plurality of first branch electrodes 192a is formed at an edge of the first subpixel electrode 191a. The plurality of first branch electrodes 192a is extended from a first plate portion 193a having a rhombus shape. That is, the first subpixel electrode 191a includes the first plate-shaped portion 193a positioned at the center and a plurality of first branch electrodes 192a, which surrounds the first plate-shaped portion 193a and is extended from the first plate-shaped portion 193a.

The central portion of the first plate-shaped portion 193a of the first subpixel electrode 191a is overlapped with a central portion of the cross-shaped cutout 271 formed at the common electrode 270.

The first branch electrodes 192a of the first subpixel electrode 191a extend in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms which are positioned outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of approximately (about) 45° to 135° with a first direction D1. Further, two of the minute branches 194a, 194b, 194c, 194d, 194e, 196f, 194g, and 194h, which extend in different directions and are adjacent to each other, may be orthogonal to each other.

In the basic electrode 199 of the liquid crystal display according to the example embodiment, as illustrated as a portion Pa in FIG. 21, as compared with the basic electrode 199 of the liquid crystal display according to the example embodiment illustrated in FIG. 3, a width of the second plate-shaped portion 193b of the second subpixel electrode 191b is small. Accordingly, the liquid crystal molecules positioned on a boundary between the first subpixel electrode 191a and the second subpixel electrode 191b are influenced by the fringe field due to the first branch electrode 192a of the first subpixel electrode 191a and the second branch electrode 192b of the second subpixel electrode 191b more than by the fringe field by the second plate-shaped portion 193b of the second subpixel electrode 191b. Accordingly, the liquid crystal molecules positioned on the boundary between the first subpixel electrode 191a and the second subpixel electrode 191b are tilted in a parallel direction with a longitudinal direction of the first branch electrode 192a of the first subpixel electrode 191a and the second branch electrode 192b of the second subpixel electrode 191b.

Figure 22:
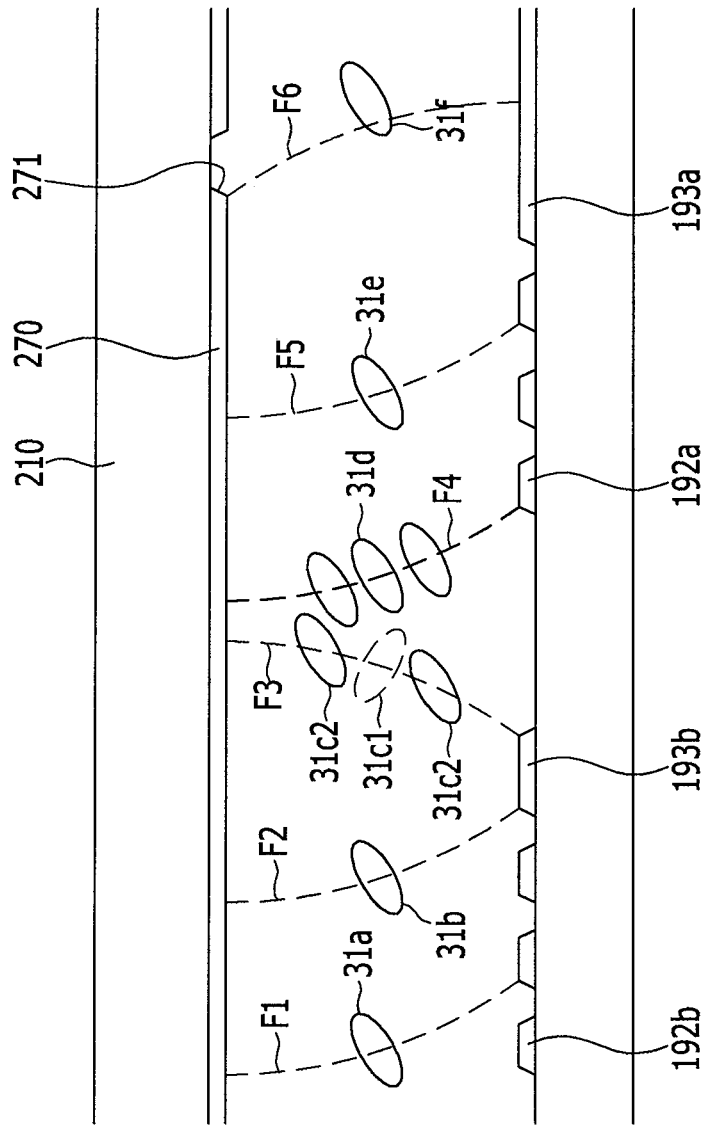
FIG. 22 is a cross-sectional view illustrating alignment directions of directors of the liquid crystal molecules of the liquid crystal display according to another example embodiment of the present invention.

This will be described in more detail with reference to FIG. 22. FIG. 22 is a cross-sectional view illustrating alignment directions of directors of liquid crystal molecules of a liquid crystal display according to another example embodiment of the present invention.

Referring to FIG. 22, a first fringe field F1 in a direction which is vertical (perpendicular) to an edge of the second branch electrode 192b of the second subpixel electrode 191b is generated, and as a result, first liquid crystal molecules 31a positioned around the second branch electrode 192b are tilted in parallel with the direction of the first fringe field F1 and then collide with each other to be tilted in a parallel direction with a longitudinal direction in which the second branch electrode 192b extends.

Second liquid crystal molecules 31b positioned at a first edge adjacent to the second branch electrode 192b among edges of the second plate-shaped portion 193b of the second subpixel electrode 191b are influenced by a second fringe field F2 generated at the first edge of the second plate-shaped portion 193b to be tilted in a direction which is vertical (perpendicular) to the first edge of the second plate-shaped portion 193b, and the direction is the same as the tilted directions of the first liquid crystal molecules 31a.

A third fringe field F3 is generated at a second edge adjacent to the first subpixel electrode 191a among the edges of the second plate-shaped portion 193b of the second subpixel electrode 191b, and a first portion 31c1 of third liquid crystal molecules 31c adjacent to the second edge which is adjacent to the first subpixel electrode 191a among the edges of the second plate-shaped portion 193b of the second subpixel electrode 191b is influenced by the third fringe field F3 to be tilted in a direction which is vertical (perpendicular) to the second edge of the second plate-shaped portion 193b. The direction is opposite to the directions in which the first liquid crystal molecules 31a and the second liquid crystal molecules 31b are tilted.

Further, a fourth fringe field F4 is generated at a third edge adjacent to the second plate-shaped portion 193b of the second subpixel electrode 191b among the edges of the first branch electrode 192a of the first subpixel electrode 191a, and fourth liquid crystal molecules 31d adjacent to the third edge of the first branch electrode 192a are tilted in a direction vertical (perpendicular) to the fourth fringe field F4. The direction is the same as the directions in which the first liquid crystal molecules 31a, and the second liquid crystal molecules 31b are tilted.

As described above, a magnitude of the voltage applied to the first subpixel electrode 191a is larger than a magnitude of the voltage applied to the second subpixel electrode 191b. Accordingly, the voltage difference between the first subpixel electrode 191a and the common electrode 270 is larger than the voltage difference between the second subpixel electrode 191b and the common electrode 270, and as a result, the magnitude of the fourth fringe field F4 is larger than the magnitude of the third fringe field F3. Therefore, a second portion 31c2 of the third liquid crystal molecules 31c adjacent to the second edge adjacent to the first subpixel electrode 191a is influenced by the fourth fringe field F4 to be tilted in a direction vertical (perpendicular) to the fourth fringe field F4. Accordingly, the first portion 31c1 of the third liquid crystal molecules 31c which is influenced by the third fringe field F3 to be tilted in the direction vertical (perpendicular) to the third fringe field F3 is also tilted in parallel to the second portion 31c2 of the third liquid crystal molecules 31c which is influenced by the fourth fringe field F4.

Further, according to the liquid crystal display according to the example embodiment, a width of the second plate-shaped portion 193b of the second subpixel electrode 191b is smaller than a length of the second branch electrode 192b. Accordingly, the liquid crystal molecules positioned on a boundary between the first subpixel electrode 191a and the second subpixel electrode 191b are influenced by the first fringe field F1 by the second branch electrode 192b of the second subpixel electrode 191b and the fifth fringe field F5 by the first branch electrode 192a of the first subpixel electrode 191a more than by the third fringe field F3 by the second plate-shaped portion 193b of the second subpixel electrode 191b. Accordingly, the liquid crystal molecules positioned on the boundary between the first subpixel electrode 191a and the second subpixel electrode 191b are tilted in a parallel direction with a longitudinal direction of the first branch electrode 192a of the first subpixel electrode 191a and the second branch electrode 192b of the second subpixel electrode 191b.

As a result, the third liquid crystal molecules 31c positioned between the first subpixel electrode 191a and the second subpixel electrode 191b are tilted in the parallel direction with the second liquid crystal molecules 31b and the fourth liquid crystal molecules 31d therearound, and accordingly, the luminance of the liquid crystal display may be increased.

Fifth liquid crystal molecules 31e corresponding to the first branch electrode 192a of the first subpixel electrode 191a is influenced by a fifth fringe field F5 generated at the edge of the first branch electrode 192a to be tilted in a parallel direction with the fifth fringe field F5, and then collide with each other to be tilted in the parallel direction with the longitudinal direction in which the first branch electrode 192a extends.

Further, a third portion 31f1 and a fourth portion 31f2 of sixth liquid crystal molecules 31f corresponding to the first plate-shaped portion 193a of the first subpixel electrode 191a are primarily tilted in a direction which is vertical (perpendicular) to the edge of the cutout 271 by the sixth fringe field F6 which is applied to the cross-shaped cutout 271 formed at the common electrode 270 and then secondarily aligned in a direction so that the deformation is reduced or minimized when the third portion 31f1 and the fourth portion 31f2 of the sixth liquid crystal molecules 31f meet each other, and the secondarily aligned direction becomes a vector sum direction of the directions in which the third portion 31f1 and the fourth portion 31f2 extend. Accordingly, the third portion 31f1 and the fourth portion 31f2 are tilted in a parallel direction with the longitudinal direction in which the first branch electrode 192a extends.

As such, according to the liquid crystal display according to the example embodiment of the present invention, the first subpixel electrode 191a to which a relatively high voltage is applied is formed at the center to be overlapped with the center of the cross-shaped cutout 271 of the common electrode 270, and the plurality of first branch electrode 192a is formed at the edge of the first subpixel electrode 191a. Further, the second subpixel electrode 191b to which a relatively low voltage is applied is positioned at the edge of the first subpixel electrode 191a, and the plurality of second branch electrodes 192b is formed at the edge of the second subpixel electrode 191b. In addition, by controlling the ratio of the voltages applied to the first subpixel electrode 191a and the second subpixel electrode 191b according to the first distance d1 between the first subpixel electrode 191a and the second subpixel electrode 191b, the liquid crystal molecules positioned on the boundary of the first subpixel electrode 191a and the second subpixel electrode 191b are tilted in parallel and in the same direction as the directions of the liquid crystal molecules corresponding to the first subpixel electrode 191a and the liquid crystal molecules corresponding to the second subpixel electrode 191b, and as a result, the luminance of the liquid crystal display is increased.

As described above, the first branch electrode 192a of the first subpixel electrode 191a and the second branch electrode 192b of the second subpixel electrode 191b have the plurality of minute branches 194a, 194b, 194c, 194d, 194e, 196f, 194g, and 194h which extend in different directions, and as a result, the liquid crystal molecules are tilted in different directions. Accordingly, a viewing angle of the liquid crystal display is increased.

Next, a result of a fifth Experimental Example of the present invention will be described with reference to FIGS. 23(a) and (b). FIGS. 23(a) and (b) are electron micrographs illustrating a result of a fifth Experimental Example of the present invention.

In the Experimental Example, in a case where the width of the second plate-shaped portion 193b of the second subpixel electrode 191b is substantially the same as the length of the second branch electrode 192b and a case where the width of the second plate-shaped portion 193b of the second subpixel electrode 191b is smaller than the length of the second branch electrode 192b, changes in luminance of the liquid crystal display after applying the same voltage are illustrated with an electron microscope.

FIG. 23 (a) illustrates a result in the case of forming the basic electrode of the liquid crystal display according to the example embodiment illustrated in FIG. 3, and FIG. 23 (b) illustrates a result in the case of forming the basic electrode of the liquid crystal display according to the example embodiment illustrated in FIG. 22.

Referring to FIG. 23 (b), the width of the second plate-shaped portion 193b of the second subpixel electrode 191b is smaller than the length of the second branch electrode 192b, and as a result, the tilted directions of the liquid crystal molecules positioned on the boundary of the first subpixel electrode 191a and the second subpixel electrode 191b may be further controlled, and accordingly, it can be seen that the luminance around the boundary between the first subpixel electrode 191a and the second subpixel electrode 191b is increased.

Figure 24:
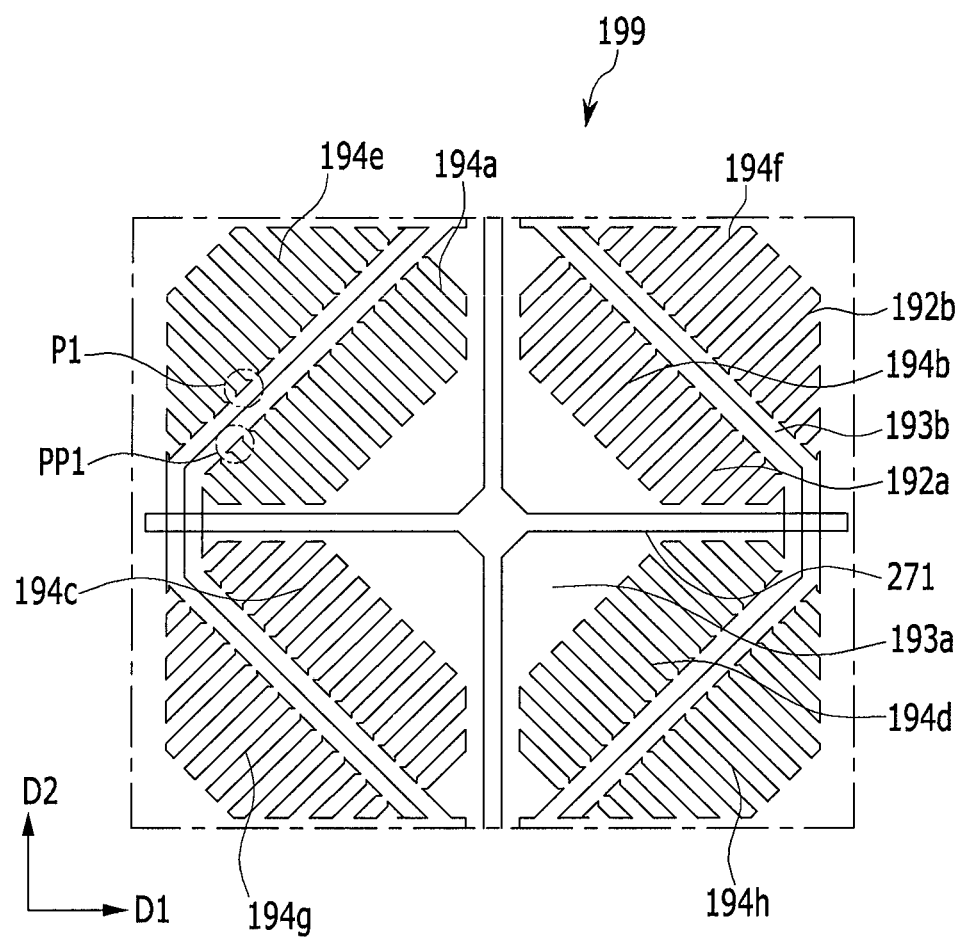
FIG. 24 is a plan view illustrating a basic region of a field generating electrode of the liquid crystal display according to another example embodiment of the present invention.

Next, a basic region of a field generating electrode of a liquid crystal display according to another example embodiment of the present invention will be described with reference to FIG. 24. FIG. 24 is a plan view illustrating a basic region of a field generating electrode of a liquid crystal display according to another example embodiment of the present invention.

As illustrated in FIG. 24, a basic electrode 199 of the field generating electrode of the liquid crystal display according to the present example embodiment includes a cutout 271 of the common electrode 270 and a pixel electrode 191 including a first subpixel electrode 191a (including a first plate-shaped portion 193a and a plurality of first branch electrodes 192a) and a second subpixel electrode 191b (including a second plate-shaped portion 193b and a plurality of second branch electrodes 192b) facing each other. The second subpixel electrode 191b surrounds the first subpixel electrode 191a.

The cutout 271 of the common electrode 270 may have a cross shape in a plan view, e.g., when viewed from the planar form (state).

A plurality of first branch electrodes 192a is formed at an edge of the first subpixel electrode 191a. The plurality of first branch electrodes 192a is extended from a first plate portion 193a having a rhombus shape. That is, the first subpixel electrode 191a includes the first plate-shaped portion 193a positioned at the center and a plurality of first branch electrodes 192a, which surrounds the first plate-shaped portion 193a and is extended from the first plate-shaped portion 193a.

The central portion of the first plate-shaped portion 193a of the first subpixel electrode 191a is overlapped with a central portion of the cross-shaped cutout 271 formed at the common electrode 270.

The first branch electrodes 192a of the first subpixel electrode 191a extend in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms which are positioned outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of approximately (about) 45° to 135° with a first direction D1. Further, two of the minute branches 194a, 194b, 194c, 194d, 194e, 196f, 194g, and 194h, which extend in different directions and are adjacent to each other, may be orthogonal to each other.

The basic electrode 199 of the liquid crystal display according to the example embodiment has an expanded cutout on a boundary P1 between the second plate-shaped portion 193b and the second branch electrode 192b of the second subpixel electrode 191b. Accordingly, on the boundary P1 between the second plate-shaped portion 193b and the second branch electrode 192b of the second subpixel electrode 191b of the basic electrode 199, a width of the second branch electrode 192b of the second subpixel electrode 191b is decreased. Further, the width of the first branch electrode 192a at an end PP1 of the first branch electrode 192a of the first subpixel electrode 191a is increased. Accordingly, on the boundary P1 between the second plate-shaped portion 193b and the second branch electrode 192b of the second subpixel electrode 191b and the end PP1 of the first branch electrode 192a of the first subpixel electrode 191a, by reinforcing an effect of the fringe field by the second branch electrode 192b and the first branch electrode 192a, the liquid crystal molecules positioned on the boundary between the first subpixel electrode 191a and the second subpixel electrode 191b are tilted in a parallel direction with the longitudinal direction of the first branch electrode 192a of the first subpixel electrode 191a and the second branch electrode 192b of the second subpixel electrode 191b.

Figure 25:
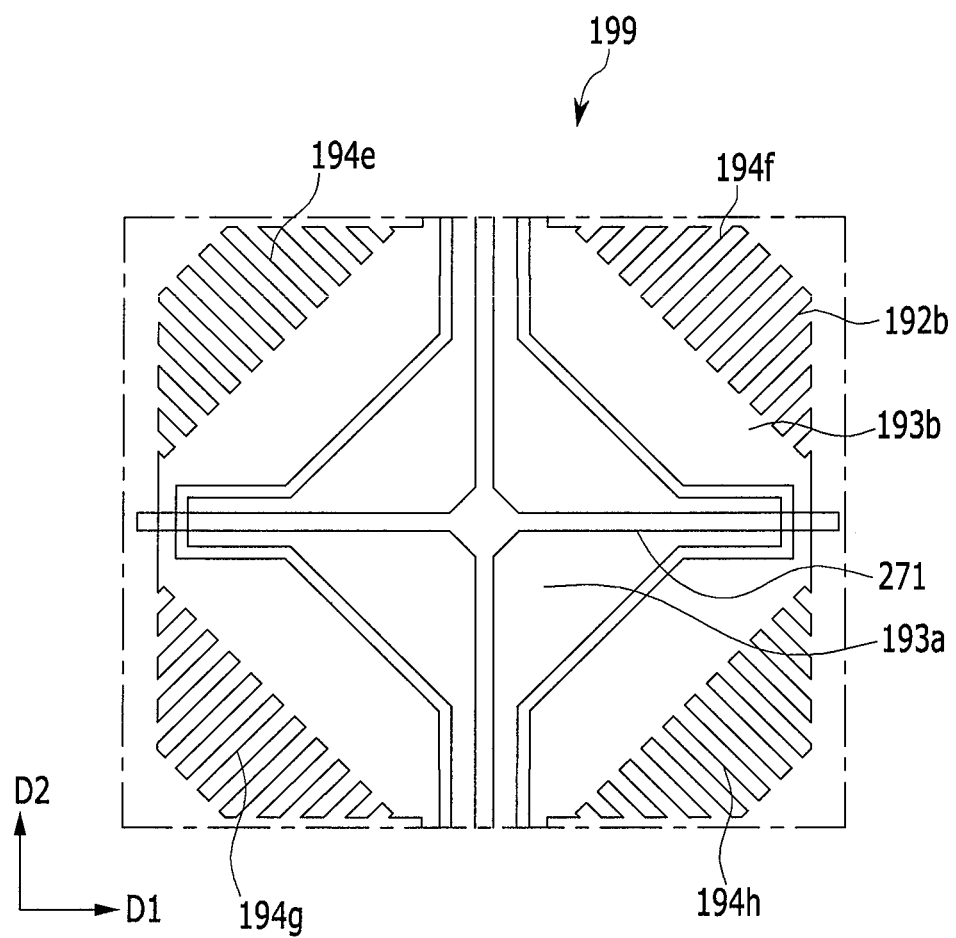
FIG. 25 is a cross-sectional view illustrating alignment directions of directors of the liquid crystal molecules of the liquid crystal display according to another example embodiment of the present invention.

Next, a basic region of a field generating electrode of a liquid crystal display according to another example embodiment of the present invention will be described with reference to FIG. 25. FIG. 25 is a plan view illustrating a basic region of a field generating electrode of a liquid crystal display according to another example embodiment of the present invention.

As illustrated in FIG. 25, a basic electrode 199 of the field generating electrode of the liquid crystal display according to the present example embodiment includes a cutout 271 of the common electrode 270 and a pixel electrode 191 including a first subpixel electrode 191a (including a first plate-shaped portion 193a) and a second subpixel electrode 191b (including a second plate-shaped portion 193b and a plurality of second branch electrodes 192b) facing each other. The second subpixel electrode 191b surrounds the first subpixel electrode 191a.

The cutout 271 of the common electrode 270 may have a cross shape in a plan view, e.g., when viewed from the planar form (state).

The first subpixel electrode 191a does not include branch electrodes, and includes the first plate-shaped portion 193a. The first plate-shaped portion 193a of the first subpixel electrode 191a has a rhombus shape.

The central portion of the first plate-shaped portion 193a of the first subpixel electrode 191a is overlapped with a central portion of the cross-shaped cutout 271 formed at the common electrode 270.

The second subpixel electrode 191b includes a second plate-shaped portion 193b surrounding the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms positioned at the outside of the first subpixel electrode 191a. The plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The fifth to eighth minute branches 194e, 196f, 194g, and 194h may form an angle of approximately (about) 45° or 135° with the first direction D1 in which the gate line 121 extends. Further, two of the minute branches 194e, 196f, 194g, and 194h which extend in different directions and are adjacent to each other may be orthogonal to each other.

In the liquid crystal display according to the example embodiment, unlike the liquid crystal display according to the example embodiment illustrated in FIG. 3, the first subpixel electrode 191a adjacent to the second subpixel electrode 191*b* has a plate shape. Accordingly, the liquid crystal molecules positioned on the boundary between the first subpixel electrode 191*a* and the second subpixel electrode 191*b* are more influenced by the fringe field according to the first subpixel electrode 191*a*.

Figure 26:
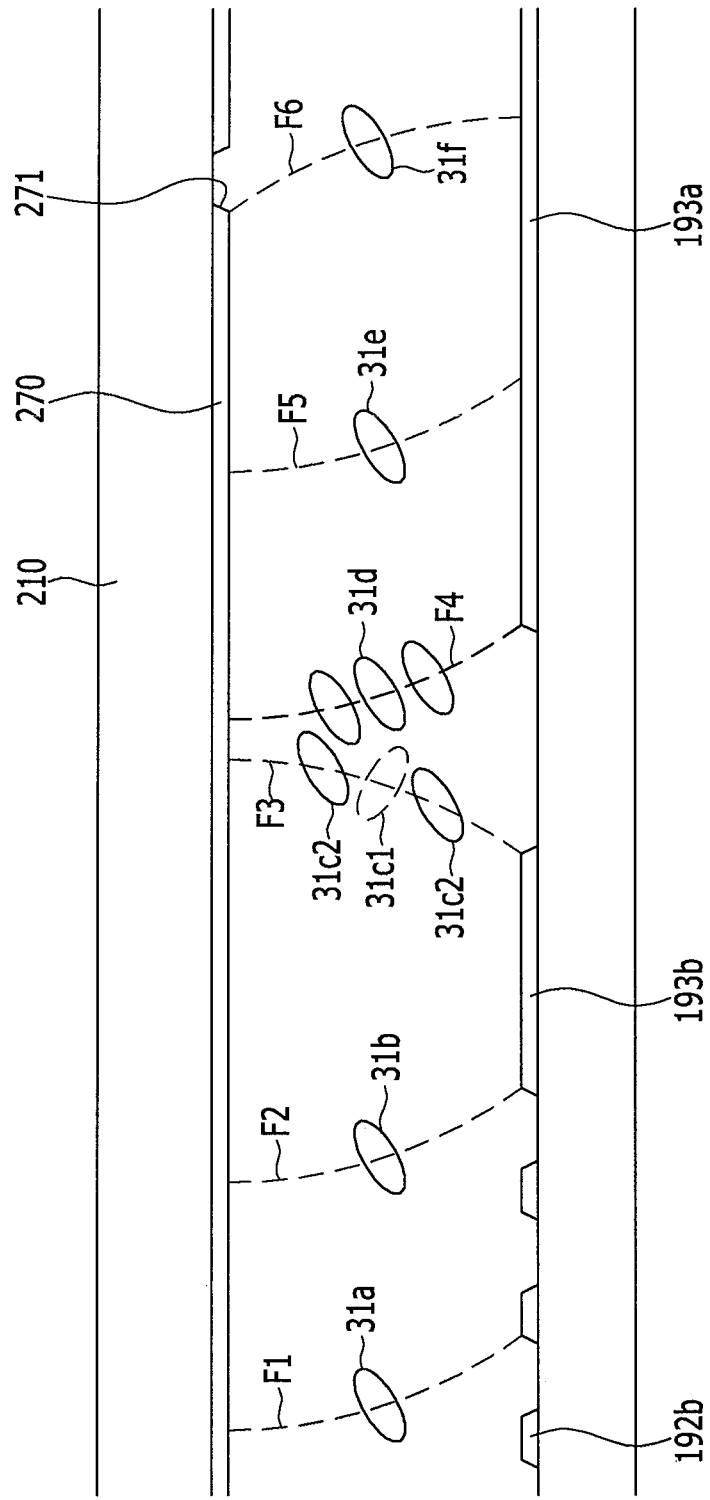
FIG. 26 is a cross-sectional view illustrating alignment directions of directors of the liquid crystal molecules of the liquid crystal display according to another example embodiment of the present invention.

This will be described in more detail with reference to FIG. 26. FIG. 26 is a cross-sectional view illustrating alignment directions of directors of the liquid crystal molecules of a liquid crystal display according to the present example embodiment of the present invention (illustrated in FIG. 25).

Referring to FIG. 26, a first fringe field F1 in a direction which is vertical (perpendicular) to an edge of the second branch electrode 192*b* of the second subpixel electrode 191*b* is generated, and as a result, first liquid crystal molecules 31*a* positioned around the second branch electrode 192*b* are tilted in parallel with the direction of the first fringe field F1 and then collide with each other to be tilted in a parallel direction with a longitudinal direction in which the second branch electrode 192*b* extends.

Second liquid crystal molecules 31*b* positioned at a first edge adjacent to the second branch electrode 192*b* among edges of the second plate-shaped portion 193*b* of the second subpixel electrode 191*b* are influenced by a second fringe field F2 generated at the first edge of the second plate-shaped portion 193*b* to be tilted in a direction which is vertical (perpendicular) to the first edge of the second plate-shaped portion 193*b*, and the direction is the same as the tilted directions of the first liquid crystal molecules 31*a*.

A third fringe field F3 is generated at a second edge adjacent to the first subpixel electrode 191*a* among the edges of the second plate-shaped portion 193*b* of the second subpixel electrode 191*b*, and a first portion 31*c*1 of third liquid crystal molecules 31*c* adjacent to the second edge which is adjacent to the first subpixel electrode 191*a* among the edges of the second plate-shaped portion 193*b* of the second subpixel electrode 191*b* is influenced by the third fringe field F3 to be tilted in a direction which is vertical (perpendicular) to the second edge of the second plate-shaped portion 193*b*. The direction is opposite to the directions in which the first liquid crystal molecules 31*a* and the second liquid crystal molecules 31*b* are tilted.

Further, a third portion 31*f*1 and a fourth portion 31*f*2 of sixth liquid crystal molecules 31*f* corresponding to the first plate-shaped portion 193*a* of the first subpixel electrode 191*a* are primarily tilted in a direction which is vertical (perpendicular) to the edge of the cutout 271 by the sixth fringe field F6 which is applied to the cross-shaped cutout 271 formed at the common electrode 270 and then secondarily aligned in a direction so that the deformation is minimized when the third portion 31*f*1 and the fourth portion 31*f*2 of the sixth liquid crystal molecules 31*f* meet each other, and the secondarily aligned direction becomes a vector sum direction of the directions in which the third portion 31*f*1 and the fourth portion 31*f*2 extend. Accordingly, the third portion 31*f*1 and the fourth portion 31*f*2 are tilted in a parallel direction with the longitudinal direction in which the first branch electrode 192*a* extends.

A magnitude of the voltage applied to the first subpixel electrode 191*a* is larger than a magnitude of the voltage applied to the second subpixel electrode 191*b*. Accordingly, a difference in voltage between the first subpixel electrode 191*a* and the common electrode 270 is larger than a difference in voltage between the second subpixel electrode 191*b* and the common electrode 270. Therefore, a magnitude of the sixth fringe field F6 is larger than that of the third fringe field F3. Furthermore, since the first subpixel electrode 191*a* has the plate shape at the portion adjacent to the second subpixel electrode 191*b*, influence of the sixth fringe field F6 by the first subpixel electrode 191*a* is more increased.

Therefore, a first portion 31*c*1 of the third liquid crystal molecules 31*c* positioned between the first subpixel electrode 191*a* and the second subpixel electrode 191*b* is more influenced by the sixth fringe field F6 than the third fringe field F3 to be tilted in a parallel direction with a longitudinal direction in which the second branch electrode 192*b* extends. Accordingly, the first portion 31*c*1 of the third liquid crystal molecules 31*c* which is influenced by the third fringe field F3 to be tilted in a vertical direction to the third fringe field F3 is also tilted in parallel to the second portion 31*c*2 of the third liquid crystal molecules 31*c* which is influenced by the sixth fringe field F6. The description of the other features shown in FIG. 26 is similar to the ones described previously.

As a result, the liquid crystal molecules positioned on the boundary between the first subpixel electrode 191*a* and the second subpixel electrode 191*b* are tilted in parallel and in the same direction as the liquid crystal molecules corresponding to the first subpixel electrode 191*a* and the liquid crystal molecules corresponding to the second subpixel electrode 191*b*, thereby increasing the luminance of the liquid crystal display.

Figure 27:
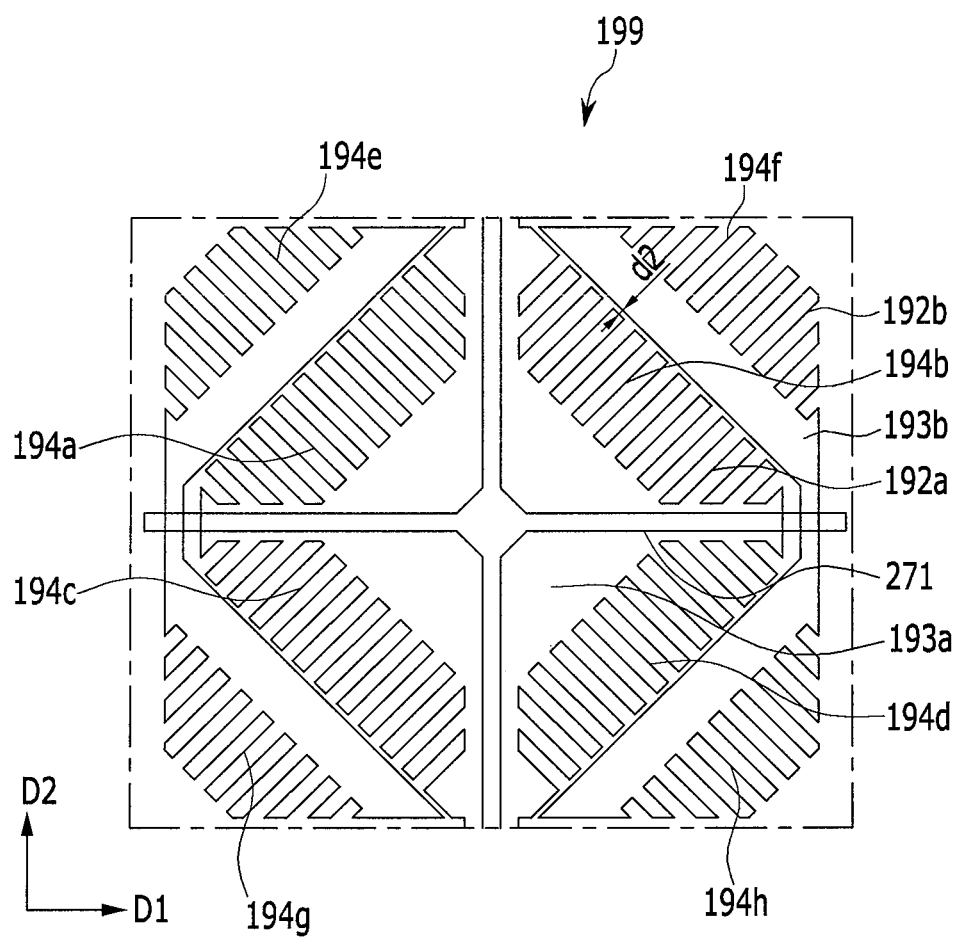
FIG. 27 is a plan view illustrating a basic region of a field generating electrode of the liquid crystal display according to another example embodiment of the present invention.

Next, a basic region of a field generating electrode of a liquid crystal display according to another example embodiment of the present invention will be described with reference to FIG. 27. FIG. 27 is a plan view illustrating a basic region of a field generating electrode of a liquid crystal display according to another example embodiment of the present invention.

As illustrated in FIG. 27, a basic electrode 199 of the field generating electrode of the liquid crystal display according to the present example embodiment includes a cutout 271 of the common electrode 270 and a pixel electrode 191 including a first subpixel electrode 191*a* (including a first plate-shaped portion 193*a* and a plurality of first branch electrodes 192*a*) and a second subpixel electrode 191*b* (including a second plate-shaped portion 193*b* and a plurality of second branch electrodes 192*b*) facing each other. The second subpixel electrode 191*b* surrounds the first subpixel electrode 191*a*.

The cutout 271 of the common electrode 270 may have a cross shape in a plan view, e.g., when viewed from the planar form (state).

A plurality of first branch electrodes 192*a* is formed at an edge of the first subpixel electrode 191*a*. The plurality of first branch electrodes 192*a* is extended from a first plate portion 193*a* having a rhombus shape. That is, the first subpixel electrode 191*a* includes the first plate-shaped portion 193*a* positioned at the center and a plurality of first branch electrodes 192*a*, which surrounds the first plate-shaped portion 193*a* and is extended from the first plate-shaped portion 193*a*.

The central portion of the first plate-shaped portion 193*a* of the first subpixel electrode 191*a* is overlapped with a central portion of the cross-shaped cutout 271 formed at the common electrode 270.

The first branch electrodes 192*a* of the first subpixel electrode 191*a* extend in different directions. In more detail, the first branch electrodes 192*a* include a plurality of first minute branches 194*a* which obliquely extends in an upper left direction from the first plate-shaped portion 193*a*, a plurality of second minute branches 194*b* which obliquely extends in an upper right direction, a plurality of third minute branches 194*c* which obliquely extends in a lower left direction, and a plurality of fourth minute branches 194*d* which obliquely extends in a lower right direction.

The second subpixel electrode 191*b* includes a second plate-shaped portion 193*b* surrounding the plurality of first branch electrodes 192*a* of the first subpixel electrode 191*a*, and a plurality of second branch electrodes 192*b* surrounding the second plate-shaped portion 193*b* and extended from the second plate-shaped portion 193*b*.

The second plate-shaped portion 193*b* of the second subpixel electrode 191*b* has a planar shape formed by combining four parallelograms which are positioned outside of the first to fourth minute branches 194*a*, 194*b*, 194*c*, and 194*d* of the first subpixel electrode 191*a*. Similarly to the first branch electrodes 192*a* of the first subpixel electrode 191*a*, the plurality of second branch electrodes 192*b* of the second subpixel electrode 191*b* include a plurality of fifth minute branches 194*e* which obliquely extends in an upper left direction from the second plate-shaped portion 193*b*, a plurality of sixth minute branches 194*f* which obliquely extends in an upper right direction, a plurality of seventh minute branches 194*g* which obliquely extends in a lower left direction, and a plurality of eighth minute branches 194*h* which obliquely extends in a lower right direction.

The first to fourth minute branches 194*a*, 194*b*, 194*c*, and 194*d*, and the fifth to eighth minute branches 194*e*, 196*f*, 194*g*, and 194*h* form an angle of approximately (about) 45° to 135° with a first direction D1 in which the gate line 121 extends. Further, two of the minute branches 194*a*, 194*b*, 194*c*, 194*d*, 194*e*, 196*f*, 194*g*, and 194*h*, which extend in different directions and are adjacent to each other, may be orthogonal to each other.

In the basic electrode 199 of the liquid crystal display according to the example embodiment, as compared with the basic electrode 199 according to the example embodiment illustrated in FIG. 3, a second distance d2 between the first subpixel electrode 191*a* and the second subpixel electrode 191*b* is small. In more detail, the second distance d2 between the first subpixel electrode 191*a* and the second subpixel electrode 191*b* may be smaller than about 3 μm.

As such, since the second distance d2 between the first subpixel electrode 191*a* and the second subpixel electrode 191*b* is small, the liquid crystal molecules positioned on a boundary between the first subpixel electrode 191*a* and the second subpixel electrode 191*b* are influenced by the fringe field by the first branch electrode 192*a* of the first subpixel electrode 191*a* more than by the fringe field by the second plate-shaped portion 193*b* of the second subpixel electrode 191*b*. Accordingly, the liquid crystal molecules positioned on the boundary between the first subpixel electrode 191*a* and the second subpixel electrode 191*b* are tilted in a parallel direction with a longitudinal direction of the first branch electrode 192*a* of the first subpixel electrode 191*a* and the second branch electrode 192*b* of the second subpixel electrode 191*b*.

Figure 28:
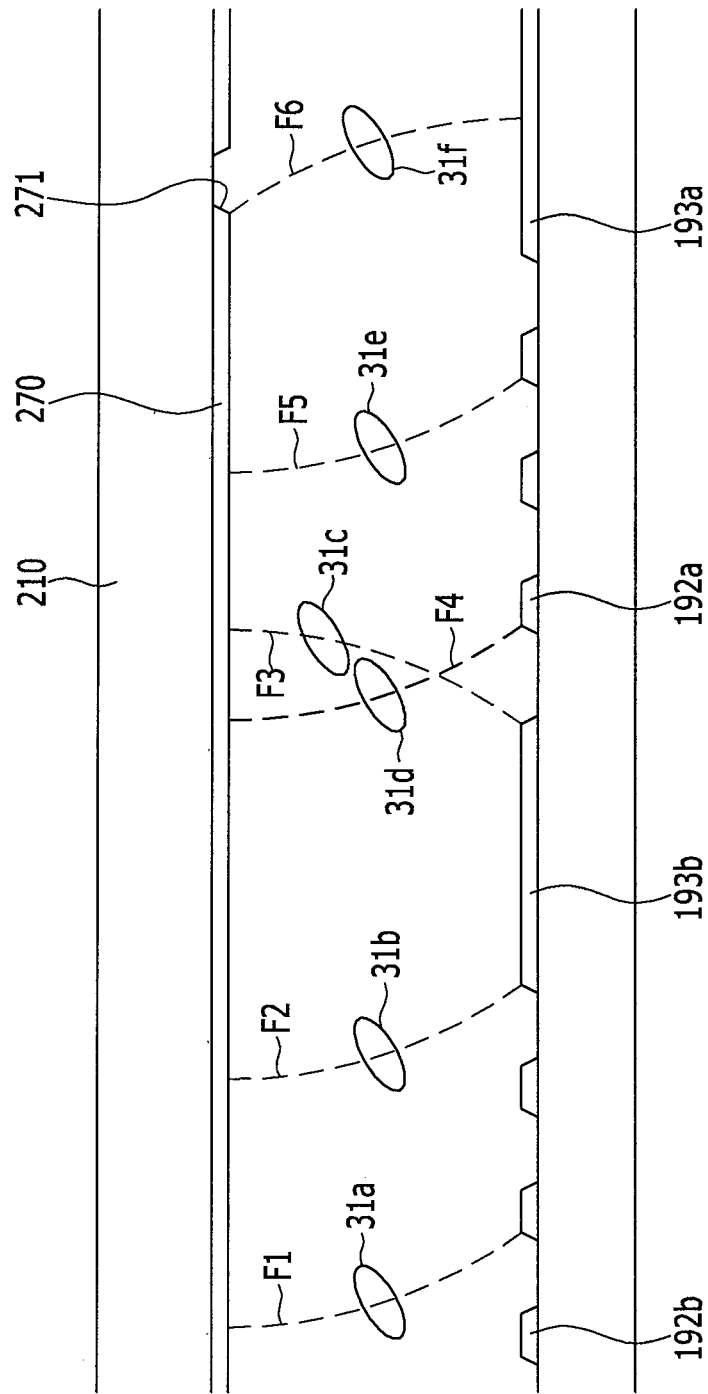
FIG. 28 is a cross-sectional view illustrating alignment directions of directors of the liquid crystal molecules of the liquid crystal display according to another example embodiment of the present invention.

This will be described in more detail with reference to FIG. 28. FIG. 28 is a cross-sectional view illustrating alignment directions of directors of the liquid crystal molecules of a liquid crystal display according to the present example embodiment of the present invention (illustrated in FIG. 27).

Referring to FIG. 28, a first fringe field F1 in a direction which is vertical (perpendicular) to an edge of the second branch electrode 192*b* of the second subpixel electrode 191*b* is generated, and as a result, first liquid crystal molecules 31*a* positioned around the second branch electrode 192*b* are tilted in parallel with the direction of the first fringe field F1 and then collide with each other to be tilted in a parallel direction with a longitudinal direction in which the second branch electrode 192*b* extends.

Second liquid crystal molecules 31*b* positioned at a first edge adjacent to the second branch electrode 192*b* among edges of the second plate-shaped portion 193*b* of the second subpixel electrode 191*b* are influenced by a second fringe field F2 generated at the first edge of the second plate-shaped portion 193*b* to be tilted in a direction which is vertical (perpendicular) to the first edge of the second plate-shaped portion 193*b*, and the direction is the same as the tilted directions of the first liquid crystal molecules 31*a*.

A third fringe field F3 is generated at a second edge adjacent to the first subpixel electrode 191*a* among the edges of the second plate-shaped portion 193*b* of the second subpixel electrode 191*b*, and third liquid crystal molecules 31*c* adjacent to the second edge which is adjacent to the first subpixel electrode 191*a* among the edges of the second plate-shaped portion 193*b* of the second subpixel electrode 191*b* are influenced by the third fringe field F3 to be tilted in a direction which is vertical (perpendicular) to the second edge of the second plate-shaped portion 193*b*. The direction is opposite to (e.g., crossing or perpendicular to) the directions in which the first liquid crystal molecules 31*a* and the second liquid crystal molecules 31*b* are tilted.

Further, a fourth fringe field F4 is generated at a third edge adjacent to the second plate-shaped portion 193*b* of the second subpixel electrode 191*b* among the edges of the first branch electrode 192*a* of the first subpixel electrode 191*a*, and fourth liquid crystal molecules 31*d* adjacent to the third edge of the first branch electrode 192*a* are tilted in a direction vertical (perpendicular) to the fourth fringe field F4. The direction is the same as the directions in which the first liquid crystal molecules 31*a* and the second liquid crystal molecules 31*b* are tilted.

As described above, a magnitude of the voltage applied to the first subpixel electrode 191*a* is larger than a magnitude of the voltage applied to the second subpixel electrode 191*b*. Accordingly, the voltage difference between the first subpixel electrode 191*a* and the common electrode 270 is larger than the voltage difference between the second subpixel electrode 191*b* and the common electrode 270, and as a result, the magnitude of the fourth fringe field F4 is larger than the magnitude of the third fringe field F3. Furthermore, the second distance d2 between the first subpixel electrode 191*a* and the second subpixel electrode 191*b* is formed to be smaller, and as a result, the influence of the fourth fringe field F4 applied to the liquid crystal molecules positioned between the first subpixel electrode 191*a* and the second subpixel electrode 191*b* is more increased. Therefore, third liquid crystal molecules 31*c* adjacent to the second edge adjacent to the first subpixel electrode 191*a* are influenced by the fourth fringe field F4 to be tilted in a direction vertical (perpendicular) to the fourth fringe field F4. Accordingly, the third liquid crystal molecules 31*c* which are influenced by the third fringe field F3 to be tilted in the direction vertical (perpendicular) to the third fringe field F3 are influenced by the fourth fringe field F4 to be tilted in parallel with the fourth liquid crystal molecules 31*d*. As a result, the third liquid crystal molecules 31*c* positioned between the first subpixel electrode 191*a* and the second subpixel electrode 191*b* are tilted in the parallel direction with the second liquid crystal molecules 31*b* and the fourth liquid crystal molecules 31*d* therearound, and accordingly, the luminance of the liquid crystal display may be increased. In the case where the tilted directions of the liquid crystal molecules positioned on the boundary of the first subpixel electrode 191*a* and the second subpixel electrode 191*b* are different from the tilted directions of the liquid crystal molecules positioned to correspond to the first subpixel electrode 191a and the second subpixel electrode 191b, the boundary of the first subpixel electrode 191a and the second subpixel electrode 191b looks darker than the first subpixel electrode 191a and the second subpixel electrode 191b, and as a result, the entire luminance of the liquid crystal display is reduced.

Fifth liquid crystal molecules 31e corresponding to the first branch electrode 192a of the first subpixel electrode 191a is influenced by a fifth fringe field F5 generated at the edge of the first branch electrode 192a to be tilted in a parallel direction with the fifth fringe field F5, and then collide with each other to be tilted in the parallel direction with the longitudinal direction in which the first branch electrode 192a extends.

Further, a third portion 31f1 and a fourth portion 31f2 of sixth liquid crystal molecules 31f corresponding to the first plate-shaped portion 193a of the first subpixel electrode 191a are primarily tilted in a direction which is vertical (perpendicular) to the edge of the cutout 271 by the sixth fringe field F6 which is applied to the cross-shaped cutout 271 formed at the common electrode 270 and then secondarily aligned in a direction so that the deformation is minimized when the third portion 31f1 and the fourth portion 31f2 of the sixth liquid crystal molecules 31f meet each other, and the secondarily aligned direction becomes a vector sum direction of the directions in which the third portion 31f1 and the fourth portion 31f2 extend. Accordingly, the third portion 31f1 and the fourth portion 31f2 are tilted in a parallel direction with the longitudinal direction in which the first branch electrode 192a extends.

As such, according to the liquid crystal display according to the example embodiment of the present invention, the first subpixel electrode 191a to which a relatively high voltage is applied is formed at the center to be overlapped with the center of the cross-shaped cutout 271 of the common electrode 270, and the plurality of first branch electrode 192a is formed at the edge of the first subpixel electrode 191a. Further, the second subpixel electrode 191b to which a relatively low voltage is applied is positioned at the edge of the first subpixel electrode 191a, and the plurality of second branch electrodes 192b is formed at the edge of the second subpixel electrode 191b. In addition, by controlling the ratio of the voltages applied to the first subpixel electrode 191a and the second subpixel electrode 191b according to the first distance d1 between the first subpixel electrode 191a and the second subpixel electrode 191b, the liquid crystal molecules positioned on the boundary of the first subpixel electrode 191a and the second subpixel electrode 191b are tilted in parallel and in the same direction as the directions of the liquid crystal molecules corresponding to the first subpixel electrode 191a and the liquid crystal molecules corresponding to the second subpixel electrode 191b, and as a result, the luminance of the liquid crystal display is increased.

As described above, the first branch electrode 192a of the first subpixel electrode 191a and the second branch electrode 192b of the second subpixel electrode 191b have the plurality of minute branches 194a, 194b, 194c, 194d, 194e, 196f, 194g, and 194h which extend in different directions, and as a result, the liquid crystal molecules are tilted in different directions. Accordingly, a viewing angle of the liquid crystal display is increased.

Figure 29:
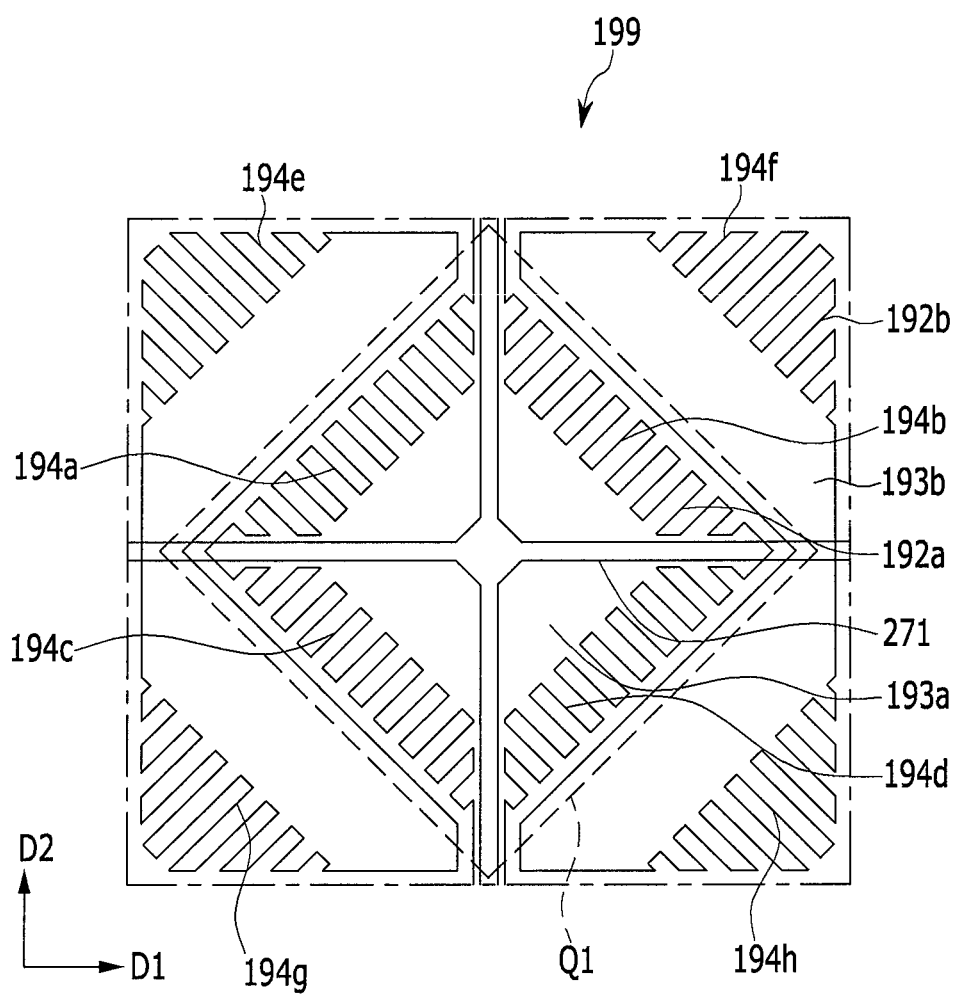
FIG. 29 is a plan view illustrating a basic region of a field generating electrode of the liquid crystal display according to another example embodiment of the present invention.

Next, a liquid crystal display according to another example embodiment of the present invention will be described with reference to FIGS. 29 and 30. FIG. 29 is a plan view illustrating a basic region of a field generating electrode of the liquid crystal display according to another example embodiment of the present invention, and FIG. 30 is a cross-sectional view taken along the line XXIX-XXIX' of FIG. 29, as a cross-sectional view illustrating a part of the field generating electrode of the liquid crystal display according to another example embodiment of the present invention.

Figure 30:
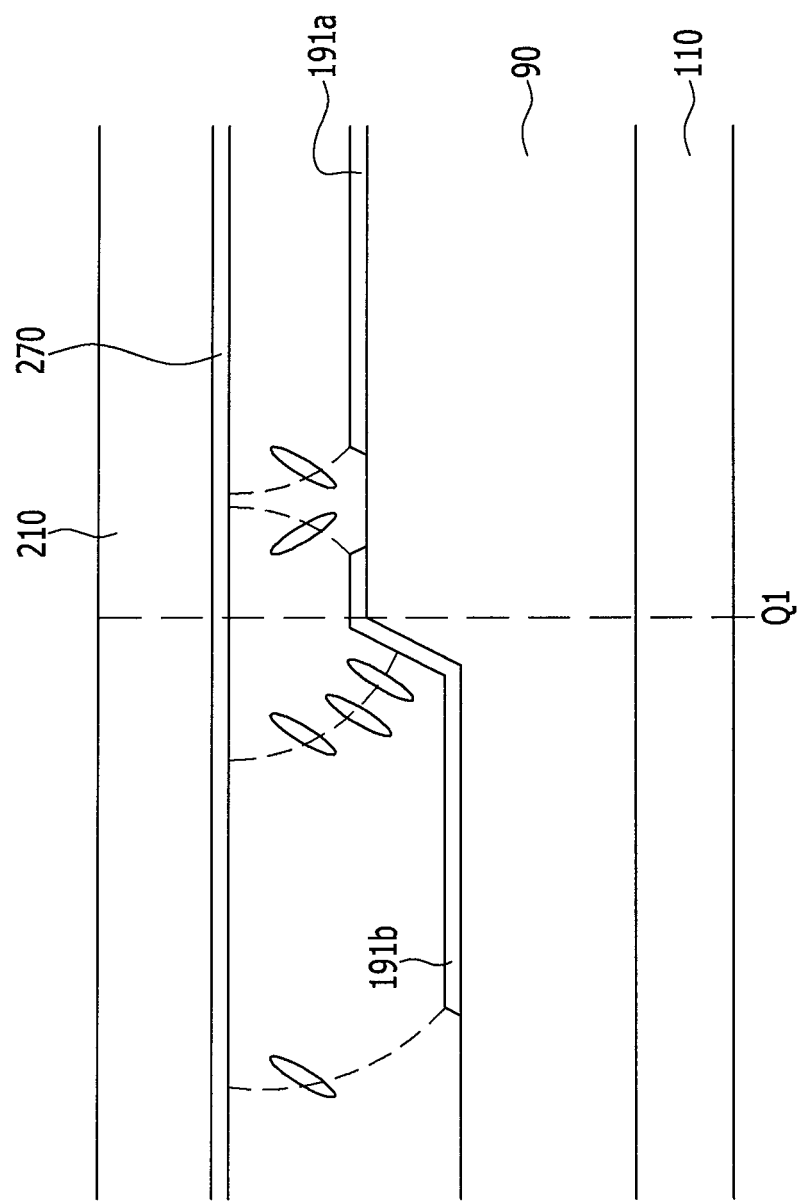
FIG. 30 is a cross-sectional view taken along the line XXIX-XXIX' of FIG. 29, as a cross-sectional view illustrating a part of the field generating electrode of the liquid crystal display according to another example embodiment of the present invention.

As illustrated in FIGS. 29 and 30, a basic electrode 199 of the liquid crystal display according to the present example embodiment includes a cutout 271 of a common electrode 270 and a pixel electrode 191 including a first subpixel electrode 191a and a second subpixel electrode 191b facing each other. The second subpixel electrode 191b surrounds the first subpixel electrode 191a.

The cutout 271 of the common electrode 270 may have a cross shape in a plan view, e.g., when viewed from the planar form (state).

A plurality of first branch electrodes 192a is formed at an edge of the first subpixel electrode 191a. The plurality of first branch electrodes 192a is extended from a first plate portion 193a having a rhombus shape. That is, the first subpixel electrode 191a includes the first plate-shaped portion 193a positioned at the center and a plurality of first branch electrodes 192a, which surrounds the first plate-shaped portion 193a and is extended from the first plate-shaped portion 193a.

The central portion of the first plate-shaped portion 193a of the first subpixel electrode 191a is overlapped with a central portion of the cross-shaped cutout 271 formed at the common electrode 270.

The first branch electrodes 192a of the first subpixel electrode 191a extend in different directions. In more detail, the first branch electrodes 192a include a plurality of first minute branches 194a which obliquely extends in an upper left direction from the first plate-shaped portion 193a, a plurality of second minute branches 194b which obliquely extends in an upper right direction, a plurality of third minute branches 194c which obliquely extends in a lower left direction, and a plurality of fourth minute branches 194d which obliquely extends in a lower right direction.

The second subpixel electrode 191b includes a second plate-shaped portion 193b surrounding the plurality of first branch electrodes 192a of the first subpixel electrode 191a, and a plurality of second branch electrodes 192b surrounding the second plate-shaped portion 193b and extended from the second plate-shaped portion 193b.

The second plate-shaped portion 193b of the second subpixel electrode 191b has a planar shape formed by combining four parallelograms which are positioned outside of the first to fourth minute branches 194a, 194b, 194c, and 194d of the first subpixel electrode 191a. Similarly to the first branch electrodes 192a of the first subpixel electrode 191a, the plurality of second branch electrodes 192b of the second subpixel electrode 191b include a plurality of fifth minute branches 194e which obliquely extends in an upper left direction from the second plate-shaped portion 193b, a plurality of sixth minute branches 194f which obliquely extends in an upper right direction, a plurality of seventh minute branches 194g which obliquely extends in a lower left direction, and a plurality of eighth minute branches 194h which obliquely extends in a lower right direction.

The first to fourth minute branches 194a, 194b, 194c, and 194d, and the fifth to eighth minute branches 194e, 196f, 194g, and 194h form an angle of approximately (about) 45° or 135° with a first direction D1. Further, two of the minute branches 194a, 194b, 194c, 194d, 194e, 196f, 194g, and 194h, which extend in different directions and are adjacent to each other, may be orthogonal to each other. An insulating layer 90 positioned below the first subpixel electrode 191*a* and the second subpixel electrode 191*b* (for example, the organic insulating layer such as a color filter 230, a passivation layer 180, and a gate insulating layer 140) have relatively small heights at a part Q1 of the second branch electrode 192*b* of the second subpixel electrode 191*b* and the second plate-shaped portion 193*b* of the second subpixel electrode 191*b*. In more detail, a height of a portion of the insulating layer 90 (positioned below the first subpixel electrode 191*a* and the second subpixel electrode 191*b*) corresponding to the part of the second branch electrode 192*b* of the second subpixel electrode 191*b* and a portion of the second plate-shaped portion 193*b* of the second subpixel electrode 191*b* is smaller than a height of the remaining portion of the insulating layer 90 (positioned below the first subpixel electrode 191*a* and the second subpixel electrode 191*b*) corresponding to the remaining of the second plate-shaped portion 193*b* of the second subpixel electrode 191*b* and the portion corresponding to the first subpixel electrode 191*a*.

Accordingly, the tilted directions of the liquid crystal molecules positioned around the edge adjacent to the first subpixel electrode 191*a* among the edges of the second plate-shaped portion 193*b* are changed by an influence of a step difference of the insulating layer 90. In more detail, the liquid crystal molecules positioned around the edge adjacent to the first subpixel electrode 191*a* among the edges of the second plate-shaped portion 193*b* are tilted toward the first subpixel electrode 191*a* in a direction vertical (perpendicular) to the edge of the second plate-shaped portion 193*b* by the influence of the step difference of the insulating layer 90. The directions are directions which are parallel with longitudinal directions of the first branch electrode 192*a* of the first subpixel electrode 191*a* and the second branch electrode 192*b* of the the second subpixel electrode 191*b*.

As a result, the liquid crystal molecules positioned on the boundary between the first subpixel electrode 191*a* and the second subpixel electrode 191*b* are tilted in parallel and in the same direction as the liquid crystal molecules corresponding to the first subpixel electrode 191*a* and the liquid crystal molecules corresponding to the second subpixel electrode 191*b*, thereby increasing the luminance of the liquid crystal display.

Figure 31:
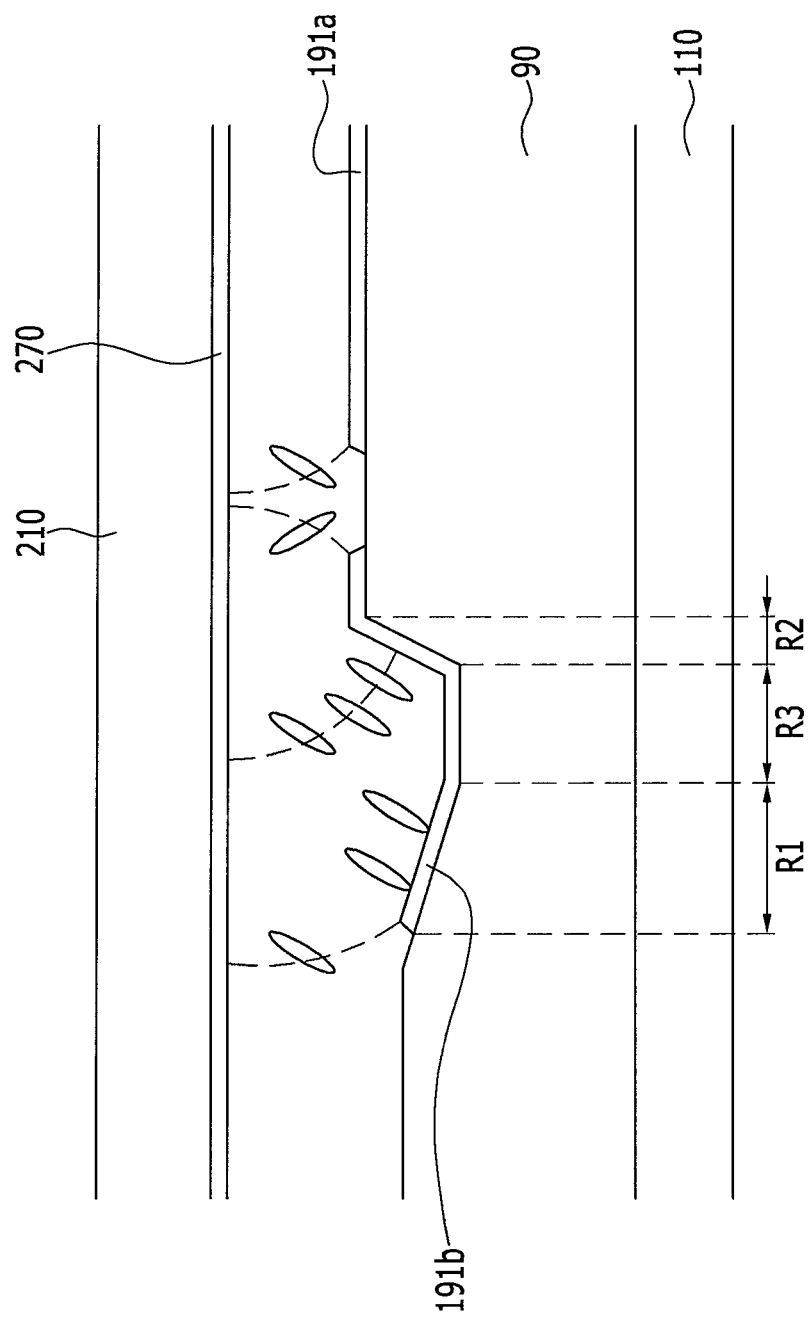
FIG. 31 is a cross-sectional view taken along the line XXIX-XXIX' of FIG. 29, as a cross-sectional view illustrating a part of the field generating electrode of the liquid crystal display according to another example embodiment of the present invention.

Next, a liquid crystal display according to another example embodiment of the present invention will be described with reference to FIG. 31 in addition to FIG. 29. FIG. 31 is cross-sectional view taken along the line XXIX-XXIX' of FIG. 29, as a cross-sectional view illustrating a part of a field generating electrode of a liquid crystal display according to another example embodiment of the present invention.

Referring to FIG. 31 together with FIG. 29, features of the basic electrode 199 of the liquid crystal display according to the example embodiment are similar to features of the basic electrode 199 of the liquid crystal display according to the example embodiment described with reference to FIGS. 29 and 30.

However, in the basic electrode 199 of the liquid crystal display according to the present example embodiment, unlike the basic electrode 199 of the liquid crystal display according to the example embodiment described with reference to FIGS. 29 and 30, an insulating layer 90 positioned below the first subpixel electrode 191*a* and the second subpixel electrode 191*b* has a relatively small height at a part of the second branch electrode 192*b* of the second subpixel electrode 191*b* and the second plate-shaped portion 193*b* of the second subpixel electrode 191*b*, and includes a plurality of regions having different angles of a slope which is formed with the surface of the insulating layer 90. In more detail, a height of a portion of the insulating layer 90 (positioned below the first subpixel electrode 191*a* and the second subpixel electrode 191*b*) corresponding to the part of the second branch electrode 192*b* of the second subpixel electrode 191*b* and the second plate-shaped portion 193*b* of the second subpixel electrode 191*b* is smaller than heights of the remaining portion of the insulating layer 90 corresponding to the remaining portion of the second plate-shaped portion 193*b* of the second subpixel electrode 191*b* and the portion corresponding to the first subpixel electrode 191*a*, and the insulating layer 90 includes a first region R1, a second region R2, and a third region R3 having different angles of the slope formed between the surface of the insulating layer 90 and the surface of the first substrate 110. The insulating layer 90 includes the first region R1 having a first slope, the second region R2 having a second slope, and the third region R3 having a third slope from an outmost edge of the basic electrode 199, and the third slope angle is the largest, and the first slope angle is larger than the second slope angle. As such, since the angles of the slope formed between the surface of the insulating layer 90 and the surface of the first substrate 110 are differently formed, the liquid crystal molecules in the first region R1 and the second region R2 are influenced by the fringe field according to the planar shape of the second subpixel electrode 191*b* more than by the step difference of the insulating layer 90, and the liquid crystal molecules in the third region R3 which is close to the boundary between the first subpixel electrode 191*a* and the second subpixel electrode 191*b* are largely influenced by the step difference of the insulating layer 90.

Accordingly, the tilted directions of the liquid crystal molecules positioned around the edge adjacent to the first subpixel electrode 191*a* among the edges of the second plate-shaped portion 193*b* are changed by the influence of the step difference of the insulating layer 90. In more detail, the liquid crystal molecules positioned around the edge adjacent to the first subpixel electrode 191*a* among the edges of the second plate-shaped portion 193*b* are tilted toward the first subpixel electrode 191*a* in a direction vertical (perpendicular) to the edge of the second plate-shaped portion 193*b* by the influence of the step difference of the insulating layer 90. The directions are directions which are parallel with longitudinal directions of the first branch electrode 192*a* of the first subpixel electrode 191*a* and the second branch electrode 192*b* of the second subpixel electrode 191*b*.

Accordingly, the liquid crystal molecules positioned on the boundary between the first subpixel electrode 191*a* and the second subpixel electrode 191*b* are tilted in parallel and in the same direction as the liquid crystal molecules corresponding to the first subpixel electrode 191*a* and the liquid crystal molecules corresponding to the second subpixel electrode 191*b*, thereby increasing the luminance of the liquid crystal display.

Figure 32:
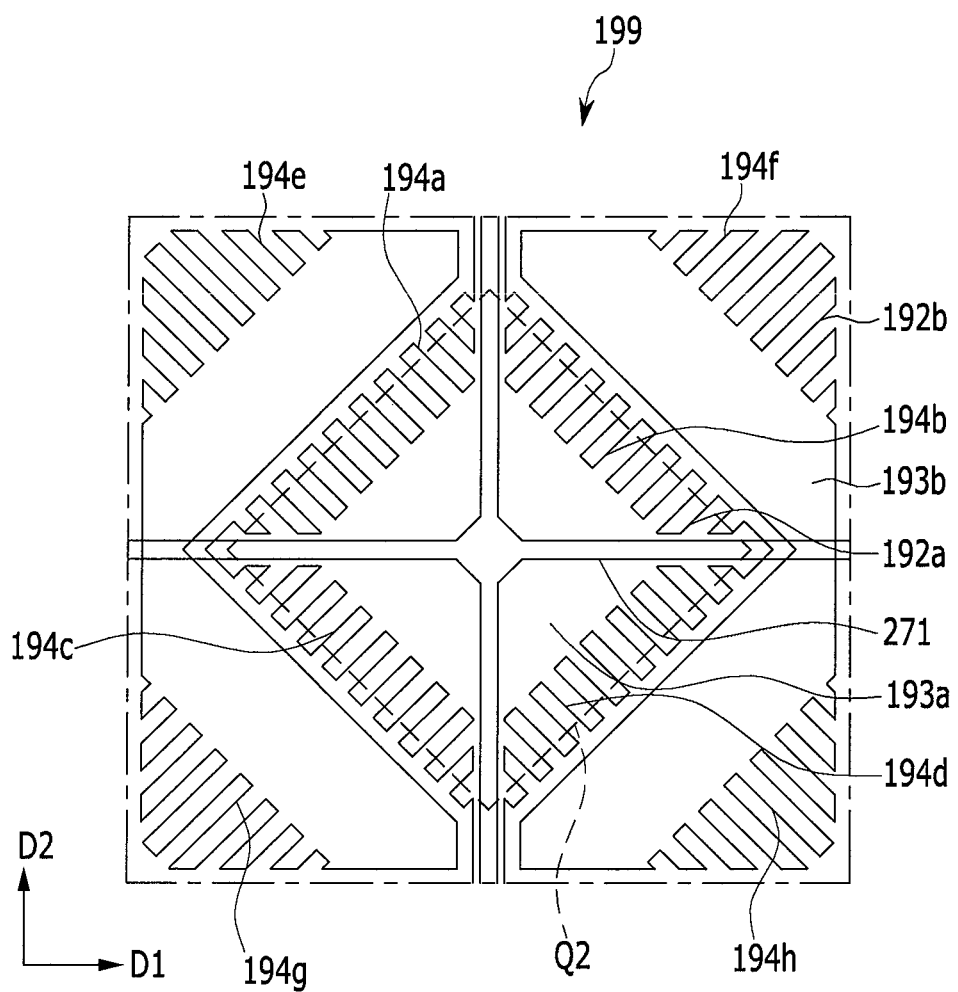
FIG. 32 is a plan view illustrating a basic region of a field generating electrode of the liquid crystal display according to another example embodiment of the present invention.

Next, a liquid crystal display according to another example embodiment of the present invention will be described with reference to FIGS. 32 and 33. FIG. 32 is a plan view illustrating a basic region of a field generating electrode of a liquid crystal display according to another example embodiment of the present invention, and FIG. 33 is a cross-sectional view taken along the line XXII-XXII' of FIG. 32, as a cross-sectional view illustrating a part of the field generating electrode of the liquid crystal display according to another example embodiment of the present invention.

Figure 33:
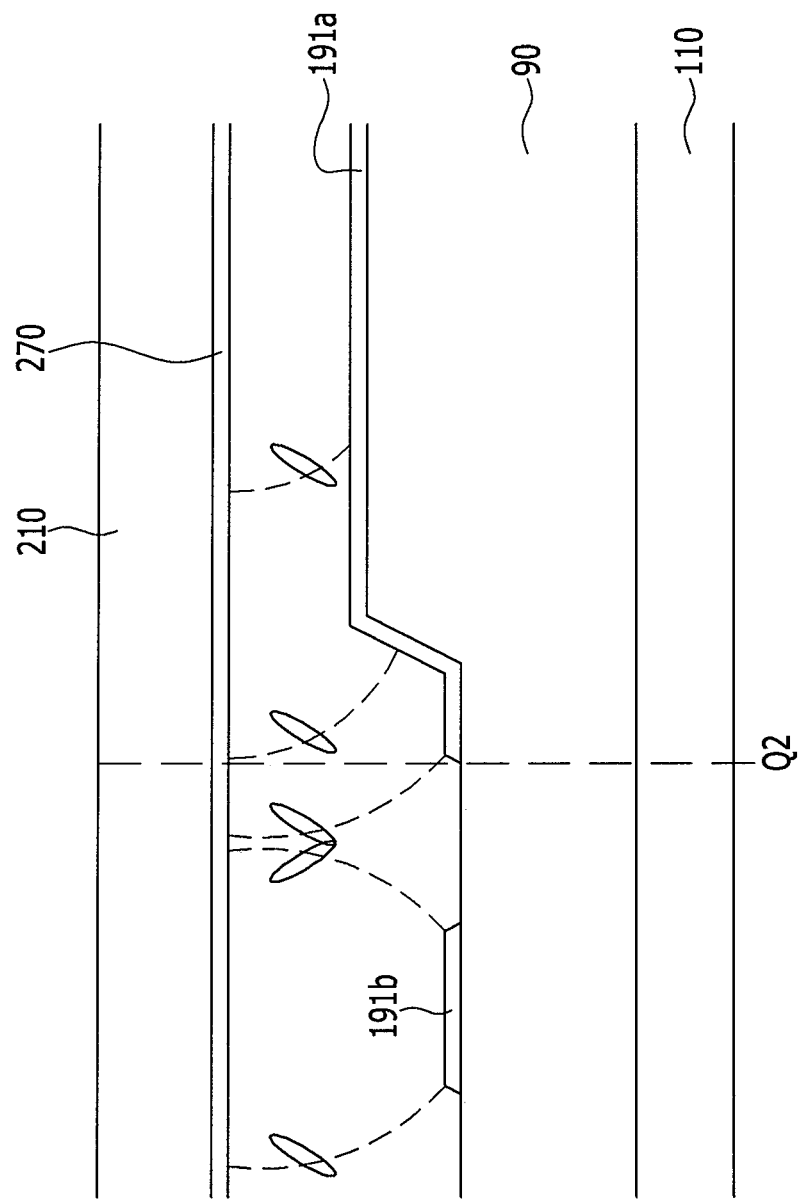
FIG. 33 is a cross-sectional view taken along the line XXII-XXII' of FIG. 32, as a cross-sectional view illustrating a part of the field generating electrode of the liquid crystal display according to another example embodiment of the present invention.

As illustrated in FIGS. 32 and 33, a basic electrode 199 of the liquid crystal display according to the present example embodiment includes a cutout 271 of a common electrode 270 and a pixel electrode 191 including a first subpixel electrode 191*a* (including a first plate-shaped portion 193*a* and a plurality of first branch electrodes 192*a*) and a second subpixel electrode 191*b* (including a second plate-shaped portion 193*b* and a plurality of second branch electrodes 192*b*) facing each other. The second subpixel electrode 191*b* surrounds the first subpixel electrode 191*a*.

The cutout 271 of the common electrode 270 may have a cross shape in a plan view, e.g., when viewed from the planar form (state).

A plurality of first branch electrodes 192*a* is formed at an edge of the first subpixel electrode 191*a*. The plurality of first branch electrodes 192*a* is extended from a first plate portion 193*a* having a rhombus shape. That is, the first subpixel electrode 191*a* includes the first plate-shaped portion 193*a* positioned at the center and a plurality of first branch electrodes 192*a*, which surrounds the first plate-shaped portion 193*a* and is extended from the first plate-shaped portion 193*a*.

The central portion of the first plate-shaped portion 193*a* of the first subpixel electrode 191*a* is overlapped with a central portion of the cross-shaped cutout 271 formed at the common electrode 270.

The first branch electrodes 192*a* of the first subpixel electrode 191*a* extend in different directions. In more detail, the first branch electrodes 192*a* include a plurality of first minute branches 194*a* which obliquely extends in an upper left direction from the first plate-shaped portion 193*a*, a plurality of second minute branches 194*b* which obliquely extends in an upper right direction, a plurality of third minute branches 194*c* which obliquely extends in a lower left direction, and a plurality of fourth minute branches 194*d* which obliquely extends in a lower right direction.

The second subpixel electrode 191*b* includes a second plate-shaped portion 193*b* surrounding the plurality of first branch electrodes 192*a* of the first subpixel electrode 191*a*, and a plurality of second branch electrodes 192*b* surrounding the second plate-shaped portion 193*b* and extended from the second plate-shaped portion 193*b*.

The second plate-shaped portion 193*b* of the second subpixel electrode 191*b* has a planar shape formed by combining four parallelograms which are positioned outside of the first to fourth minute branches 194*a*, 194*b*, 194*c*, and 194*d* of the first subpixel electrode 191*a*. Similarly to the first branch electrodes 192*a* of the first subpixel electrode 191*a*, the plurality of second branch electrodes 192*b* of the second subpixel electrode 191*b* include a plurality of fifth minute branches 194*e* which obliquely extends in an upper left direction from the second plate-shaped portion 193*b*, a plurality of sixth minute branches 194*f* which obliquely extends in an upper right direction, a plurality of seventh minute branches 194*g* which obliquely extends in a lower left direction, and a plurality of eighth minute branches 194*h* which obliquely extends in a lower right direction.

The first to fourth minute branches 194*a*, 194*b*, 194*c*, and 194*d*, and the fifth to eighth minute branches 194*e*, 196*f*, 194*g*, and 194*h* form an angle of approximately (about) 45° to 135° with a first direction D1. Further, two of the minute branches 194*a*, 194*b*, 194*c*, 194*d*, 194*e*, 196*f*, 194*g*, and 194*h*, which extend in different directions and are adjacent to each other, may be orthogonal to each other. An insulating layer 90 positioned below the first subpixel electrode 191*a* and the second subpixel electrode 191*b* (for example an organic insulating layer such as a color filter 230, a passivation layer 180, and a gate insulating layer 140) has relatively small heights over the entire second subpixel electrode 191*b* and an end portion Q2 of the first branch electrode 192*a* of the first subpixel electrode 191*a*. In more detail, the heights of the insulating layer 90 (positioned below the first subpixel electrode 191*a* and the second subpixel electrode 191*b*) correspond to the entire second subpixel electrode 191*b* and the end portion Q2 of the first branch electrode 192*a* of the first subpixel electrode 191*a* are smaller than a height of a portion of the insulating layer 90 corresponding to the remaining portion of the first subpixel electrode 191*a*.

Accordingly, the tilted directions of the liquid crystal molecules positioned at the end portion of the first branch electrode 192*a* of the first subpixel electrode 191*a* are changed by the influence of the fringe field by the first branch electrode 192*a* and the influence of the step difference of the insulating layer 90. In more detail, the liquid crystal molecules positioned at the end portion of the first branch electrode 192*a* of the first subpixel electrode 191*a* are tilted in a parallel direction with a longitudinal direction of the first branch electrode 192*a* of the first subpixel electrode 191*a* by the influence of the step difference of the insulating layer 90.

As such, since the tendency that the liquid crystal molecules positioned at the end portion of the first branch electrode 192*a* of the first subpixel electrode 191*a* are tilted in a parallel direction with a longitudinal direction of the first branch electrode 192*a* of the first subpixel electrode 191*a* is increased, the liquid crystal molecules positioned on the boundary between the first subpixel electrode 191*a* and the second subpixel electrode 191*b* are influenced by the liquid crystal molecules positioned at the end portion of the first branch electrode 192*a* of the first subpixel electrode 191*a*. Accordingly, the liquid crystal molecules positioned on the boundary between the first subpixel electrode 191*a* and the second subpixel electrode 191*b* are tilted in parallel and in the same direction as the liquid crystal molecules corresponding to the first subpixel electrode 191*a* and the liquid crystal molecules corresponding to the second subpixel electrode 191*b*.

As such, the liquid crystal molecules positioned on the boundary between the first subpixel electrode 191*a* and the second subpixel electrode 191*b* are tilted in parallel and in the same direction as the liquid crystal molecules corresponding to the first subpixel electrode 191*a* and the liquid crystal molecules corresponding to the second subpixel electrode 191*b*, thereby increasing the luminance of the liquid crystal display.

Figure 34:
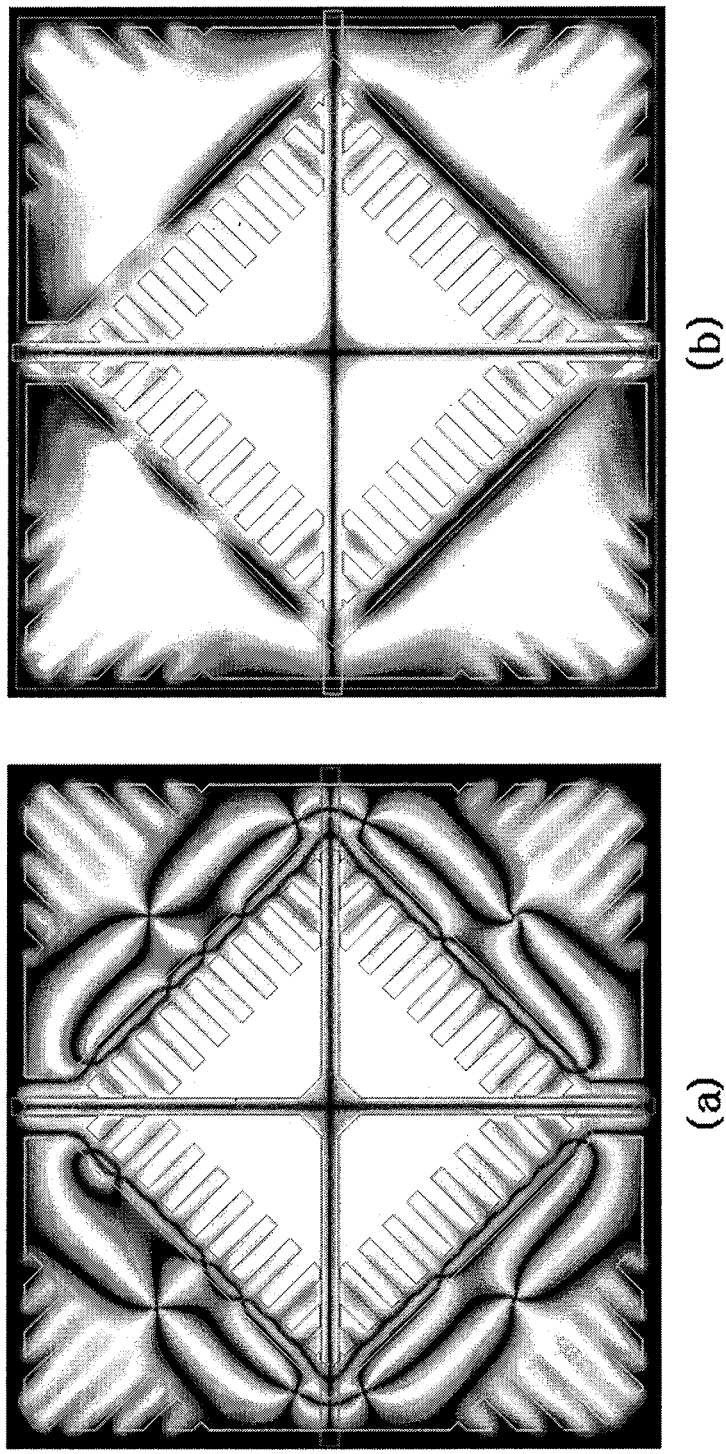
FIGS. 34(a) and (b) are electron micrographs illustrating a result of a sixth Experimental Example of the present invention.

Next, a fifth Experimental Example of the present invention will be described with reference to FIGS. 34(*a*) and (*b*). FIGS. 34(*a*) and (*b*) are electron micrographs illustrating a result of a fifth Experimental Example of the present invention.

In the Experimental Example, with respect to the case where the basic electrode of the liquid crystal display according to the example embodiment illustrated in FIG. 3 and the case where the basic electrode of the liquid crystal display according to the example embodiment illustrated in FIGS. 29 and 30, changes in luminance of the liquid crystal display after applying the same voltage are illustrated by an electron microscope.

FIG. 34(*a*) illustrates a result in the case of forming the basic electrode of the liquid crystal display according to the example embodiment illustrated in FIG. 3, and FIG. 34(*b*) illustrates a result in the case of forming the basic electrode of the liquid crystal display according to the example embodiment illustrated in FIGS. 29 and 30.

Referring to FIGS. 34(*a*) and (*b*), since the step difference is formed by changing the height of the insulating layer 90 positioned below the first subpixel electrode 191*a* and the second subpixel electrode 191*b*, the tilted directions of the liquid crystal molecules are controlled by the magnitude of the fringe field due the voltage difference and the influence of the step difference, and as a result, the tilted directions of the liquid crystal molecules positioned on the boundary between the first subpixel electrode 191*a* and the second subpixel electrode 191*b* may be further controlled. Accordingly, it can be seen that the luminance around the boundary between the first subpixel electrode 191*a* and the second subpixel electrode 191*b* is increased.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display, comprising:
a first substrate;
a pixel electrode on the first substrate and comprising a first subpixel electrode and a second subpixel electrode separated from the first subpixel electrode;
a second substrate facing the first substrate;
a common electrode on the second substrate; and
a liquid crystal layer between the first substrate and the second substrate,
wherein the first subpixel electrode comprises a first plate-shaped portion and a plurality of first branch electrodes extended from the first plate-shaped portion,
the second subpixel electrode comprises a second plate-shaped portion surrounding the first branch electrodes and a plurality of second branch electrodes extended from the second plate-shaped portion,
the second plate-shaped portion is between the first branch electrodes and the second branch electrodes,
the first plate-shaped portion of the first subpixel electrode has a rhombus planar shape having four edges, each edge connecting with two adjacent edges at two opposite ends thereof to form the rhombus planar shape, and at least two of the plurality of first branch electrodes extend from each edge of the rhombus planar shape,
the second plate-shaped portion includes an edge parallel with an edge of the rhombus planar shape of the first plate-shaped portion, and
a difference between a first voltage applied to the first subpixel electrode and a common voltage applied to the common electrode is larger than a difference between a second voltage applied to the second subpixel electrode and the common voltage.

2. The liquid crystal display of claim 1, wherein:
the second plate-shaped portion of the second subpixel electrode has a planar shape formed by combining a plurality of trapezoid shapes.

3. The liquid crystal display of claim 2, wherein:
the plurality of first branch electrodes of the first subpixel electrode comprises a first minute branch, a second minute branch, a third minute branch, and a fourth minute branch, which extend in different directions, and
the plurality of second branch electrodes of the second subpixel electrode comprises a fifth minute branch, a sixth minute branch, a seventh minute branch, and an eighth minute branch, which extend in different directions.

4. The liquid crystal display of claim 1, wherein:
a distance between the first subpixel electrode and the second subpixel electrode measured along a direction parallel to an extending direction of any one of the plurality of first branch electrodes and the plurality of second branch electrodes is about 4 μm or less; and
a ratio of the voltage applied to the second subpixel electrode to the voltage applied to the first subpixel electrode is about 0.83 or less.

5. The liquid crystal display of claim 1, wherein:
a distance between the first subpixel electrode and the second subpixel electrode measured along a direction parallel to an extending direction of any one of the plurality of first branch electrodes and the plurality of second branch electrodes is larger than about 4 μm and about 4.5 μm or less; and
a ratio of the voltage applied to the second subpixel electrode to the voltage applied to the first subpixel electrode is about 0.75 or less.

6. The liquid crystal display of claim 1, wherein:
a distance between the first subpixel electrode and the second subpixel electrode measured along a direction parallel to an extending direction of any one of the plurality of first branch electrodes and the plurality of second branch electrodes is about 5 μm or more; and
a ratio of the voltage applied to the second subpixel electrode to the voltage applied to the first subpixel electrode is about 0.7 or less.

7. The liquid crystal display of claim 1, wherein:
one-half of an entire width of the first plate-shaped portion of the first pixel electrode measured along a direction parallel to an extending direction of any one of the plurality of first branch electrodes and the plurality of second branch electrodes is about 25 μm or less.

8. The liquid crystal display of claim 7, wherein:
a width of the second plate-shaped portion of the second subpixel electrode measured along a direction parallel to an extending direction of any one of the plurality of first branch electrodes and the plurality of second branch electrodes is about 25 μm or less.

9. The liquid crystal display of claim 7, wherein:
lengths of the plurality of first branch electrodes and the plurality of second branch electrodes are each about 25 μm or less.

10. The liquid crystal display of claim 1, wherein:
an edge of the first plate-shaped portion of the first subpixel electrode forms an angle of about 45° or about 135° with a gate line, or forms an angle of larger than about 45° or smaller than about 135° with the gate line.

11. The liquid crystal display of claim 10, wherein:
an edge of the second plate-shaped portion of the second subpixel electrode forms an angle of about 45° or about 135° with the gate line, or forms an angle of larger than about 45° or smaller than about 135° with the gate line.

12. The liquid crystal display of claim 11, wherein:
a boundary between the first subpixel electrode and the second subpixel electrode forms an angle of about 45° or about 135° with the gate line, or forms an angle of larger than about 45° or smaller than about 135° with the gate line.

13. The liquid crystal display of claim 12, wherein:
the first branch electrode of the first subpixel electrode forms an angle of about 45° or about 135° with the gate line, or forms an angle of larger than about 45° or smaller than about 135° with the gate line.

14. The liquid crystal display of claim 1, wherein:
an edge of the second plate-shaped portion of the second subpixel electrode forms an angle of about 45° or about 135° with a gate line, or forms an angle of larger than about 45° or smaller than about 135° with the gate line.

15. The liquid crystal display of claim 14, wherein:
a boundary between the first subpixel electrode and the second subpixel electrode forms an angle of about 45° or about 135° with the gate line, or forms an angle of larger than about 45° or smaller than about 135° with the gate line.

16. The liquid crystal display of claim 15, wherein:
the first branch electrode of the first subpixel electrode forms an angle of about 45° or about 135° with the gate line, or forms an angle of larger than about 45° or smaller than about 135° with the gate line.

17. The liquid crystal display of claim 1, wherein:
a boundary between the first subpixel electrode and the second subpixel electrode forms an angle of about 45° or about 135° with a gate line, or forms an angle of larger than about 45° or smaller than about 135° with a gate line.

18. The liquid crystal display of claim 17, wherein:
the first branch electrode of the first subpixel electrode forms an angle of about 45° or about 135° with the gate line, or forms an angle of larger than about 45° or smaller than about 135° with the gate line.

19. The liquid crystal display of claim 1, wherein:
the first branch electrode of the first subpixel electrode forms an angle of about 45° or about 135° with a gate line, or forms an angle of larger than about 45° or smaller than about 135° with the gate line.

20. The liquid crystal display of claim 1, wherein:
a width of the second plate-shaped portion is smaller than a width of the first plate-shaped portion.

21. The liquid crystal display of claim 1, wherein:
a width of an end of the first branch electrode adjacent to the second plate-shaped portion is larger than that of any other portions of the first branch electrode.

22. The liquid crystal display of claim 21, wherein:
on a boundary between the second plate-shaped portion and the second branch electrode, a width of the second branch electrode is smaller than that of any other portions of the second branch electrode.

23. The liquid crystal display of claim 1, further comprising:
an insulating layer below the pixel electrode,
wherein the insulating layer comprises a first portion below the first subpixel electrode and a second portion below the second subpixel electrode, and
a height of the first portion is larger than a height of the second portion.

24. The liquid crystal display of claim 23, wherein:
a boundary between the first portion and the second portion is overlapped with the second plate-shaped portion of the second subpixel electrode, or overlapped with the first branch electrode of the first subpixel electrode.

25. The liquid crystal display of claim 23, wherein:
a boundary between the first portion and the second portion is overlapped with the second plate-shaped portion of the second subpixel electrode, and
the second portion comprises a plurality of regions having different slopes formed with the substrate.

* * * * *